US012783100B2

(12) United States Patent
Smith et al.

(10) Patent No.: US 12,783,100 B2
(45) Date of Patent: Nov. 3, 2026

(54) SYSTEM AND METHOD OF APPLICATION-BASED THREE-DIMENSIONAL REFINEMENT IN MULTI-USER COMMUNICATION SESSIONS

(71) Applicant: Apple Inc., Cupertino, CA (US)

(72) Inventors: Connor A. Smith, San Jose, CA (US); Christopher D. Mckenzie, Burlingame, CA (US); Nathan Gitter, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 19/370,241

(22) Filed: Oct. 27, 2025

(65) Prior Publication Data

US 2026/0050357 A1 Feb. 19, 2026

Related U.S. Application Data

(63) Continuation of application No. 18/896,227, filed on Sep. 25, 2024, now Pat. No. 12,461,641, which is a (Continued)

(51) Int. Cl.

*G06F 3/04815* (2022.01)
*G06F 3/01* (2006.01)

(Continued)

(52) U.S. Cl.

CPC .......... *G06F 3/04815* (2013.01); *G06F 3/013* (2013.01); *G06F 3/017* (2013.01); *G06F 3/04845* (2013.01); *H04L 65/403* (2013.01)

(58) Field of Classification Search

None

See application file for complete search history.

(56) References Cited

U.S. PATENT DOCUMENTS

| | | | |
|---|---|---|---|
| 6,415,258 | B1 | 7/2002 | Reynar et al. |
| 6,538,651 | B1 | 3/2003 | Hayman et al. |

(Continued)

FOREIGN PATENT DOCUMENTS

| | | | |
|---|---|---|---|
| AU | 2022348895 A1 | 4/2024 |
| CN | 108563335 A | 9/2018 |

(Continued)

OTHER PUBLICATIONS

Extended European Search Report received for European Patent Application No. 25179367.5, mailed on Jul. 1, 2025, 10 pages.

(Continued)

*Primary Examiner* — Parul H Gupta

(74) *Attorney, Agent, or Firm* — Kubota & Basol LLP

(57) ABSTRACT

Some examples of the disclosure are directed to methods for application-based spatial refinement in a multi-user communication session including a first electronic device and a second electronic device. While the first electronic device is presenting a three-dimensional environment, the first electronic device receives an input corresponding to a request to move a shared object in the three-dimensional environment. In accordance with a determination that the shared object is an object of a first type, the first electronic device moves the shared object and an avatar of a user in the three-dimensional environment in accordance with the input. In accordance with a determination that the shared object is an object of a second type, different from the first type, and the input is a first type of input, the first electronic device moves the shared object in the three-dimensional environment in accordance with the input, without moving the avatar.

24 Claims, 21 Drawing Sheets

Related U.S. Application Data continuation of application No. 18/465,098, filed on Sep. 11, 2023, now Pat. No. 12,112,011.

(60) Provisional application No. 63/375,991, filed on Sep. 16, 2022.

(51) Int. Cl.
*G06F 3/04845* (2022.01)
*H04L 65/403* (2022.01)

(56) References Cited

U.S. PATENT DOCUMENTS

| | | | |
|---|---|---|---|
| 6,714,201 | B1 | 3/2004 | Grinstein et al. |
| 6,968,511 | B1 | 11/2005 | Robertson et al. |
| 8,046,721 | B2 | 10/2011 | Chaudhri et al. |
| 8,122,341 | B1 | 2/2012 | Dayan et al. |
| 9,222,787 | B2 | 12/2015 | Blumenberg et al. |
| 9,491,374 | B1 | 11/2016 | Avrahami et al. |
| 9,779,605 | B1 | 10/2017 | Taylor et al. |
| 10,139,985 | B2 | 11/2018 | Mildrew et al. |
| 10,163,198 | B2 | 12/2018 | Rochford et al. |
| 10,186,086 | B2 | 1/2019 | Giraldi et al. |
| 10,210,664 | B1 | 2/2019 | Chaturvedi |
| 10,303,427 | B2 | 5/2019 | Shintani et al. |
| 10,311,543 | B2 | 6/2019 | Energin et al. |
| 10,318,034 | B1 | 6/2019 | Hauenstein et al. |
| 10,331,205 | B2 | 6/2019 | Kim et al. |
| 10,389,977 | B1 | 8/2019 | Van Os et al. |
| 10,402,081 | B1 | 9/2019 | Andersen et al. |
| 10,475,253 | B2 | 11/2019 | Yerkes et al. |
| 10,481,755 | B1 | 11/2019 | Ngo et al. |
| 10,540,005 | B2 | 1/2020 | Yoon et al. |
| 10,565,761 | B2 | 2/2020 | Deluca et al. |
| 10,599,570 | B1 | 3/2020 | Ding et al. |
| 10,630,803 | B2 | 4/2020 | Hwang et al. |
| 10,671,243 | B2 | 6/2020 | Ryu et al. |
| 10,701,661 | B1 | 6/2020 | Coelho et al. |
| 10,877,645 | B2 | 12/2020 | Lee et al. |
| 10,885,701 | B1 | 1/2021 | Patel |
| 10,885,716 | B1 | 1/2021 | Evertt et al. |
| 10,937,244 | B2 | 3/2021 | Kim et al. |
| 11,017,611 | B1 | 5/2021 | Mount et al. |
| 11,055,920 | B1 * | 7/2021 | Bramwell ............... G06F 3/011 |
| 11,062,520 | B2 | 7/2021 | Smets |
| 11,132,840 | B2 | 9/2021 | Sarangdhar et al. |
| 11,150,730 | B1 | 10/2021 | Anderson et al. |
| 11,200,742 | B1 * | 12/2021 | Post ...................... G06T 19/003 |
| 11,210,863 | B1 | 12/2021 | Yan et al. |
| 11,228,805 | B2 | 1/2022 | Hardy |
| 11,263,824 | B2 | 3/2022 | Forbes et al. |
| 11,266,919 | B2 | 3/2022 | Bear et al. |
| 11,314,376 | B2 | 4/2022 | Agarawala et al. |
| 11,382,611 | B1 | 7/2022 | Westling et al. |
| 11,406,896 | B1 | 8/2022 | Cheung et al. |
| 11,500,510 | B2 | 11/2022 | Tokuchi et al. |
| 11,520,456 | B2 | 12/2022 | Kawashima et al. |
| 11,604,080 | B2 | 3/2023 | Paoletti et al. |
| 11,682,180 | B1 | 6/2023 | Willkie |
| 11,687,224 | B2 | 6/2023 | Manzari et al. |
| 11,689,632 | B2 | 6/2023 | Raisher et al. |
| 11,743,215 | B1 | 8/2023 | Murillo et al. |
| 11,842,454 | B1 | 12/2023 | Lin et al. |
| 11,853,536 | B2 | 12/2023 | Napolitano et al. |
| 11,861,056 | B2 | 1/2024 | Burns et al. |
| 11,868,582 | B2 | 1/2024 | Kim et al. |
| 11,875,162 | B2 | 1/2024 | Garstenauer et al. |
| 11,948,263 | B1 | 4/2024 | Rudman et al. |
| 11,972,092 | B2 | 4/2024 | Zurmoehle et al. |
| 11,995,230 | B2 | 5/2024 | Holder et al. |
| 12,020,387 | B2 | 6/2024 | Maharaja |
| 12,023,579 | B2 | 7/2024 | Azmandian et al. |
| 12,182,325 | B2 | 12/2024 | Calderone et al. |
| 12,211,161 | B2 | 1/2025 | Favale et al. |
| 12,254,127 | B2 | 3/2025 | Burns et al. |
| 12,321,515 | B2 | 6/2025 | Calderone et al. |
| 12,394,167 | B1 | 8/2025 | Scully et al. |
| 12,408,804 | B2 | 9/2025 | Schneider et al. |
| 12,456,271 | B1 | 10/2025 | Bernstein et al. |
| 2005/0073136 | A1 | 4/2005 | Larsson et al. |
| 2007/0172112 | A1 | 7/2007 | Paley et al. |
| 2008/0120568 | A1 | 5/2008 | Jian et al. |
| 2008/0132249 | A1 | 6/2008 | Hamilton |
| 2008/0211771 | A1 * | 9/2008 | Richardson ............. A63F 13/52 345/158 |
| 2008/0222710 | A1 | 9/2008 | Blagsvedt et al. |
| 2009/0146961 | A1 | 6/2009 | Cheung et al. |
| 2009/0326810 | A1 | 12/2009 | Callaghan et al. |
| 2010/0309140 | A1 | 12/2010 | Widgor |
| 2011/0029185 | A1 | 2/2011 | Aoki et al. |
| 2011/0032365 | A1 | 2/2011 | Yett |
| 2011/0066981 | A1 | 3/2011 | Chmielewski et al. |
| 2011/0202834 | A1 | 8/2011 | Mandryk et al. |
| 2011/0283223 | A1 | 11/2011 | Vaittinen et al. |
| 2012/0159386 | A1 | 6/2012 | Kang et al. |
| 2012/0249416 | A1 | 10/2012 | Maciocci et al. |
| 2012/0290401 | A1 | 11/2012 | Neven |
| 2013/0103313 | A1 | 4/2013 | Moore et al. |
| 2013/0147820 | A1 | 6/2013 | Kalai et al. |
| 2013/0167092 | A1 | 6/2013 | Yu et al. |
| 2013/0169649 | A1 | 7/2013 | Bates et al. |
| 2013/0191160 | A1 | 7/2013 | Oran |
| 2013/0207963 | A1 | 8/2013 | Stirbu et al. |
| 2013/0212470 | A1 | 8/2013 | Karunamuni et al. |
| 2013/0222410 | A1 | 8/2013 | Kameyama et al. |
| 2013/0232430 | A1 | 9/2013 | Reitan |
| 2013/0293468 | A1 | 11/2013 | Perez et al. |
| 2013/0328929 | A1 | 12/2013 | Jeung et al. |
| 2013/0335301 | A1 | 12/2013 | Wong et al. |
| 2014/0022243 | A1 | 1/2014 | Loberg |
| 2014/0092018 | A1 | 4/2014 | Geithner |
| 2014/0125585 | A1 | 5/2014 | Song et al. |
| 2014/0132633 | A1 | 5/2014 | Fekete et al. |
| 2014/0168267 | A1 | 6/2014 | Kim et al. |
| 2014/0181683 | A1 | 6/2014 | Lim et al. |
| 2014/0184759 | A1 | 7/2014 | Lee |
| 2014/0225898 | A1 | 8/2014 | Fyke et al. |
| 2014/0247208 | A1 | 9/2014 | Henderek et al. |
| 2014/0267046 | A1 | 9/2014 | Ellsworth et al. |
| 2014/0267130 | A1 | 9/2014 | Hwang et al. |
| 2014/0268925 | A1 | 9/2014 | Lee et al. |
| 2014/0280603 | A1 | 9/2014 | Rideout et al. |
| 2014/0333535 | A1 | 11/2014 | Stafford |
| 2014/0375541 | A1 | 12/2014 | Nister et al. |
| 2015/0042679 | A1 | 2/2015 | Järvenpää |
| 2015/0143251 | A1 | 5/2015 | Bailiang et al. |
| 2015/0149961 | A1 | 5/2015 | Karakotsios |
| 2015/0169506 | A1 | 6/2015 | Leventhal et al. |
| 2015/0199081 | A1 | 7/2015 | Wheeler |
| 2015/0212684 | A1 | 7/2015 | Sabia et al. |
| 2015/0253957 | A1 | 9/2015 | Crocker |
| 2015/0277699 | A1 | 10/2015 | Algreatly |
| 2015/0286741 | A1 | 10/2015 | Zhu et al. |
| 2015/0312561 | A1 | 10/2015 | Hoof et al. |
| 2015/0348550 | A1 | 12/2015 | Zhang |
| 2015/0370404 | A1 | 12/2015 | Hu et al. |
| 2016/0012642 | A1 | 1/2016 | Lee et al. |
| 2016/0028961 | A1 | 1/2016 | Thurairatnam |
| 2016/0041391 | A1 | 2/2016 | Van et al. |
| 2016/0062615 | A1 | 3/2016 | Price et al. |
| 2016/0070448 | A1 | 3/2016 | Krol |
| 2016/0098972 | A1 | 4/2016 | Feit et al. |
| 2016/0104235 | A1 | 4/2016 | Benkar et al. |
| 2016/0109946 | A1 | 4/2016 | George-svahn |
| 2016/0153789 | A1 | 6/2016 | Gallar et al. |
| 2016/0193104 | A1 | 7/2016 | Du |
| 2016/0279516 | A1 | 9/2016 | Gupta et al. |
| 2016/0291692 | A1 | 10/2016 | Yasuda et al. |
| 2016/0291698 | A1 | 10/2016 | Niinuma et al. |
| 2016/0309081 | A1 | 10/2016 | Frahm et al. |
| 2016/0349063 | A1 | 12/2016 | Maurer et al. |
| 2016/0363774 | A1 | 12/2016 | Kawasima |
| 2016/0364916 | A1 | 12/2016 | Terahata |
| 2016/0379418 | A1 | 12/2016 | Osborn et al. |

(56) References Cited

U.S. PATENT DOCUMENTS

2017/0052373 A1 2/2017 Memmott et al.
2017/0146801 A1 5/2017 Stempora
2017/0148339 A1 5/2017 Van Curen et al.
2017/0176208 A1 6/2017 Chung et al.
2017/0185276 A1 6/2017 Lee et al.
2017/0206691 A1* 7/2017 Harrises ............. G02B 27/0172
2017/0214782 A1 7/2017 Brinda
2017/0287225 A1 10/2017 Powderly et al.
2018/0024681 A1 1/2018 Bernstein et al.
2018/0046363 A1 2/2018 Miller et al.
2018/0052518 A1 2/2018 Zhu et al.
2018/0095542 A1 4/2018 Mallinson
2018/0095649 A1 4/2018 Valdivia et al.
2018/0114370 A1 4/2018 Cullum et al.
2018/0122043 A1 5/2018 Energin et al.
2018/0183986 A1 6/2018 Smith et al.
2018/0188048 A1 7/2018 Ding et al.
2018/0348010 A1 12/2018 Coleman et al.
2018/0352374 A1 12/2018 Ball et al.
2019/0004683 A1 1/2019 Pahud et al.
2019/0005055 A1 1/2019 Andrew et al.
2019/0012060 A1 1/2019 Moore et al.
2019/0037137 A1 1/2019 Toksvig et al.
2019/0104259 A1 4/2019 Angquist et al.
2019/0180504 A1 6/2019 Pomerantz et al.
2019/0204906 A1* 7/2019 Ross ....................... A63F 13/00
2019/0244434 A1 8/2019 Pahud et al.
2019/0265828 A1 8/2019 Hauenstein et al.
2019/0277651 A1 9/2019 Ruikar
2019/0278432 A1 9/2019 Bennett et al.
2019/0285895 A1 9/2019 Fujimaki
2019/0287307 A1 9/2019 Rogers et al.
2019/0304166 A1 10/2019 Yu et al.
2019/0324279 A1 10/2019 Hwang et al.
2019/0332250 A1 10/2019 Lee et al.
2019/0333278 A1 10/2019 Palangie et al.
2019/0369836 A1 12/2019 Faulkner et al.
2019/0385368 A1 12/2019 Cartwright et al.
2019/0392830 A1 12/2019 Abdollahian
2020/0026922 A1 1/2020 Pekelny et al.
2020/0073521 A1 3/2020 Peebler et al.
2020/0097077 A1 3/2020 Nguyen et al.
2020/0111232 A1 4/2020 Bleyer et al.
2020/0111267 A1 4/2020 Stauber et al.
2020/0112711 A1 4/2020 Enriquez et al.
2020/0112712 A1 4/2020 Koblin et al.
2020/0126291 A1 4/2020 Nguyen et al.
2020/0201444 A1 6/2020 Stoyles et al.
2020/0258481 A1 8/2020 Woo et al.
2020/0267326 A1 8/2020 Mm
2020/0301513 A1 9/2020 Mejia Cobo
2020/0318955 A1 10/2020 Sharapov et al.
2020/0322178 A1 10/2020 Wang et al.
2020/0322575 A1 10/2020 Valli
2020/0327734 A1 10/2020 Goodrich et al.
2020/0356221 A1* 11/2020 Behzadi ................ G06F 3/0482
2020/0357184 A1 11/2020 Paul et al.
2020/0387213 A1 12/2020 Ravasz et al.
2020/0401687 A1 12/2020 Mak
2020/0410960 A1 12/2020 Saito et al.
2020/0412862 A1 12/2020 Oh et al.
2021/0019036 A1 1/2021 Wang et al.
2021/0074277 A1 3/2021 Lewis
2021/0090222 A1 3/2021 Lee et al.
2021/0097776 A1 4/2021 Faulkner et al.
2021/0134069 A1 5/2021 Sorrento
2021/0134248 A1 5/2021 Wan et al.
2021/0240332 A1 8/2021 Walkin et al.
2021/0272537 A1 9/2021 Mak
2021/0279957 A1 9/2021 Eder et al.
2021/0286502 A1 9/2021 Lemay et al.
2021/0286510 A1 9/2021 Tyler et al.
2021/0312684 A1 10/2021 Zimmermann et al.
2021/0350634 A1 11/2021 Major et al.
2021/0365108 A1 11/2021 Burns et al.
2021/0375049 A1 12/2021 Syed
2021/0409903 A1 12/2021 Shapiro et al.
2022/0027115 A1 1/2022 Haapoja et al.
2022/0086203 A1 3/2022 Morris et al.
2022/0086205 A1 3/2022 Lebeau et al.
2022/0101612 A1* 3/2022 Palangie ................. G06F 3/011
2022/0101613 A1 3/2022 Rockel
2022/0121275 A1 4/2022 Balaji et al.
2022/0122303 A1 4/2022 Sasikumar et al.
2022/0124130 A1 4/2022 Punwani et al.
2022/0148274 A1 5/2022 Brown, IV
2022/0155853 A1 5/2022 Fan et al.
2022/0155863 A1 5/2022 Wang et al.
2022/0157029 A1 5/2022 Horita et al.
2022/0179497 A1 6/2022 Jung et al.
2022/0206588 A1 6/2022 Canberk et al.
2022/0207840 A1 6/2022 Cansizoglu et al.
2022/0236801 A1 7/2022 Serbanati et al.
2022/0245888 A1* 8/2022 Singh ................. G06Q 30/0643
2022/0252882 A1 8/2022 Berliner et al.
2022/0253136 A1 8/2022 Holder et al.
2022/0254120 A1 8/2022 Berliner et al.
2022/0286488 A1 9/2022 Berliner et al.
2022/0317776 A1 10/2022 Sundstrom et al.
2022/0319134 A1 10/2022 Rodrigues et al.
2022/0319453 A1 10/2022 Llull et al.
2022/0350463 A1 11/2022 Walkin et al.
2022/0391158 A1 12/2022 Lemmens et al.
2022/0392169 A1 12/2022 Simpson et al.
2022/0417604 A1 12/2022 Chandrashekar et al.
2023/0009683 A1 1/2023 Biran et al.
2023/0026638 A1 1/2023 Schoen
2023/0086766 A1 3/2023 Olwal et al.
2023/0094522 A1 3/2023 Stauber et al.
2023/0130520 A1 4/2023 Kaptelinin
2023/0138952 A1 5/2023 Klein et al.
2023/0145592 A1 5/2023 Singh et al.
2023/0251709 A1 8/2023 Uenishi
2023/0273706 A1* 8/2023 Smith ................... A63F 13/211
345/419
2023/0274504 A1* 8/2023 Ren ......................... A63F 13/42
345/419
2023/0314801 A1 10/2023 Bove et al.
2023/0315270 A1 10/2023 Hylak et al.
2023/0316658 A1 10/2023 Smith et al.
2023/0333645 A1 10/2023 Palangie et al.
2023/0360264 A1 11/2023 Wu et al.
2023/0368475 A1 11/2023 Chan et al.
2023/0384907 A1* 11/2023 Boesel .................... G06F 3/012
2023/0385532 A1 11/2023 Mcveigh et al.
2023/0400958 A1 12/2023 Morrison et al.
2023/0409271 A1 12/2023 Agrawal et al.
2024/0012530 A1 1/2024 Lin et al.
2024/0061513 A1 2/2024 Reisman et al.
2024/0103681 A1 3/2024 Broughton et al.
2024/0126362 A1 4/2024 Burns et al.
2024/0152245 A1 5/2024 Broughton et al.
2024/0189507 A1 6/2024 Bailey et al.
2024/0248527 A1 7/2024 Strawn et al.
2024/0256032 A1 8/2024 Holder et al.
2024/0297919 A1 9/2024 Berliner et al.
2024/0302948 A1 9/2024 Hylak et al.
2024/0361901 A1 10/2024 Ravasz et al.
2025/0111626 A1 4/2025 Deliz Centeno et al.
2025/0199656 A1 6/2025 Lipton et al.
2025/0200901 A1 6/2025 Ren et al.
2025/0205597 A1 6/2025 Hertensteiner et al.
2025/0209744 A1 6/2025 Piemonte et al.
2025/0209753 A1 6/2025 Piemonte et al.
2025/0224811 A1 7/2025 Lindmeier et al.
2025/0232541 A1 7/2025 Chand et al.
2025/0245938 A1 7/2025 Kim et al.
2025/0258577 A1 8/2025 Palangie et al.
2025/0278134 A1 9/2025 Pastrana Vicente et al.
2025/0278166 A1 9/2025 Mckenzie et al.
2025/0278907 A1 9/2025 Pazmino et al.
2025/0284344 A1 9/2025 Sundstrom et al.
2025/0291470 A1 9/2025 Hylak et al.
2025/0306727 A1 10/2025 Kawashima et al.

(56) References Cited

U.S. PATENT DOCUMENTS

| | | | |
|---|---|---|---|
| 2025/0322612 | A1 | 10/2025 | Cerra et al. |
| 2025/0348186 | A1 | 11/2025 | Krivoruchko |
| 2025/0350902 | A1 | 11/2025 | Keatch et al. |
| 2025/0356596 | A1 | 11/2025 | O'leary et al. |
| 2025/0377719 | A1 | 12/2025 | Ravasz et al. |
| 2025/0377759 | A1 | 12/2025 | Pazmino et al. |
| 2025/0377760 | A1 | 12/2025 | Mckenzie et al. |
| 2025/0378595 | A1 | 12/2025 | Ford et al. |
| 2025/0378629 | A1 | 12/2025 | Ravasz et al. |
| 2025/0378645 | A1 | 12/2025 | Holder et al. |
| 2026/0004531 | A1 | 1/2026 | Chiu et al. |
| 2026/0011070 | A1 | 1/2026 | Lemay et al. |
| 2026/0023457 | A1 | 1/2026 | Chand et al. |

FOREIGN PATENT DOCUMENTS

| | | | |
|---|---|---|---|
| CN | 110543230 | A | 12/2019 |
| CN | 110830786 | A | 2/2020 |
| CN | 111033572 | A | 4/2020 |
| CN | 111213183 | A | 5/2020 |
| CN | 111488056 | A | 8/2020 |
| CN | 111641843 | A | 9/2020 |
| CN | 113168737 | A | 7/2021 |
| CN | 114327026 | A | 4/2022 |
| CN | 114402275 | A | 4/2022 |
| CN | 114402290 | A | 4/2022 |
| CN | 114546102 | A | 5/2022 |
| DE | 102020101675 | A1 | 7/2020 |
| EP | 3306444 | A1 | 4/2018 |
| JP | 2004-510239 | A | 4/2004 |
| JP | 2014-164654 | A | 9/2014 |
| JP | 2015-79354 | A | 4/2015 |
| JP | 2015-109626 | A | 6/2015 |
| JP | 2015-222565 | A | 12/2015 |
| JP | 2016-4402 | A | 1/2016 |
| JP | 2017-69687 | A | 4/2017 |
| JP | 2017-525002 | A | 8/2017 |
| JP | 6438869 | B2 | 12/2018 |
| JP | 2019-515361 | A | 6/2019 |
| JP | 2019-159461 | A | 9/2019 |
| JP | 2023-503257 | A | 1/2023 |
| KR | 10-2011-0128487 | A | 11/2011 |
| KR | 10-2013-0010012 | A | 1/2013 |
| KR | 10-2014-0073730 | A | 6/2014 |
| KR | 10-2020-0140378 | A | 12/2020 |
| KR | 10-2021-0092614 | A | 7/2021 |
| KR | 10-2021-0123530 | A | 10/2021 |
| KR | 10-2022-0030177 | A | 3/2022 |
| KR | 10-2025-0117234 | A | 8/2025 |
| WO | 2013/184447 | A2 | 12/2013 |
| WO | 2014/156389 | A1 | 10/2014 |
| WO | 2014/190106 | A1 | 11/2014 |
| WO | 2015/130150 | A1 | 9/2015 |
| WO | 2015/192117 | A1 | 12/2015 |
| WO | 2016/014877 | A1 | 1/2016 |
| WO | 2016/126522 | A1 | 8/2016 |
| WO | 2016/170717 | A1 | 10/2016 |
| WO | 2018/005557 | A1 | 1/2018 |
| WO | 2018/106299 | A1 | 6/2018 |
| WO | 2018/116556 | A1 | 6/2018 |
| WO | 2018/125428 | A1 | 7/2018 |
| WO | 2018/213801 | A1 | 11/2018 |
| WO | 2018/224847 | A2 | 12/2018 |
| WO | 2019/067902 | A1 | 4/2019 |
| WO | 2019/152286 | A2 | 8/2019 |
| WO | 2020/105349 | A1 | 5/2020 |
| WO | 2020/247256 | A1 | 12/2020 |
| WO | 2021/203856 | A1 | 10/2021 |
| WO | 2022/056036 | A2 | 3/2022 |
| WO | 2022/204664 | A1 | 9/2022 |
| WO | 2022/225795 | A1 | 10/2022 |
| WO | 2024/064036 | A1 | 3/2024 |
| WO | 2024/064373 | A1 | 3/2024 |
| WO | 2025/159543 | A1 | 7/2025 |

OTHER PUBLICATIONS

Extended European Search Report received for European Patent Application No. 25200319.9, mailed on Nov. 24, 2025, 10 pages.
Notice of Allowance received for U.S. Appl. No. 18/427,434, mailed on Sep. 17, 2025, 10 pages.
Non-Final Office Action received for U.S. Appl. No. 18/473,192, mailed on Jan. 14, 2026, 11 pages.
Non-Final Office Action received for U.S. Appl. No. 18/668,049, mailed on Dec. 16, 2025, 11 pages.
Notice of Allowance received for U.S. Appl. No. 18/473,197, mailed on Jan. 27, 2026, 11 pages.
Extended European Search Report received for European Patent Application No. 25174955.2, mailed on Jun. 25, 2025, 12 pages.
Notice of Allowance received for U.S. Appl. No. 18/057,172, mailed on Jul. 15, 2025, 12 pages.
Notice of Allowance received for U.S. Appl. No. 18/894,997, mailed on Dec. 23, 2025, 12 pages.
Final Office Action received for U.S. Appl. No. 18/587,815, mailed on Jan. 7, 2026, 13 pages.
Non-Final Office Action received for U.S. Appl. No. 18/473,198, mailed on Jul. 15, 2025, 13 pages.
Non-Final Office Action received for U.S. Appl. No. 18/902,541, mailed on Nov. 28, 2025, 13 pages.
Notice of Allowance received for U.S. Appl. No. 18/174,403, mailed on Aug. 21, 2025, 13 pages.
Notice of Allowance received for U.S. Appl. No. 18/894,997, mailed on Aug. 12, 2025, 13 pages.
Non-Final Office Action received for U.S. Appl. No. 18/439,679, mailed on Jan. 30, 2026, 14 pages.
Notice of Allowance received for U.S. Appl. No. 18/322,469, mailed on Jul. 7, 2025, 14 pages.
Notice of Allowance received for U.S. Appl. No. 18/473,184, mailed on Dec. 2, 2025, 14 pages.
Non-Final Office Action received for U.S. Appl. No. 18/733,497, mailed on Jan. 28, 2026, 15 pages.
Non-Final Office Action received for U.S. Appl. No. 18/777,296, mailed on Jan. 7, 2026, 15 pages.
Non-Final Office Action received for U.S. Appl. No. 18/473,195, mailed on Jun. 27, 2025, 16 pages.
Non-Final Office Action received for U.S. Appl. No. 18/587,815, mailed on Sep. 25, 2025, 16 pages.
Non-Final Office Action received for U.S. Appl. No. 18/671,943, mailed on Jan. 7, 2026, 16 pages.
Final Office Action received for U.S. Appl. No. 18/473,195, mailed on Nov. 26, 2025, 17 pages.
Non-Final Office Action received for U.S. Appl. No. 18/473,242, mailed on Sep. 5, 2025, 17 pages.
Non-Final Office Action received for U.S. Appl. No. 18/472,073, mailed on Dec. 3, 2025, 18 pages.
Non-Final Office Action received for U.S. Appl. No. 18/473,190, mailed on Dec. 10, 2025, 18 pages.
Non-Final Office Action received for U.S. Appl. No. 18/916,583, mailed on Oct. 2, 2025, 18 pages.
Non-Final Office Action received for U.S. Appl. No. 18/733,802, mailed on Jan. 30, 2026, 19 pages.
Corrected Notice of Allowability received for U.S. Appl. No. 18/152,656, mailed on Jul. 22, 2025, 2 pages.
Corrected Notice of Allowability received for U.S. Appl. No. 18/157,040, mailed on Oct. 30, 2025, 2 pages.
Corrected Notice of Allowability received for U.S. Appl. No. 18/157,040, mailed on Sep. 25, 2025, 2 pages.
Corrected Notice of Allowability received for U.S. Appl. No. 18/919,095, mailed on Jan. 28, 2026, 2 pages.
Corrected Notice of Allowability received for U.S. Appl. No. 18/988,115, mailed on Jul. 15, 2025, 2 pages.
Supplemental Notice of Allowability received for U.S. Appl. No. 18/473,261, mailed on Sep. 30, 2025, 2 pages.
Final Office Action received for U.S. Appl. No. 18/473,196, mailed on Jul. 16, 2025, 20 pages.
Final Office Action received for U.S. Appl. No. 18/518,340, mailed on Oct. 31, 2025, 20 pages.

(56) References Cited

OTHER PUBLICATIONS

Non-Final Office Action received for U.S. Appl. No. 17/905,483, mailed on Jul. 15, 2025, 20 pages.
Non-Final Office Action received for U.S. Appl. No. 18/421,856, mailed on Jan. 30, 2026, 20 pages.
Non-Final Office Action received for U.S. Appl. No. 18/515,191, mailed on Oct. 21, 2025, 20 pages.
Non-Final Office Action received for U.S. Appl. No. 18/518,340, mailed on Jul. 22, 2025, 20 pages.
Final Office Action received for U.S. Appl. No. 18/317,890, mailed on Sep. 3, 2025, 22 pages.
Non-Final Office Action received for U.S. Appl. No. 18/057,172, mailed on Mar. 14, 2025, 22 pages.
Final Office Action received for U.S. Appl. No. 18/473,176, mailed on Dec. 3, 2025, 24 pages.
Non-Final Office Action received for U.S. Appl. No. 18/781,885, mailed on Jan. 28, 2026, 25 pages.
Non-Final Office Action received for U.S. Appl. No. 17/933,020, mailed on Oct. 1, 2025, 28 pages.
Non-Final Office Action received for U.S. Appl. No. 18/894,984, mailed on Nov. 28, 2025, 28 pages.
Non-Final Office Action received for U.S. Appl. No. 17/934,104, mailed on Nov. 14, 2025, 30 pages.
Final Office Action received for U.S. Appl. No. 18/298,994, mailed on Sep. 12, 2025, 32 pages.
Non-Final Office Action received for U.S. Appl. No. 18/731,022, mailed on Dec. 15, 2025, 33 pages.
Non-Final Office Action received for U.S. Appl. No. 18/587,739, mailed on Sep. 16, 2025, 34 pages.
Final Office Action received for U.S. Appl. No. 18/317,886, mailed on Dec. 17, 2025, 35 pages.
Non-Final Office Action received for U.S. Appl. No. 18/473,260, mailed on Jun. 27, 2025, 35 pages.
Final Office Action received for U.S. Appl. No. 18/473,239, mailed on Jan. 22, 2026, 38 pages.
Final Office Action received for U.S. Appl. No. 18/473,260, mailed on Oct. 22, 2025, 38 pages.
Non-Final Office Action received for U.S. Appl. No. 18/473,239, mailed on Sep. 10, 2025, 38 pages.
Non-Final Office Action received for U.S. Appl. No. 18/473,256, mailed on Nov. 4, 2025., 38 pages.
International Search Report received for PCT Application No. PCT/US2025/028705, mailed on Aug. 5, 2025, 4 pages.
International Search Report received for PCT Patent Application No. PCT/US2025/011189, mailed on Apr. 23, 2025, 4 pages.
International Search Report received for PCT Patent Application No. PCT/US2025/046438, mailed on Jan. 13, 2026, 4 pages.
Non-Final Office Action received for U.S. Appl. No. 18/473,184, mailed on Jul. 25, 2025, 40 pages.
Non-Final Office Action received for U.S. Appl. No. 18/473,155, mailed on Jul. 10, 2025, 47 pages.
Search Report received for Chinese Patent Application No. 202210728190.3, mailed on Aug. 29, 2025, 5 pages (2 pages of English Translation and 3 pages of Official Copy Only).
Corrected Notice of Allowability received for U.S. Appl. No. 18/919,095, mailed on Nov. 12, 2025, 5 pages.
Notice of Allowance received for U.S. Appl. No. 18/304,290, mailed on Jan. 8, 2026, 5 pages.
Notice of Allowance received for U.S. Appl. No. 18/473,261, mailed on Jan. 30, 2026, 5 pages.
Notice of Allowance received for U.S. Appl. No. 18/988,115, mailed on Oct. 7, 2025, 5 pages.
Non-Final Office Action received for U.S. Appl. No. 18/731,190, mailed on Jan. 28, 2025, 50 pages.
Final Office Action received for U.S. Appl. No. 18/473,155, mailed on Jan. 2, 2026, 54 pages.
International Search Report received for PCT Patent Application No. PCT/US2025/032533, mailed on Oct. 30, 2025, 6 pages.
Restriction Requirement received for U.S. Appl. No. 18/781,745, mailed on Jan. 2, 2026, 6 pages.
International Search Report received for PCT Patent Application No. PCT/US2025/032549, mailed on Oct. 23, 2025, 7 pages.
Notice of Allowance received for U.S. Appl. No. 18/304,290, mailed on Aug. 20, 2025, 7 pages.
Notice of Allowance received for U.S. Appl. No. 18/471,729, mailed on Oct. 10, 2025, 7 pages.
Notice of Allowance received for U.S. Appl. No. 18/473,196, mailed on Dec. 2, 2025, 7 pages.
Notice of Allowance received for U.S. Appl. No. 18/988,115, mailed on Jun. 30, 2025, 7 pages.
Restriction Requirement received for U.S. Appl. No. 18/473,259, mailed on Oct. 30, 2025, 7 pages.
International Search Report received for PCT Patent Application No. PCT/US2025/029736, mailed on Nov. 6, 2025, 8 pages.
Notice of Allowance received for U.S. Appl. No. 18/174,403, mailed on Dec. 17, 2025, 8 pages.
Notice of Allowance received for U.S. Appl. No. 18/473,179, mailed on Oct. 6, 2025, 8 pages.
Notice of Allowance received for U.S. Appl. No. 18/473,182, mailed on Oct. 21, 2025, 8 pages.
Notice of Allowance received for U.S. Appl. No. 18/473,198, mailed on Jan. 23, 2026, 8 pages.
Notice of Allowance received for U.S. Appl. No. 18/473,262, mailed on Oct. 7, 2025, 8 pages.
Notice of Allowance received for U.S. Appl. No. 18/645,292, mailed on Nov. 4, 2025, 8 pages.
Notice of Allowance received for U.S. Appl. No. 18/882,622, mailed on Aug. 27, 2025, 8 pages.
Notice of Allowance received for U.S. Appl. No. 18/882,622, mailed on Jan. 14, 2026, 8 pages.
Notice of Allowance received for U.S. Appl. No. 18/919,095, mailed on Jul. 22, 2025, 8 pages.
Notice of Allowance received for U.S. Appl. No. 18/919,095, mailed on Oct. 23, 2025, 8 pages.
International Search Report received for PCT Patent Application No. PCT/US2025/029209, mailed on Nov. 5, 2025, 9 pages.
Notice of Allowance received for U.S. Appl. No. 18/153,943, mailed on Oct. 7, 2025, 9 pages.
Notice of Allowance received for U.S. Appl. No. 18/317,890, mailed on Jan. 14, 2026, 9 pages.
Notice of Allowance received for U.S. Appl. No. 18/473,261, mailed on Sep. 23, 2025, 9 pages.
Common Menus in Microsoft Windows, Wikipedia, Sep. 15, 2019, Retrieved from the Internet: URL: https://en.wikipedia.org/w/index.php?title=Common_menus_in_Microsoft_Windows&oldid=921467305, 2 pages.
Drawing and Painting in VR by Using a Graphics Tablet as Virtual Paper, Reddit [online]. Reddit, Aug. 1, 2012. Available online at <https://www.reddit.com/r/oculus/comments/1wsdlv/drawing_and_painting_in_vr_by_using_a_graphics/>, [Retrieved from Internet on Nov. 18, 2025], 6 pages.
International Search Report received for PCT Patent Application No. PCT/US2022/075481, mailed on Feb. 7, 2023, 7 pages.
International Search Report received for PCT Patent Application No. PCT/US2022/076608, mailed Feb. 24, 2023, 8 pages.
International Search Report received for PCT Patent Application No. PCT/US2022/076719, mailed on Mar. 3, 2023, 8 pages.
International Search Report received for PCT Patent Application No. PCT/US2024/013602, mailed on Apr. 29, 2024, 4 pages.
Notice of Allowance received for U.S. Appl. No. 17/650,775, mailed on Jan. 25, 2024, 10 pages.
Notice of Allowance received for U.S. Appl. No. 17/650,775, mailed on Sep. 18, 2023, 10 pages.
Notice of Allowance received for U.S. Appl. No. 17/933,707, mailed on Jun. 28, 2024, 8 pages.
Notice of Allowance received for U.S. Appl. No. 17/933,707, mailed on Mar. 6, 2024, 9 pages.
Notice of Allowance received for U.S. Appl. No. 18/182,304, mailed on Jan. 24, 2024, 9 pages.
Notice of Allowance received for U.S. Appl. No. 18/182,304, mailed on Oct. 2, 2023, 9 pages.
VR Design Best Practices, LeapMotion, Aug. 29, 2015, 31 pages.

(56) References Cited

OTHER PUBLICATIONS

You Can Bring Your Real Phone With You Into VR!, YouTube [online]. YouTube, Mar. 28, 2023. Available online at <https://www.youtube.com/watch?v=2niOsrGVUq8>, [Retrieved from Internet on Nov. 18, 2025], 2 pages.
Banta et al., "A Next-Best-View System for Autonomous 3-D Object Reconstruction", IEEE Transactions on Systems, Man, and Cybernetics—Part A: Systems and Humans vol. 30, No. 5, Sep. 30, 2000, pp. 589-598.
Bermejo et al., "Exploring Button Designs for Mid-air Interaction in Virtual Reality: A Hexa-metric Evaluation of Key Representations and Multi-modal Cues", Proceedings of the ACM on Human-Computer Interaction, vol. 5, No. EICS, Article 194, May 27, 2021, 26 pages.
Beruscha et al., "An Evaluation of the Influence of Haptic Feedback on Gaze Behavior during In-Car Interaction with Touch Screens", IEEE World Haptics Conference, Jun. 2017, pp. 201-206.
Cybersence, "Leap Motion—Virtual Wearables", YouTube, Mar. 26, 2018, Retrieved from the Internet: URL: https://www.youtube.com/watch?v=j81-Y60q-zl, 2 pages.
Dudley et al., "Fast and Precise Touch-Based Text Entry for Head-Mounted Augmented Reality with Variable Occlusion", ACM Transactions on Computer-Human Interaction (TOCHI), vol. 25, No. 6, Article 30, Dec. 13, 2018, 40 pages.
Ghosh et al., "NotifiVIR: Exploring Interruptions and Notifications in Virtual Reality", IEEE transactions on visualization and computer graphics, vol. 24, No. 4, Apr. 2018, pp. 1447-1456.
Kim et al., "Pseudo-haptic Button for Improving User Experience of Mid-air Interaction in VR", International Journal of Human-Computer Studies, vol. 168, No. 102907, Aug. 9, 2022, 11 pages.
Kim et al., "Virtual Object Sizes for Efficient and Convenient Mid-air Manipulation", The Visual Computer, vol. 38, No. 9, Jul. 1, 2022, pp. 3463-3474.
Kurzhals et al., "A View on the Viewer: Gaze-Adaptive Captions for Videos", CHI 2020, Apr. 25-30, 2020, pp. 1-12.
Lang, "Leap Motion 'Virtual Wearable' AR Prototype is a Potent Glimpse at the Future of Your Smartphone", Mar. 24, 2018, Retrieved from the Internet: URL: https://www.roadtovr.com/leap-motion-virtual-wearable-ar-prototype-glimpse-of-future-smartphone/, [retrieved on Sep. 1, 2020], 6 pages.
Lee et al., "UbiPoint: Towards Non-intrusive Mid-Air Interaction for Hardware Constrained Smart Glasses", In Proceedings of the 11th ACM Multimedia Systems Conference, May 27, 2020, pp. 190-201.
Li et al., "Gaze Augmented Hand-Based Kinesthetic Interaction: What You See is What You Feel", IEEE, Transactions on Haptics, vol. 12, No. 2, Feb. 1, 2019, pp. 114-127.
Medeiros et al., "Promoting Reality Awareness in Virtual Reality through Proxemics", IEEE Virtual Reality and 3D User Interfaces (VR), Mar. 27-Apr. 1, 2021, 11 pages.
Mendes et al., "Mid-Air Interactions Above Stereoscopic Interactive Tables", IEEE Symposium on 3D User Interfaces (3DUI), Mar. 29-30, 2014, pp. 3-10.
Nunez Angulo et al., "Manual for the Design of Didactic Units in Augmented Reality Using the Cospaces EDU Application", 2020, 75 pages.
Pfeuffer et al., "Gaze+touch vs. Touch: What's the Trade-off When Using Gaze to Extend Touch to Remote Displays?", Advances In Databases And Information Systems, Aug. 30, 2015, pp. 349-367.
Speicher et al., "Pseudo-haptic Controls for Mid-air Finger-based Menu Interaction", CHI'19 Extended Abstracts, May 4-9, 2019, Conference on Human Factors in Computing Systems, May 2, 2019, pp. 1-6.
Zhuang et al., "Distributed Architecture for 3D Graphics Rendering in Collaborative System", Computer and Modernization, Issue 4, 2017, 5 pages (1 page of English Abstract and 4 pages of Official Copy).

* cited by examiner

SYSTEM AND METHOD OF APPLICATION-BASED THREE-DIMENSIONAL REFINEMENT IN MULTI-USER COMMUNICATION SESSIONS

CROSS-REFERENCE TO RELATED APPLICATIONS

This application is a continuation of U.S. application Ser. No. 18/896,227, filed Sep. 25, 2024 and published on Jan. 9, 2025 as U.S. Publication No. 2025-0013344, which is a continuation of U.S. application Ser. No. 18/465,098, filed Sep. 11, 2023 and issued on Oct. 8, 2024 as U.S. Pat. No. 12,112,011, which claims the benefit of U.S. Provisional Application No. 63/375,991, filed Sep. 16, 2022, the contents of which are herein incorporated by reference in their entireties for all purposes.

FIELD OF THE DISCLOSURE

This relates generally to systems and methods of application-based three-dimensional refinement of objects in multi-user communication sessions.

BACKGROUND OF THE DISCLOSURE

Some computer graphical environments provide two-dimensional and/or three-dimensional environments where at least some objects displayed for a user's viewing are virtual and generated by a computer. In some examples, the three-dimensional environments are presented by multiple devices communicating in a multi-user communication session. In some examples, an avatar (e.g., a representation) of each user participating in the multi-user communication session (e.g., via the computing devices) is displayed in the three-dimensional environment of the multi-user communication session. In some examples, content can be shared in the three-dimensional environment for viewing and interaction by multiple users participating in the multi-user communication session. In some examples, shared content and/or avatars corresponding to the users participating in the multi-user communication session can be moved within the three-dimensional environment.

SUMMARY OF THE DISCLOSURE

Some examples of the disclosure are directed to systems and methods for application-based spatial refinement in a multi-user communication session. In some examples, a first electronic device and a second electronic device may be communicatively linked in a multi-user communication session. In some examples, the first electronic device may present a three-dimensional environment including a first shared object and an avatar corresponding to a user of the second electronic device. In some examples, while the first electronic device is presenting the three-dimensional environment, the first electronic device may receive a first input corresponding to a request to move the first shared object in a first manner in the three-dimensional environment. In some examples, in accordance with a determination that the first shared object is an object of a first type, the first electronic device may move the first shared object and the avatar in the three-dimensional environment in the first manner in accordance with the first input. In some examples, in accordance with a determination that the first shared object is an object of a second type, different from the first type, and the first input is a first type of input, the first electronic device may move the first shared object in the three-dimensional environment in the first manner in accordance with the first input, without moving the avatar.

In some examples, an object of the first type corresponds to an object that has a horizontal orientation in the three-dimensional environment relative to a viewpoint of a user of the first electronic device. In some examples, an object of the second type corresponds to an object that has a vertical orientation in the three-dimensional environment relative to a viewpoint of a user of the first electronic device. In some examples, the first manner of movement directed to the first shared object includes forward or backward movement of the first shared object in the three-dimensional environment relative to the viewpoint of the user of the first electronic device. In some examples, if the first shared object is an object of the second type, the first electronic device scales the first shared object in the three-dimensional environment when the first shared object is moved in the three-dimensional environment in the first manner in accordance with the first input.

The full descriptions of these examples are provided in the Drawings and the Detailed Description, and it is understood that this Summary does not limit the scope of the disclosure in any way.

BRIEF DESCRIPTION OF THE DRAWINGS

For improved understanding of the various examples described herein, reference should be made to the Detailed Description below along with the following drawings. Like reference numerals often refer to corresponding parts throughout the drawings.

DETAILED DESCRIPTION

Figure 1:
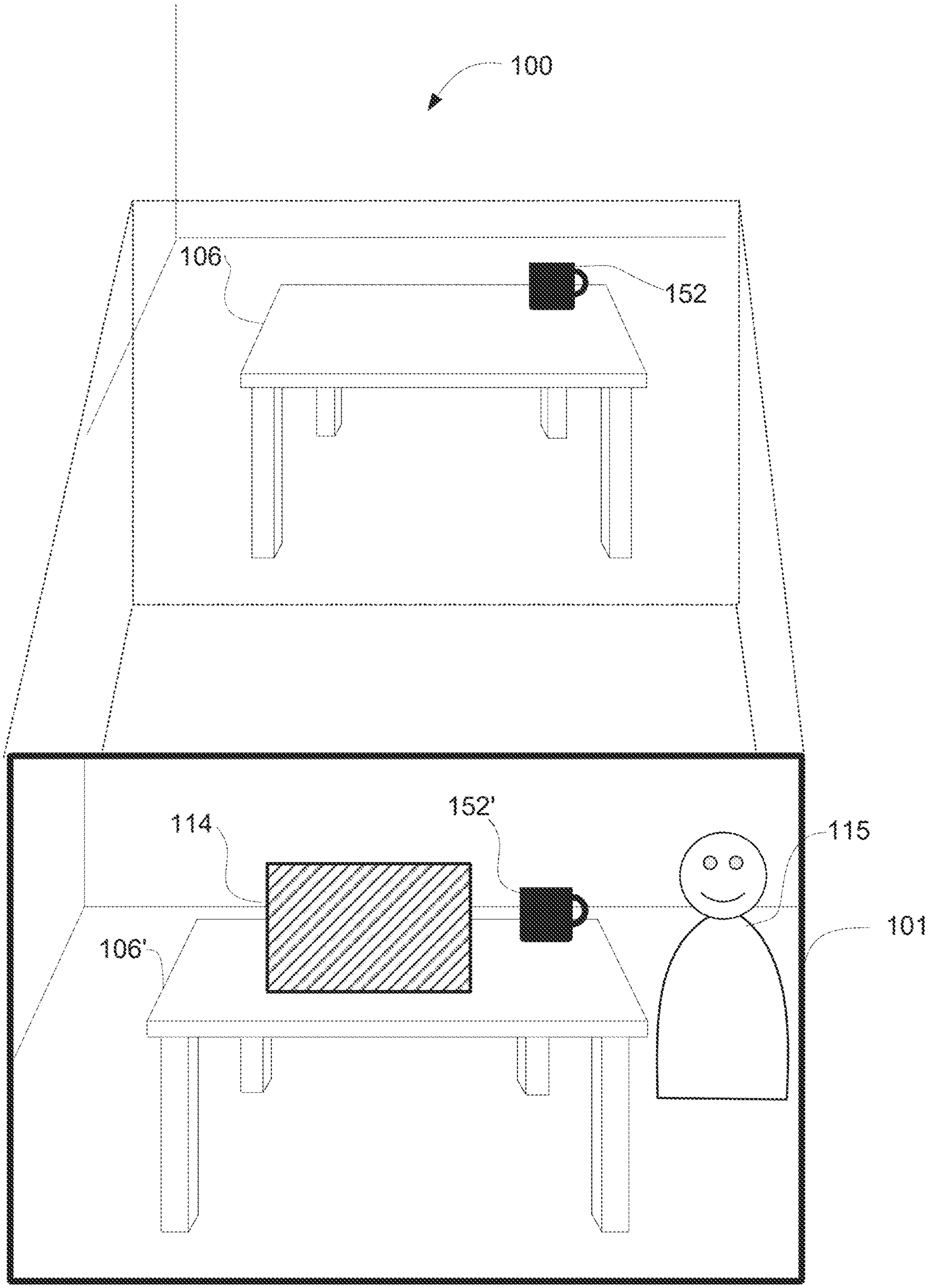
FIG. 1 illustrates an electronic device presenting an extended reality environment according to some examples of the disclosure.

Some examples of the disclosure are directed to systems and methods for application-based spatial refinement in a multi-user communication session. In some examples, a first electronic device and a second electronic device may be communicatively linked in a multi-user communication session. In some examples, the first electronic device may present a three-dimensional environment including a first shared object and an avatar corresponding to a user of the second electronic device. In some examples, while the first electronic device is presenting the three-dimensional environmentronment, the first electronic device may receive a first input corresponding to a request to move the first shared object in a first manner in the three-dimensional environment. In some examples, in accordance with a determination that the first shared object is an object of a first type, the first electronic device may move the first shared object and the avatar in the three-dimensional environment in the first manner in accordance with the first input. In some examples, in accordance with a determination that the first shared object is an object of a second type, different from the first type, and the first input is a first type of input, the first electronic device may move the first shared object in the three-dimensional environment in the first manner in accordance with the first input, without moving the avatar.

In some examples, an object of the first type corresponds to an object that has a horizontal orientation in the three-dimensional environment relative to a viewpoint of a user of the first electronic device. In some examples, an object of the second type corresponds to an object that has a vertical orientation in the three-dimensional environment relative to a viewpoint of a user of the first electronic device. In some examples, the first manner of movement directed to the first shared object includes forward or backward movement of the first shared object in the three-dimensional environment relative to the viewpoint of the user of the first electronic device. In some examples, if the first shared object is an object of the second type, the first electronic device scales the first shared object in the three-dimensional environment when the first shared object is moved in the three-dimensional environment in the first manner in accordance with the first input.

In some examples, performing spatial refinement in the three-dimensional environment while in the multi-user communication session may include interaction with one or more objects in the three-dimensional environment. For example, initiation of spatial refinement in the three-dimensional environment can include interaction with one or more virtual objects displayed in the three-dimensional environment. In some examples, a user's gaze may be tracked by the electronic device as an input for identifying one or more virtual objects targeted for selection when initiating spatial refinement while in the multi-user communication session. For example, gaze can be used to identify one or more virtual objects targeted for selection using another selection input. In some examples, a virtual object may be selected using hand-tracking input detected via an input device in communication with the electronic device. In some examples, objects displayed in the three-dimensional environment may be moved and/or reoriented in the three-dimensional environment in accordance with movement input detected via the input device.

FIG. 1 illustrates an electronic device 101 presenting an extended reality (XR) environment (e.g., a computer-generated environment) according to some examples of the disclosure. In some examples, electronic device 101 is a hand-held or mobile device, such as a tablet computer, laptop computer, smartphone, or head-mounted display. Examples of device 101 are described below with reference to the architecture block diagram of FIG. 2. As shown in FIG. 1, electronic device 101, table 106, and coffee mug 152 are located in the physical environment 100. The physical environment may include physical features such as a physical surface (e.g., floor, walls) or a physical object (e.g., table, lamp, etc.). In some examples, electronic device 101 may be configured to capture images of physical environment 100 including table 106 and coffee mug 152 (illustrated in the field of view of electronic device 101). In some examples, in response to a trigger, the electronic device 101 may be configured to display a virtual object 114 (e.g., two-dimensional virtual content) in the computer-generated environment (e.g., represented by a rectangle illustrated in FIG. 1) that is not present in the physical environment 100, but is displayed in the computer-generated environment positioned on (e.g., anchored to) the top of a computer-generated representation 106' of real-world table 106. For example, virtual object 114 can be displayed on the surface of the computer-generated representation 106' of the table in the computer-generated environment next to the computer-generated representation 152' of real-world coffee mug 152 displayed via device 101 in response to detecting the planar surface of table 106 in the physical environment 100.

It should be understood that virtual object 114 is a representative virtual object and one or more different virtual objects (e.g., of various dimensionality such as two-dimensional or three-dimensional virtual objects) can be included and rendered in a three-dimensional computer-generated environment. For example, the virtual object can represent an application or a user interface displayed in the computer-generated environment. In some examples, the virtual object can represent content corresponding to the application and/or displayed via the user interface in the computer-generated environment. In some examples, the virtual object 114 is optionally configured to be interactive and responsive to user input, such that a user may virtually touch, tap, move, rotate, or otherwise interact with, the virtual object. In some examples, the virtual object 114 may be displayed in a three-dimensional computer-generated environment within a multi-user communication session ("multi-user communication session," "communication session"). In some such examples, as described in more detail below, the virtual object 114 may be viewable and/or configured to be interactive and responsive to multiple users and/or user input provided by multiple users, respectively, represented by virtual representations (e.g., avatars, such as avatar 115). For example, the virtual object 114 may be shared among multiple users in the communication session such that input directed to the virtual object 114 is optionally viewable by the multiple users. Additionally, it should be understood, that the 3D environment (or 3D virtual object) described herein may be a representation of a 3D environment (or three-dimensional virtual object) projected or presented at an electronic device.

In the discussion that follows, an electronic device that is in communication with a display generation component and one or more input devices is described. It should be understood that the electronic device optionally is in communication with one or more other physical user-interface devices, such as touch-sensitive surface, a physical keyboard, a mouse, a joystick, a hand tracking device, an eye tracking device, a stylus, etc. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

Figure 2:
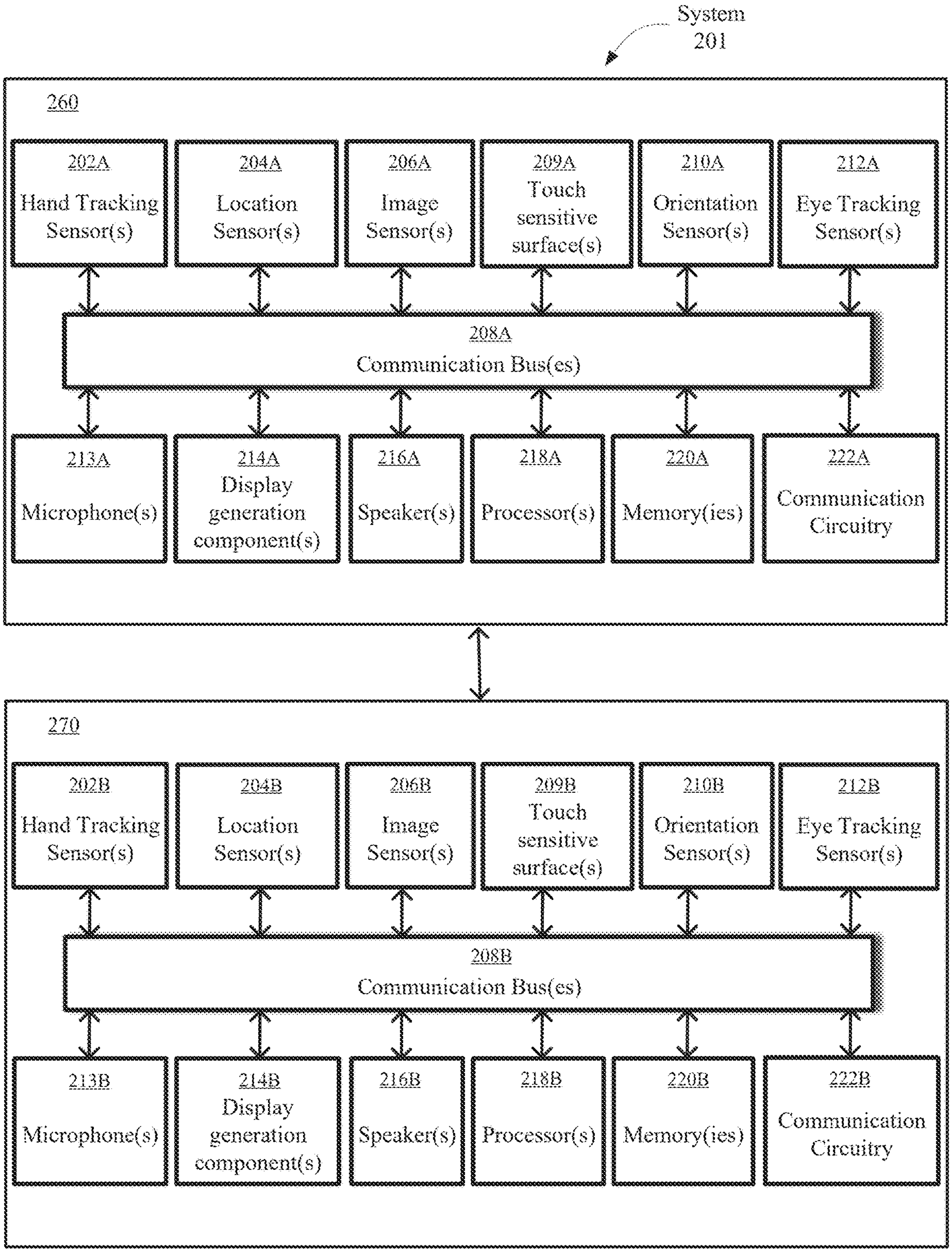
FIG. 2 illustrates a block diagram of an exemplary architecture for a system according to some examples of the disclosure.

FIG. 2 illustrates a block diagram of an exemplary architecture for a system 201 according to some examples of the disclosure. In some examples, system 201 includes multiple devices. For example, the system 201 includes a first electronic device 260 and a second electronic device 270, wherein the first electronic device 260 and the second electronic device 270 are in communication with each other. In some examples, the first electronic device 260 and the second electronic device 270 are a portable device, such as a mobile phone, smart phone, a tablet computer, a laptop computer, an auxiliary device in communication with another device, etc., respectively.

As illustrated in FIG. 2, the first electronic device 260 optionally includes various sensors (e.g., one or more hand tracking sensor(s) 202A, one or more location sensor(s) 204A, one or more image sensor(s) 206A, one or more touch-sensitive surface(s) 209A, one or more motion and/or orientation sensor(s) 210A, one or more eye tracking sensor(s) 212A, one or more microphone(s) 213A or other audio sensors, etc.), one or more display generation component(s) 214A, one or more speaker(s) 216A, one or more processor(s) 218A, one or more memories 220A, and/or communication circuitry 222A. In some examples, the second electronic device 270 optionally includes various sensors (e.g., one or more hand tracking sensor(s) 202B, one or more location sensor(s) 204B, one or more image sensor(s) 206B, one or more touch-sensitive surface(s) 209B, one or more motion and/or orientation sensor(s) 210B, one or more eye tracking sensor(s) 212B, one or more microphone(s) 213B or other audio sensors, etc.), one or more display generation component(s) 214B, one or more speaker(s) 216, one or more processor(s) 218B, one or more memories 220B, and/or communication circuitry 222B. One or more communication buses 208A and 208B are optionally used for communication between the above-mentioned components of devices 260 and 270, respectively. First electronic device 260 and second electronic device 270 optionally communicate via a wired or wireless connection (e.g., via communication circuitry 222A-222B) between the two devices.

Communication circuitry 222A, 222B optionally includes circuitry for communicating with electronic devices, networks, such as the Internet, intranets, a wired network and/or a wireless network, cellular networks, and wireless local area networks (LANs). Communication circuitry 222A, 222B optionally includes circuitry for communicating using near-field communication (NFC) and/or short-range communication, such as Bluetooth®.

Processor(s) 218A, 218B include one or more general processors, one or more graphics processors, and/or one or more digital signal processors. In some examples, memory 220A, 220B is a non-transitory computer-readable storage medium (e.g., flash memory, random access memory, or other volatile or non-volatile memory or storage) that stores computer-readable instructions configured to be executed by processor(s) 218A, 218B to perform the techniques, processes, and/or methods described below. In some examples, memory 220A, 220B can include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

In some examples, display generation component(s) 214A, 214B include a single display (e.g., a liquid-crystal display (LCD), organic light-emitting diode (OLED), or other types of display). In some examples, display generation component(s) 214A, 214B includes multiple displays. In some examples, display generation component(s) 214A, 214B can include a display with touch capability (e.g., a touch screen), a projector, a holographic projector, a retinal projector, etc. In some examples, devices 260 and 270 include touch-sensitive surface(s) 209A and 209B, respectively, for receiving user inputs, such as tap inputs and swipe inputs or other gestures. In some examples, display generation component(s) 214A,214B and touch-sensitive surface(s) 209A, 209B form touch-sensitive display(s) (e.g., a touch screen integrated with devices 260 and 270, respectively, or external to devices 260 and 270, respectively, that is in communication with devices 260 and 270).

Devices 260 and 270 optionally includes image sensor(s) 206A and 206B, respectively. Image sensors(s) 206A/206B optionally include one or more visible light image sensors, such as charged coupled device (CCD) sensors, and/or complementary metal-oxide-semiconductor (CMOS) sensors operable to obtain images of physical objects from the real-world environment. Image sensor(s) 206A/206B also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 206A/206B also optionally include one or more cameras configured to capture movement of physical objects in the real-world environment. Image sensor(s) 206A/206B also optionally include one or more depth sensors configured to detect the distance of physical objects from device 260/270. In some examples, information from one or more depth sensors can allow the device to identify and differentiate objects in the real-world environment from other objects in the real-world environment. In some examples, one or more depth sensors can allow the device to determine the texture and/or topography of objects in the real-world environment.

In some examples, devices 260 and 270 use CCD sensors, event cameras, and depth sensors in combination to detect the physical environment around devices 260 and 270. In some examples, image sensor(s) 206A/206B include a first image sensor and a second image sensor. The first image sensor and the second image sensor work in tandem and are optionally configured to capture different information of physical objects in the real-world environment. In some examples, the first image sensor is a visible light image sensor and the second image sensor is a depth sensor. In some examples, device 260/270 uses image sensor(s) 206A/206B to detect the position and orientation of device 260/270 and/or display generation component(s) 214A/214B in the real-world environment. For example, device 260/270 uses image sensor(s) 206A/206B to track the position and orientation of display generation component(s) 214A/214B relative to one or more fixed objects in the real-world environment.

In some examples, device 260/270 includes microphone(s) 213A/213B or other audio sensors. Device 260/270 uses microphone(s) 213A/213B to detect sound from the user and/or the real-world environment of the user. In some examples, microphone(s) 213A/213B includes an array of microphones (a plurality of microphones) that optionally operate in tandem, such as to identify ambient noise or to locate the source of sound in space of the real-world environment.

Device 260/270 includes location sensor(s) 204A/204B for detecting a location of device 260/270 and/or display generation component(s) 214A/214B. For example, location sensor(s) 204A/204B can include a GPS receiver that receives data from one or more satellites and allows device 260/270 to determine the device's absolute position in the physical world.

Device 260/270 includes orientation sensor(s) 210A/210B for detecting orientation and/or movement of device 260/270 and/or display generation component(s) 214A/214B. For example, device 260/270 uses orientation sensor(s) 210A/210B to track changes in the position and/or orientation of device 260/270 and/or display generation component(s) 214A/214B, such as with respect to physical objects in the real-world environment. Orientation sensor(s) 210A/210B optionally include one or more gyroscopes and/or one or more accelerometers.

Device 260/270 includes hand tracking sensor(s) 202A/202B and/or eye tracking sensor(s) 212A/212B, in some examples. Hand tracking sensor(s) 202A/202B are configured to track the position/location of one or more portions of the user's hands, and/or motions of one or more portions of the user's hands with respect to the extended reality environment, relative to the display generation component(s) 214A/214B, and/or relative to another defined coordinate system. Eye tracking sensor(s) 212A/212B are configured to track the position and movement of a user's gaze (eyes, face, or head, more generally) with respect to the real-world or extended reality environment and/or relative to the display generation component(s) 214A/214B. In some examples, hand tracking sensor(s) 202A/202B and/or eye tracking sensor(s) 212A/212B are implemented together with the display generation component(s) 214A/214B. In some examples, the hand tracking sensor(s) 202A/202B and/or eye tracking sensor(s) 212A/212B are implemented separate from the display generation component(s) 214A/214B.

In some examples, the hand tracking sensor(s) 202A/202B can use image sensor(s) 206A/206B (e.g., one or more IR cameras, 3D cameras, depth cameras, etc.) that capture three-dimensional information from the real-world including one or more hands (e.g., of a human user). In some examples, the hands can be resolved with sufficient resolution to distinguish fingers and their respective positions. In some examples, one or more image sensor(s) 206A/206B are positioned relative to the user to define a field of view of the image sensor(s) 206A/206B and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures, touch, tap, etc.) can be advantageous in that it does not require the user to touch, hold or wear any sort of beacon, sensor, or other marker.

In some examples, eye tracking sensor(s) 212A/212B includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some examples, both eyes are tracked separately by respective eye tracking cameras and illumination sources, and a focus/gaze can be determined from tracking both eyes. In some examples, one eye (e.g., a dominant eye) is tracked by a respective eye tracking camera/illumination source(s).

Device 260/270 and system 201 are not limited to the components and configuration of FIG. 2, but can include fewer, other, or additional components in multiple configurations. In some examples, system 201 can be implemented in a single device. A person or persons using system 201, is optionally referred to herein as a user or users of the device(s).

Attention is now directed towards exemplary concurrent displays of a three-dimensional environment on a first electronic device (e.g., corresponding to device 260) and a second electronic device (e.g., corresponding to device 270). As discussed below, the first electronic device may be in communication with the second electronic device in a multi-user communication session. In some examples, an avatar of (e.g., a virtual representation of) a user of the first electronic device may be displayed in the three-dimensional environment at the second electronic device, and an avatar of a user of the second electronic device may be displayed in the three-dimensional environment at the first electronic device. In some examples, content may be shared and interactive within the three-dimensional environment while the first electronic device and the second electronic device are in the multi-user communication session.

FIGS. 3A-3G illustrate example interactions involving application-based spatial refinement in a multi-user communication session according to some examples of the disclosure. In some examples, a first electronic device 360 may present a three-dimensional environment 350A, and a second electronic device 370 may present a three-dimensional environment 350B. The first electronic device 360 and the second electronic device 370 may be similar to device 101 or 260/270, and/or may be a head mountable system/device and/or projection-based system/device (including a hologram-based system/device) configured to generate and present a three-dimensional environment, such as, for example, heads-up displays (HUDs), head mounted displays (HMDs), windows having integrated display capability, or displays formed as lenses designed to be placed on a person's eyes (e.g., similar to contact lenses), respectively. In the example of FIGS. 3A-3G, a first user is optionally wearing the first electronic device 360 and a second user is optionally wearing the second electronic device 370, such that the three-dimensional environments 350A/350B can be defined by X, Y and Z axes as viewed from a perspective of the electronic devices (e.g., a viewpoint associated with the users of the electronic devices 360/370).

Figure 3A:
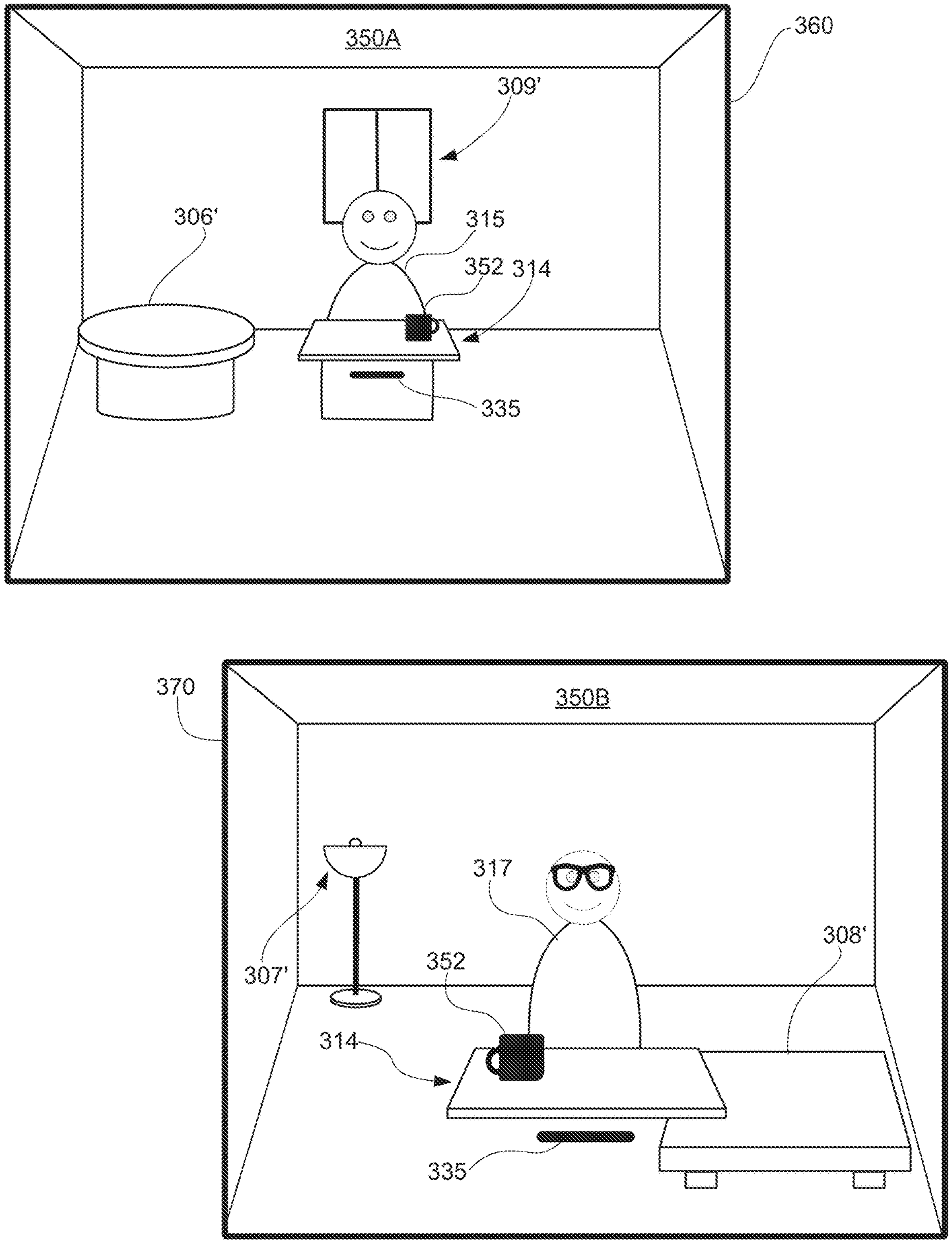
FIGS. 3A-3G illustrate example interactions involving application-based spatial refinement in a multi-user communication session according to some examples of the disclosure.

As shown in FIG. 3A, the first electronic device 360 may be in a first physical environment that includes a table 306 and a window 309. Thus, the three-dimensional environment 350A presented using the first electronic device 360 optionally includes captured portions of the physical environment surrounding the first electronic device 360, such as a representation of the table 306' and a representation of the window 309'. Similarly, the second electronic device 370 may be in a second physical environment, different from the first physical environment (e.g., separate from the first physical environment), that includes a floor lamp 307 and a coffee table 308. Thus, the three-dimensional environment 350B presented using the second electronic device 370 optionally includes captured portions of the physical environment surrounding the second electronic device 370, such as a representation of the floor lamp 307' and a representation of the coffee table 308'. Additionally, the three-dimensional environments 350A and 350B may include representations of the floor, ceiling, and walls of the room in which the first electronic device 360 and the second electronic device 370 are located, respectively.

As mentioned above, in some examples, the first electronic device 360 may enter a multi-user communication session with the second electronic device 370. For example, in the multi-user communication session, the first electronic device 360 and the second electronic device 370 (e.g., via communication circuitry 222A/222B of FIG. 2) are configured to present a shared three-dimensional environment that includes one or more shared virtual objects (e.g., shared content, such as images, video, audio and the like, representations of user interfaces of applications, three-dimensional models, etc.). As used herein, the term "shared three-dimensional environment" refers to a three-dimensional environment that is independently presented, displayed, and/or visible at two or more electronic devices via which content, applications, data, and the like may be shared and/or presented to users of the two or more electronic devices.

In some examples, while two or more electronic devices are communicatively linked in a multi-user communication session, avatars corresponding to the users of the two or more electronic devices are optionally displayed within the shared three-dimensional environments presented at the two or more electronic devices. As shown in FIG. 3A, the first electronic device 360 optionally displays an avatar 315 corresponding to the user of the second electronic device 370 within the three-dimensional environment 350A. Similarly, the second electronic device 370 optionally displays an avatar 317 corresponding to the user of the first electronic device 360 within the three-dimensional environment 350B.

In some examples, the avatars 315/317 are a representation (e.g., a full-body rendering) of each of the users of the electronic devices 370/360. In some examples, the avatars 315/317 are each a representation of a portion (e.g., a rendering of a head, face, head and torso, etc.) of the users of the electronic devices 370/360. In some examples, the avatars 315/317 are a user-personalized, user-selected, and/or user-created representation displayed in the three-dimensional environments 350A/350B that is representative of the users of the electronic devices 370/360. It should be understood that, while the avatars 315/317 illustrated in FIG. 3A correspond to simplified representations of a full body of each of the users of the electronic devices 370/360, respectively, alternative avatars may be provided, such as any of those described above.

In some examples, the presentation of avatars 315/317 as part of the shared three-dimensional environment is optionally accompanied by an audio effect corresponding to a voice of the users of the electronic devices 370/360. For example, the avatar 315 displayed in the three-dimensional environment 350A using the first electronic device 360 is optionally accompanied by an audio effect corresponding to the voice of the user of the second electronic device 370. In some such examples, when the user of the second electronic device 370 speaks, the voice of the user may be detected by the second electronic device 370 (e.g., via the microphone(s) 213B in FIG. 2) and transmitted to the first electronic device 360 (e.g., via the communication circuitry 222B/222A), such that the detected voice of the user of the second electronic device 370 may be presented as audio (e.g., using speaker(s) 216A) to the user of the first electronic device 360 in three-dimensional environment 350A in real-time. Similarly, the avatar 317 displayed in the three-dimensional environment 350B using the second electronic device 370 is optionally accompanied by an audio effect corresponding to the voice of the user of the first electronic device 360. In some such examples, when the user of the first electronic device 360 speaks, the voice of the user may be detected by the first electronic device 360 (e.g., via the microphone(s) 213A) and transmitted to the second electronic device 370 (e.g., via the communication circuitry 222A/222B), such that the detected voice of the user of the first electronic device 360 may be presented as audio (e.g., using speaker(s) 216B) to the user of the second electronic device 370 in three-dimensional environment 350B in real-time.

In some examples, while in the multi-user communication session, the avatars 315/317 are displayed in the three-dimensional environments 350A/350B with respective orientations that (e.g., initially, such as prior to spatial refinement, as discussed in more detail below) correspond to and/or are based on orientations of the electronic devices 360/370 in the physical environments surrounding the electronic devices 360/370. For example, as shown in FIG. 3A, in the three-dimensional environment 350A, the avatar 315 is optionally facing toward a viewpoint of the user of the first electronic device 360, and in the three-dimensional environment 350B, the avatar 317 is optionally facing toward a viewpoint of the user of the second electronic device 370. As a particular user moves the electronic device in the physical environment, the viewpoint of the user changes in accordance with the movement, which may thus also change an orientation of the user's avatar in the three-dimensional environment. For example, with reference to FIG. 3A, if the user of the first electronic device 360 were to look leftward in the three-dimensional environment 350A such that the first electronic device 360 is rotated (e.g., a corresponding amount) to the left (e.g., counterclockwise), the user of the second electronic device 370 would see the avatar 317 corresponding to the user of the first electronic device 360 rotate to the right (e.g., clockwise) in accordance with the movement of the first electronic device 360.

Additionally, in some examples, while in the multi-user communication session, a viewpoint of the three-dimensional environments 350A/350B and/or a location of the viewpoint of the three-dimensional environments 350A/350B optionally changes in accordance with movement of the electronic devices 360/370 (e.g., by the users of the electronic devices 360/370). For example, while in the communication session, if the first electronic device 360 is moved closer toward the representation of the table 306' and/or the avatar 315 (e.g., because the user of the first electronic device 360 moved forward in the physical environment surrounding the first electronic device 360), the viewpoint of the user of the first electronic device 360 would change accordingly, such that the representation of the table 306', the representation of the window 309' and the avatar 315 appear larger in the field of view of three-dimensional environment 350A.

As mentioned above, while in the multi-user communication session, content can be shared between the first electronic device and the second electronic device, such that the content can be interacted with (e.g., viewed, moved, modified, etc.) by the users of the first electronic device and the second electronic device. In some examples, shared content can be moved within the shared three-dimensional environments presented by the first electronic device and the second electronic device by directly or indirectly interacting with the shared content. In some such examples, however, moving the shared content closer to the viewpoint of one user optionally moves the shared content farther from the viewpoint of the other user in the multi-communication session. Accordingly, it may be advantageous to provide a method for spatial refinement (e.g., movement and/or repositioning of avatars and/or shared objects) in shared three-dimensional environments while multiple devices are in a multi-communication session, which would allow content to be moved at one electronic device without moving the content at the other electronic device. As used herein, performing spatial refinement in the shared three-dimensional environment includes moving a shared object that is selected for movement (e.g., in response to input directed to the shared object) and moving other shared objects and/or avatars corresponding to other users in the multi-user communication session in accordance with the movement of the shared object.

In some examples, the three-dimensional environments shared between the first electronic device 360 and the second electronic device 370 may include one or more shared virtual objects. For example, as shown in FIG. 3A, the first electronic device 360 and the second electronic device 370 may each display a virtual tray 314 containing a virtual mug 352, which may be shared between the electronic devices 360/370. As shown, the shared virtual objects may be displayed with a grabber bar 335 (also referred to as a handlebar affordance) which is optionally selectable to initiate movement of the shared virtual objects (e.g., the virtual tray 314 and the virtual mug 352) within the three-dimensional environments 350A/350B. In some examples, the shared virtual objects 314 and 352 may be associated with an application running on the electronic devices 360/370. As shown in FIG. 3A, in some examples, the shared virtual objects may be positioned closer to the viewpoint of one user than another user in the three-dimensional environments 350A/350B (e.g., when the shared virtual objects are initially displayed in the three-dimensional environments 350A/350B). For example, in FIG. 3A, at the second electronic device 370, the shared virtual objects 314 and 352 are displayed in three-dimensional environment 350B at a first location that is optionally a first distance (e.g., "close to", or within a threshold distance, such as 0.2, 0.4, 0.5, 0.7, 1, 1.2, etc. m) from the viewpoint of the user of the second electronic device 370. Because objects in the three-dimensional environments 350A/350B maintain spatial truth (e.g., maintain consistent relative positioning within the three-dimensional environments 350A/350B) while the first electronic device 360 and the second electronic device 370 are in the multi-user communication session, the shared virtual objects 314 and 352 are optionally displayed at the first electronic device 360 at a second location, different from the first location, in three-dimensional environment 350A that is a second distance (e.g., "far from", or at more than a threshold distance," such as greater than 1, 1.4, 1.5, 2, etc. m) from the viewpoint of the user of the first electronic device 360.

Additionally, in some examples, the position of the avatars 315 and 317 within the three-dimensional environments 350A/350B may reflect/be indicative of the relative distances between the shared virtual objects 314 and 352 and the viewpoints of the users of the electronic devices 360/370. For example, as shown in FIG. 3A, because the shared virtual objects 352 and 314 are located the first distance from the viewpoint of the user of the second electronic device 370 in three-dimensional environment 350B, at the first electronic device 360, the shared virtual objects 352 and 314 are displayed the first distance from the avatar 315 corresponding to the user of the second electronic device 370 in three-dimensional environment 350A. Similarly, as shown, because the shared virtual objects 352 and 314 are located the second distance from the viewpoint of the user of the first electronic device 360 in three-dimensional environment 350A, at the second electronic device 370, the shared virtual objects 352 and 314 are displayed the second distance from the avatar 317 corresponding to the user of the first electronic device 360 in three-dimensional environment 350B.

In some examples, because the shared virtual objects 314 and 352 are positioned far from the viewpoint of the user of the first electronic device 360, the user of the first electronic device 360 may desire to move the shared virtual objects 314 and 352 closer to the viewpoint of the user of the first electronic device 360. Accordingly, in some examples, it may be advantageous to allow the users of the first electronic device and/or the second electronic device to spatially refine the virtual objects shared between the first electronic device and the second electronic device without moving the virtual objects to undesirable locations within the three-dimensional environments, as showcased above. Example interactions involving spatial refinement of the shared three-dimensional environment (including the shared virtual objects 314 and 352) in the multi-user communication session are discussed below.

Figure 3B:
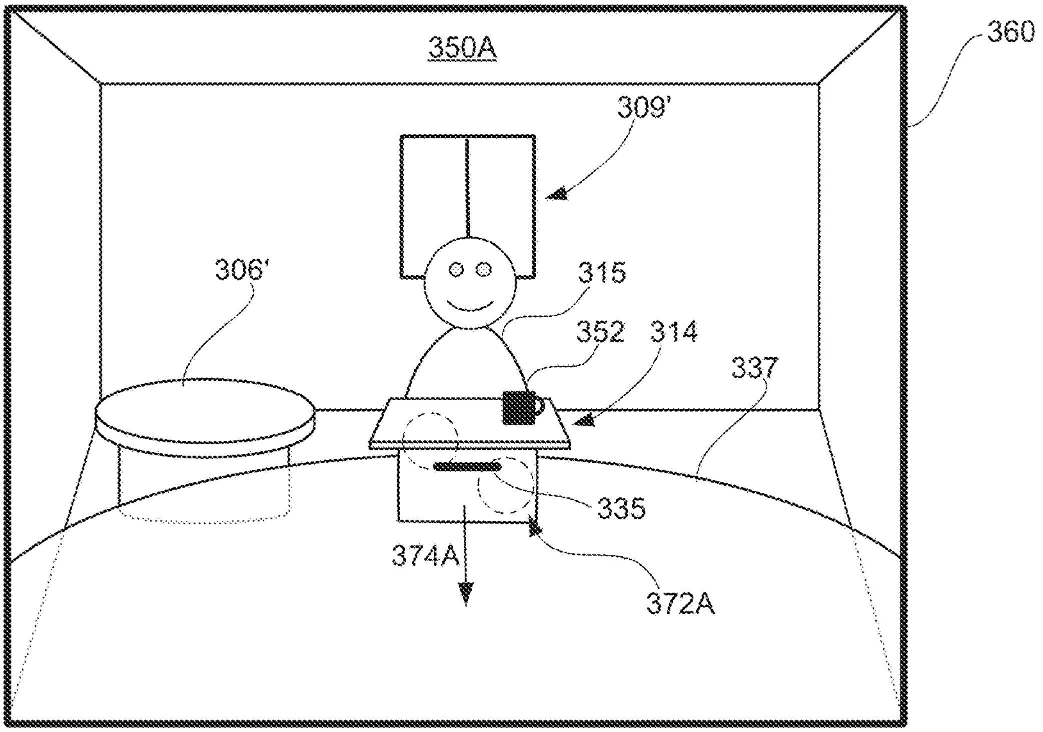
Figure 3B:
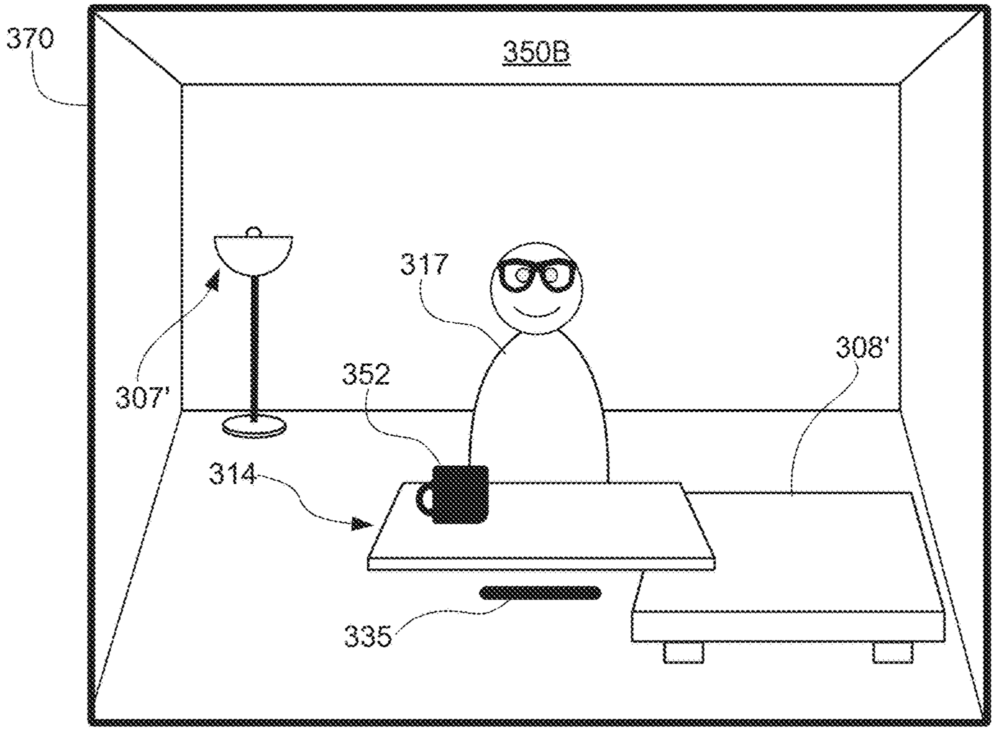

As shown in FIG. 3B, the user of the first electronic device 360 may provide a selection input 372A directed to the grabber or handlebar affordance 335 (and/or the shared virtual objects 314/352). For example, the user of the first electronic device 360 provides a pinch gesture (e.g., in which an index finger and thumb of the hand of the user come together and make contact), a two-handed double pinch gesture (e.g., one in which the index finger and thumb of the hand come into contact, separate, and come into contact a second time), a two-handed pinch and hold gesture (e.g., one in which the index finger and thumb of the hand come into contact and remain in contact for a threshold amount of time, such as 1, 1.5, 2, 2.5, 3, 4, etc. seconds), a selection of a spatial refinement affordance (not shown) displayed in a predetermined area of the three-dimensional environment 350A (e.g., such as at or near a top of the field of view of the three-dimensional environment 350A), or a verbal command directly to and/or while a gaze of the user is directed to the grabber or handlebar affordance 335 or a portion of the shared virtual objects 314/352. As shown, the selection input 372A provided by one or more fingers of a hand of the user may be followed by a drag/movement input 374A toward the viewpoint of the user of the first electronic device 360. For example, while the selection input is maintained (e.g., while a hand of the user continues the pinch gesture), the user of the first electronic device 360 moves the hand closer to a portion of the body (e.g., the chest/torso) of the user. In some examples, the selection input 372A, followed by the movement input 374*a*, may alternatively be provided directly to the virtual tray 314 or the virtual mug 352 in three-dimensional environment 350A.

In some examples, in response to receiving the selection input 372A followed by the movement input 374A, the first electronic device 360 performs spatial refinement in the three-dimensional environment 350A. For example, as described below, the first electronic device 360 moves the shared virtual objects 314 and 352 and the avatar 315 in the three-dimensional environment 350A in accordance with the movement input 374A, rather than just moving the shared virtual objects 314 and 352 in the three-dimensional environment 350A. In some examples, performing spatial refinement enables shared content to be moved within the three-dimensional environment 350A (e.g., closer to the viewpoint of the user of the first electronic device 360), without potentially moving the shared content farther from the user of the second electronic device 370 or to an undesirable location for the user of the second electronic device 370 in the three-dimensional environment 350B.

Additionally, in some examples, in response to receiving the selection input 372A and/or the movement input 374A, the first electronic device 360 optionally displays a planar element (e.g., a disc or disc-shaped element) 337 below the shared objects in the three-dimensional environment 350A (and optionally representations of private content and/or applications of other users). For example, as shown in FIG. 3B, the disc 337 may be displayed below the avatar 315 corresponding to the user of the second electronic device 370 and the shared virtual objects, such as the virtual tray 314 and the virtual mug 352. In some examples, a center of the disc 337 may be positioned at the viewpoint of the user of the first electronic device 360, and an edge of the disc 337 extends into the three-dimensional environment 350A to include all objects selected for spatial refinement. Accordingly, the disc 337 may serve as a reference point for subsequent movement of the objects selected for spatial refinement at the first electronic device 360, namely the avatar 315 and the shared virtual objects 314 and 352. For example, the disc 337 extends within three-dimensional environment 350A to contain (e.g., be displayed below) all objects that are selected for spatial refinement. It should be understood that, while a disc is illustrated in FIG. 3B and described herein, in some examples, an alternative user interface element may be displayed below the avatar 315 and the shared objects in three-dimensional environment 350A, such as a rectangular, square-shaped, triangular, octagonal, etc. stage or platter. As discussed in more detail below, the first electronic device may move the disc 337 in the three-dimensional environment 350A as the objects selected for refinement move in the three-dimensional environment 350A.

In some examples, the movement input directed to shared objects in the shared three-dimensional environment causes the electronic device to perform spatial refinement in the shared three-dimensional environment (including the shared objects) based on a type of the object and/or a direction of the movement input in the shared three-dimensional environment. In some examples, the electronic device performs spatial refinement in the shared three-dimensional environment in response to user input directed to the shared object in accordance with a determination that the shared object is an object of a first type. In some examples, the object type is determined based on an orientation of the shared object in the shared three-dimensional environment. For example, an object of the first type is a shared object that has a horizontal orientation in the shared three-dimensional environment relative to the viewpoint of the user of the electronic device. As shown in FIG. 3B, the selection input 372A and the movement input 374A are directed to the shared virtual object 314, which, as previously discussed above, is optionally a virtual tray. As shown in FIG. 3B, the shared object 314 has a horizontal orientation in the three-dimensional environment 350A relative to the viewpoint of the user of the first electronic device 360. Accordingly, as discussed above, the first electronic device 360 may spatially refine the three-dimensional environment 350A (including the shared virtual objects 314 and 352) because the shared virtual object 314 has a horizontal orientation in the three-dimensional environment 350A and is thus an object of the first type. It should be understood that, because the shared object 352 is disposed atop the surface of the shared virtual object 314, the first electronic device 360 also spatially refines the shared object 352 based on the orientation of the shared virtual object 314 in the three-dimensional environment 350A.

Figure 3C:
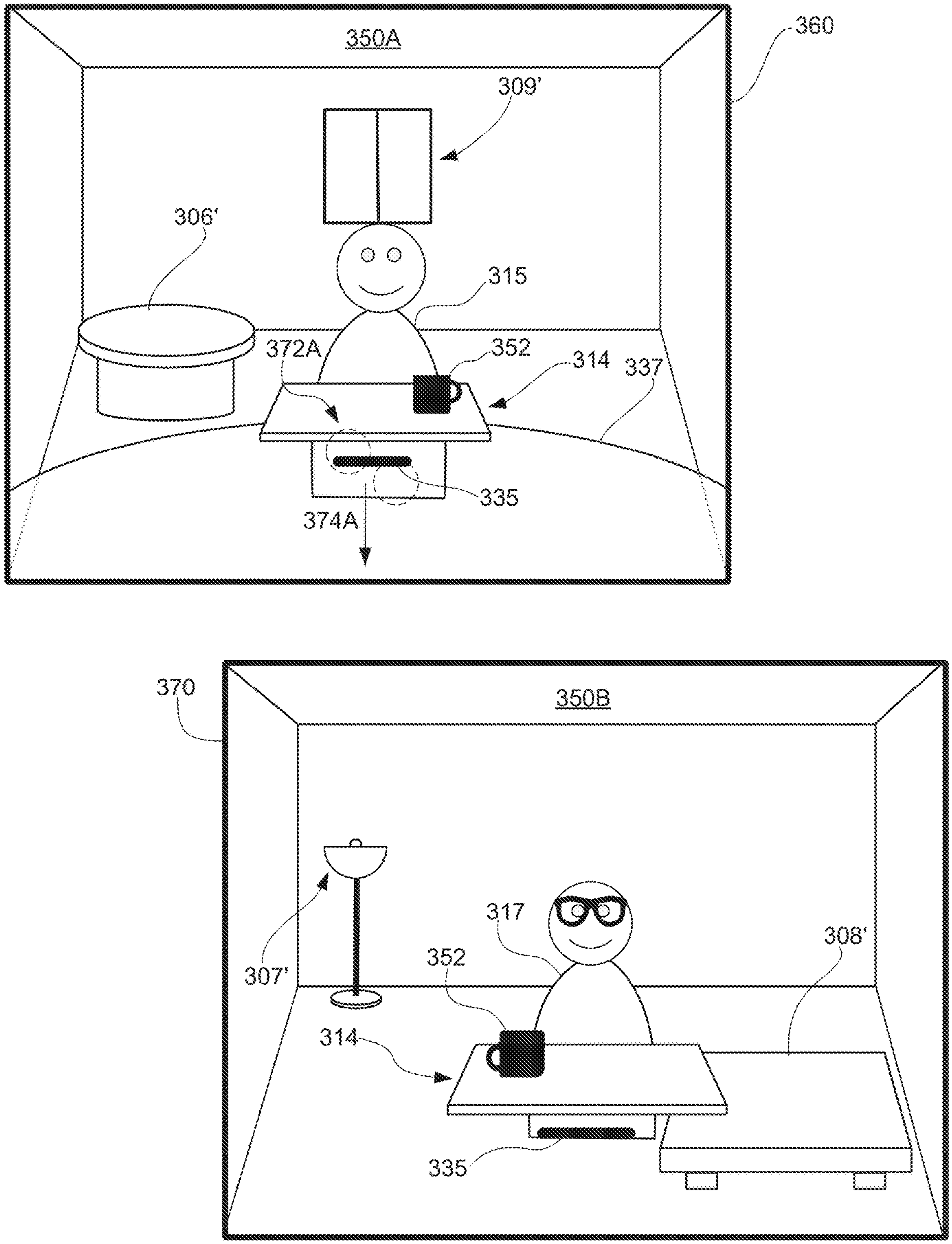

As mentioned above, in some examples, movement input directed to a shared object that is an object of the first type causes the shared object and the avatar 315 corresponding to the user of the second electronic device 370 to move in the three-dimensional environment 350A in accordance with the movement input. For example, as shown in FIG. 3C, moving the grabber bar 335 may cause the shared virtual objects 314 and 352 and the avatar 515 corresponding to the user of the second electronic device 370 to move in the three-dimensional environment 350A in the direction of the movement input 374A. As shown, as the user of the first electronic device 360 moves the grabber bar 335 which is associated with the shared virtual object 314 that is an object of the first type in the three-dimensional environment 350A, the first electronic device 360 moves the avatar 315 with the virtual tray 314 and the virtual mug 352 in the three-dimensional environment 350A. Additionally, the first electronic device 360 moves the disc 337 displayed below the avatar 315 and the shared virtual objects 314 and 352 in accordance with the movement of the shared virtual objects 314 and 352. As shown in FIG. 3C, the first electronic device 360 optionally moves the avatar 315 and the shared virtual objects 314 and 352 toward the viewpoint of the user of the first electronic device 360 in accordance with the movement input 374A. In some examples, the selection input 372A (e.g., the pinch gesture) is maintained as the objects are moved within three-dimensional environment 350A in FIG. 3C.

In some examples, when the first electronic device 360 spatially refines the shared three-dimensional environment (including the shared virtual objects 314 and 352) in response to receiving input (e.g., selection input 372A in FIG. 3B) directed to the shared virtual object 314 that is an object of the first type (e.g., a horizontally oriented object in the three-dimensional environment 350A), the first electronic device 360 transmits an indication of the spatial refinement to the second electronic device 370 (e.g., and/or to a server in communication with the first electronic device 360 and the second electronic device 370) with which the first electronic device 360 is in the multi-user communication session. For example, the first electronic device 360 transmits, to the second electronic device 370, data indicating that the first electronic device 360 has received input corresponding to a request to move the shared virtual objects 314 and 352 within the three-dimensional environment 350A presented at the first electronic device 360. In some examples, as previously discussed above, spatial refinement at the first electronic device 360 causes the avatar 315 corresponding to the user of the second electronic device 370 and the shared virtual objects 314 to move within the three-dimensional environment 350A in accordance with the movement input 374A in FIG. 3C. As shown in FIG. 3C, the second electronic device 370 may not move the shared virtual objects 314 and 352 in the three-dimensional environment 350B despite the movement of the shared virtual objects 314 and 352 in the three-dimensional environment 350A presented at the first electronic device 360. Rather, as shown in FIG. 3C, in response to receiving the indication from the first electronic device 360, the second electronic device 370 moves the avatar 317 corresponding to the user of the first electronic device 360 in the three-dimensional environment 350B in accordance with the movement input 374A received at the first electronic device 360. For example, when the three-dimensional environment 350A (including the shared virtual objects 314 and 352) is spatially refined, the shared virtual objects 314 and 352 and the avatar 315 are moved to a location in three-dimensional environment 350A that is a respective distance (e.g., 0.2, 0.4, 0.5, 0.7, 1, 1.2, etc. m) from the viewpoint of the user of the first electronic device 360, which causes the avatar 317 corresponding to the user of the first electronic device 360 to be moved toward the viewpoint of the user of the second electronic device 370 in three-dimensional environment 350B to a location that is the respective distance away from the viewpoint of the user of the second electronic device 370. In some examples, the amount (e.g., in distance) of the movement of the avatar 317 in the three-dimensional environment 350B is proportional to the amount of the movement of the shared virtual objects 314 and 352 and the avatar 315 in the three-dimensional environment 350A.

Additionally or alternatively, in some examples, rather than moving the shared virtual object 314, which is an object of the first type as discussed above, to spatially refine the three-dimensional environment 350A (including the shared virtual objects 314 and 352 in the three-dimensional environment 350A), an avatar corresponding to the other user can be moved to produce a same or similar spatial refinement as discussed above. For example, rather than providing input directed to the grabber bar 335 and/or the shared virtual object 314, the user of the first electronic device 360 may provide a selection input (e.g., similar to that discussed above) directed to the avatar 315 corresponding to the user of the second electronic device 370. Subsequently, the user of the first electronic device 360 may provide a drag/movement input (e.g., similar to that discussed above) toward the viewpoint of the user of the first electronic device 360, as similarly shown in FIG. 3C. However, providing a selection/movement input directed to the avatar 315 in three-dimensional environment 350A may result in an appearance of a physical interaction between the users of the first and second electronic devices, which may be interpreted as potentially intrusive, socially-unaccepted and/or otherwise offensive gestures performed by the avatar 317 from the viewpoint of the user of the second electronic device 370 (e.g., such as display of a hand of the avatar 317 within the personal space of and/or directly contacting the user of the second electronic device 370). Accordingly, it may be advantageous to alter an appearance of the avatar 317 corresponding to the user of the first electronic device 360, such as by fading, obscuring, or ceasing display of a portion of the avatar, such as the hands, arms, and/or torso of the avatar, or to cease animation of the avatar, such that the inputs provided by the user (e.g., pinch and drag gestures) are not also performed by the avatar 317 corresponding to the user of the first electronic device 360. Thus, providing the method described above with reference to FIGS. 3A-3C may be preferable to initiating spatial refinement by selecting an avatar corresponding to a user of another electronic device in a multi-user communication session to avoid having to display additional user interface elements and/or modify users' avatars.

Figure 3D:
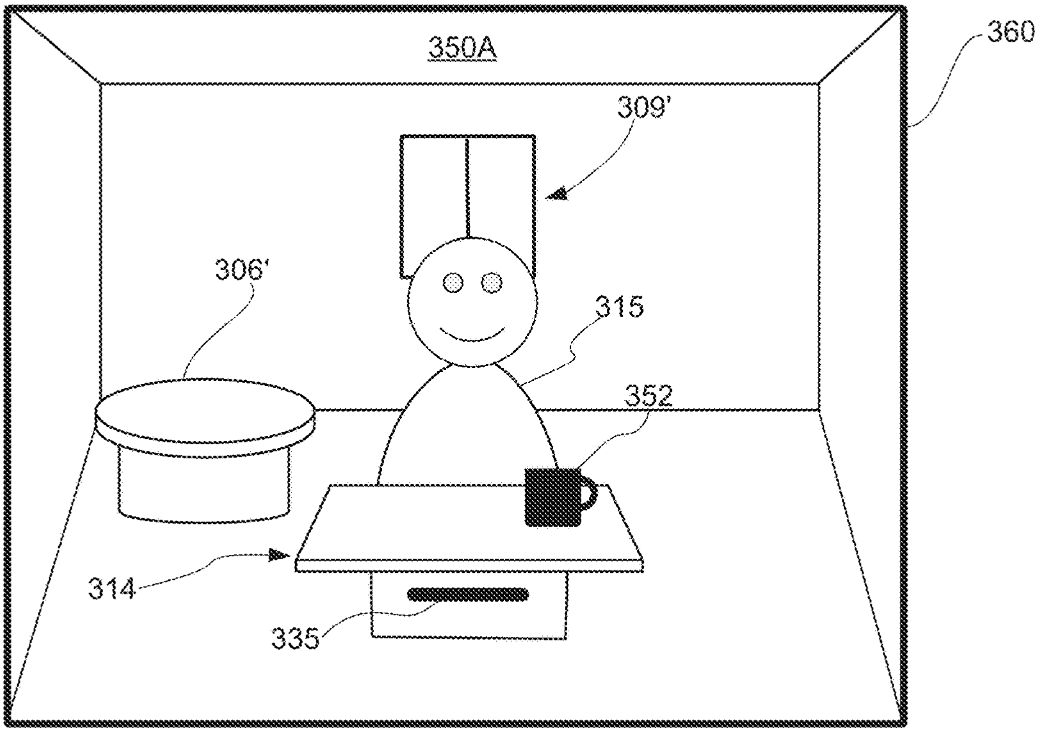
Figure 3D:
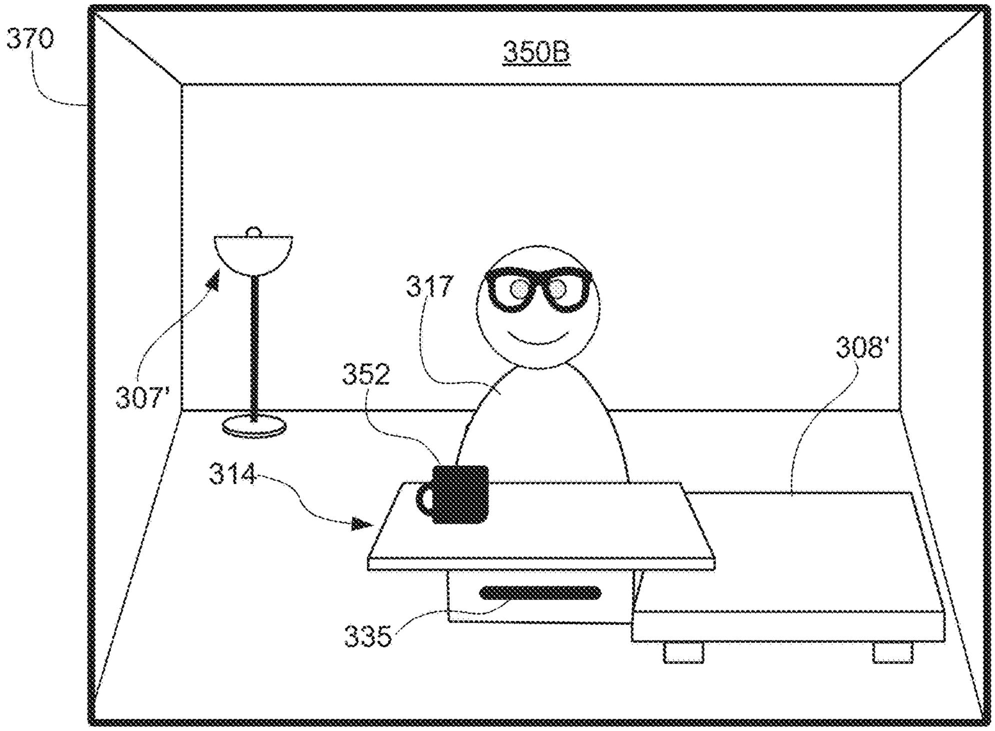

As shown in FIG. 3D, the user of the first electronic device 360 is optionally no longer providing the selection input 372A and the movement input 374A directed to the grabber bar 335 and/or the shared virtual object 314 in three-dimensional environment 350A (e.g., such that a deselection input is received). In some examples, in response to detecting an end of the movement input directed to the shared virtual object 314, the first electronic device 360 displays the avatar 315 and the shared virtual objects 352 and 314 at a new location in three-dimensional environment 350A that is determined based on the end of the movement input. Similarly, in some examples, the second electronic device 370 displays the avatar 317 at a new location in three-dimensional environment 350B that is determined based on the end of the movement input detected at the first electronic device 360. As shown in FIG. 3D, in response to detecting the end of the movement input, the first electronic device 360 may cease displaying the planar element 337 of FIGS. 3B-3C (e.g., because the user of the first electronic device 360 is no longer providing input for spatially refining the shared virtual objects 314 and 352 within the three-dimensional environment 350A).

As outlined above and as shown in FIG. 3D, by providing movement input directed to an object of the first type, such as the horizontally-oriented virtual tray 314 at the first electronic device 360, the three-dimensional environment 350A (including the avatar 315 and the shared virtual objects 314 and 352) may be spatially refined, which enables the shared virtual objects 314 and 352 to be positioned at favorable locations within the three-dimensional environments 350A and 350B at both electronic devices 360 and 370. Thus, one advantage of the disclosed method for spatial refinement in a multi-user communication session is that shared objects and avatars corresponding to users of electronic devices may be positioned at favorable locations for the users of the electronic devices to easily interact with the shared objects in the multi-user communication session. An additional advantage of the disclosed method is that the spatial refinement of shared objects and avatars is intuitive from the perspective of the user providing the spatial refinement input, and the resultant spatial refinement is intuitive from the perspectives of other users because rather than displaying movement of the shared objects, the electronic devices display movement of the avatar corresponding to the user providing the spatial refinement input while the shared content remains stationary. Attention is now directed to further example interactions involving application-based spatial refinement in a multi-user communication session between multiple electronic devices.

Figure 3E:
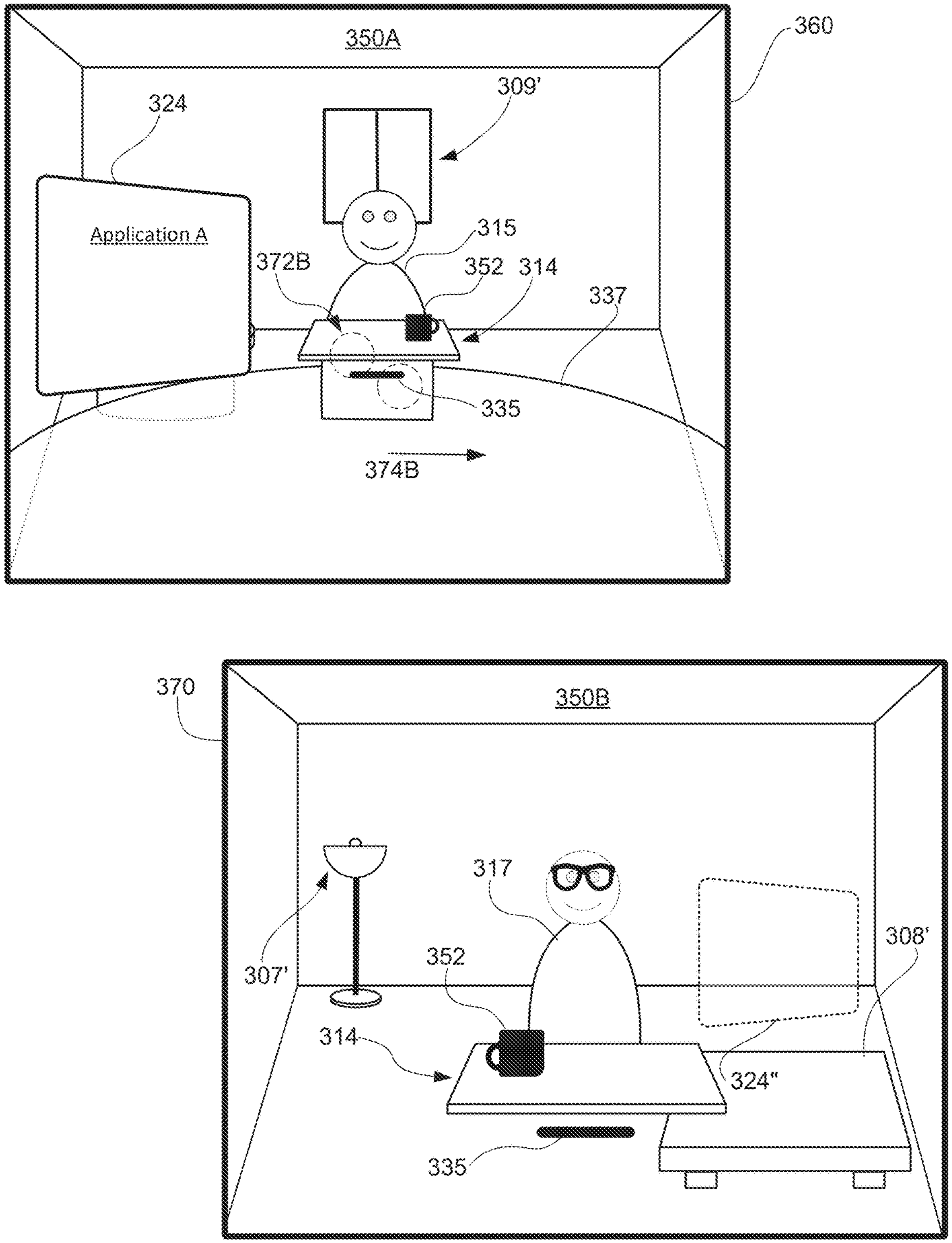

In some examples, the shared virtual objects 314/352 may alternatively be translated laterally within three-dimensional environment 350A. Additionally, in some examples, the three-dimensional environment 350A may include one or more virtual objects that are not shared with the second electronic device 370 (e.g., private application windows) in the multi-user communication session. As shown in FIG. 3E, the three-dimensional environment 350A may include a private application window 324, which may be an unshared application window corresponding to a respective application (e.g., Application A) running on the first electronic device 360. Because the private application window 324 is unshared, the second electronic device 370 optionally displays a representation of the private application window 324" in three-dimensional environment 350B. In some examples, the representation of the private application window 324" may be a faded, occluded, discolored, and/or translucent representation of the private application window

324. For example, because the private application window 324 is unshared with the user of the second electronic device 370, the user of the second electronic device 370 is prevented from viewing contents of the private application window 324 (e.g., from the viewpoint of the user of the second electronic device 370). In some examples, a location at which the representation of the private application window 324" is displayed in the three-dimensional environment 350B at the second electronic device 370 is based on a location at which the private application window 324 is displayed in the three-dimensional environment 350A at the first electronic device 360. For example, at the first electronic device 360, the private application window 324 may be a first distance from the viewpoint of the user of the first electronic device 360. Accordingly, at the second electronic device 370, the representation of the private application window 324" may be the first distance (e.g., or a second distance proportional to the first distance) from the avatar 317 corresponding to the user of the first electronic device 360, as shown in FIG. 3E.

As shown in FIG. 3E, in some examples, the user of the first electronic device 360 may provide a selection input 372B directed to the grabber bar 335 (and/or the shared virtual object 314) in the three-dimensional environment 350A, followed by a movement input 374B. For example, the user of the first electronic device 360 may provide a pinch gesture (e.g., using a hand of the user) while the gaze of the user is directed toward the grabber bar 335 (and/or the shared virtual object 314), followed by movement of the hand of the user while maintaining the pinch gesture, as similarly described above. In some examples, the selection input 372B corresponds to the selection input 372A described above with reference to FIG. 3B. As shown in FIG. 3E, the movement input 374B optionally corresponds to movement of the shared virtual object 314 rightward in three-dimensional environment 350A from the viewpoint of the user of the first electronic device 360.

In some examples, in response to receiving the selection input 372B directed to the grabber bar 335, which is associated with the shared virtual object 314, the electronic device initiates spatial refinement in the three-dimensional environment 350A. For example, because the shared virtual object 314 is an object of the first type (e.g., a horizontally oriented object), as previously described above, movement input directed to the shared virtual object 314 causes the shared virtual objects and the avatar 315 corresponding to the user of the second electronic device 370 to move within the three-dimensional environment 350A. Additionally, as similarly described above, in some examples, in response to receiving the selection input 372B and/or the movement input 374B, the first electronic device 360 optionally displays the planar element (e.g., disc) 337 below the objects selected for spatial refinement in three-dimensional environment 350A. For example, as shown in FIG. 3E, the disc 337 is displayed below the avatar 315 and the shared virtual objects 314 and 352 in three-dimensional environment 350A. As shown, because the private application window 324 is private to the user of the first electronic device 360 (e.g., is not a shared virtual object), the private application window 324 is optionally not selected for spatial refinement and thus the disc 337 is not displayed below the private application window 324 in three-dimensional environment 350A.

Figure 3F:
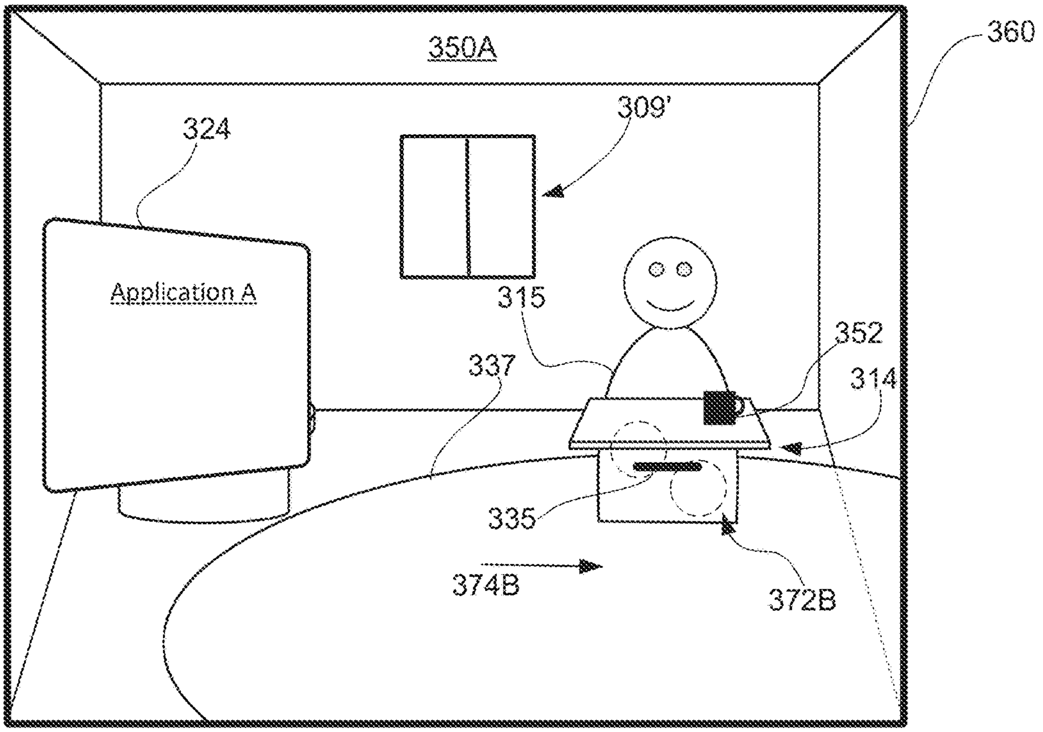
Figure 3F:
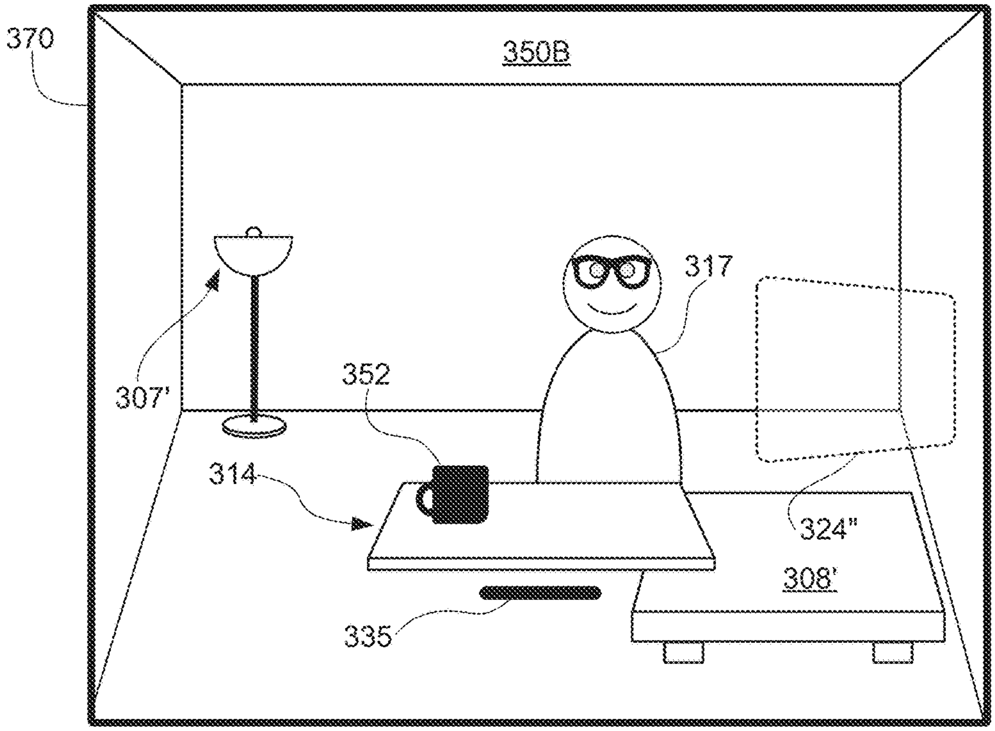

In some examples, as shown in FIG. 3F, in response to receiving the movement input 374B directed to the grabber bar 335 (and/or the shared virtual object 314), the first electronic device 360 moves the shared virtual objects 314 and 352 and the avatar 315 corresponding to the user of the second electronic device 370 in three-dimensional environment 350A in accordance with the movement input 374B. For example, the shared virtual objects 314 and 352 and the avatar 315 may be moved rightward in the three-dimensional environment 350A relative to the viewpoint of the user of the first electronic device 360. Additionally, as shown, the disc 337 may move (e.g., rightward) in three-dimensional environment 350A as the avatar 315 and the shared virtual objects 314 and 352 move in accordance with the movement input 374B. As mentioned above, the private application window 324 is not selected for spatial refinement because the private application window 324 is an unshared object in three-dimensional environment 350A. Accordingly, when the avatar 315 and the shared virtual objects 314 and 352 are moved in the three-dimensional environment 350A in accordance with the movement input 374B, the first electronic device 360 optionally forgoes moving the private application window 324 in the three-dimensional environment 350A, as shown in FIG. 3F.

As described above with reference to FIG. 3C, in some examples, when the first electronic device 360 spatially refines the three-dimensional environment 350A including the shared virtual objects 314 and 352 (e.g., moves the avatar 315 and the shared virtual objects 314 and 352 in three-dimensional environment 350A in accordance with the movement input 374B), the second electronic device 370 may move the avatar 317 corresponding to the user of the first electronic device 360 in three-dimensional environment 350B at the second electronic device 370, accordingly. For example, as shown in FIG. 3F, the second electronic device 370 moves the avatar 317 rightward in the three-dimensional environment 350A relative to the viewpoint of the user of the second electronic device 370 based on the movement input 374B detected at the first electronic device 360 (e.g., in response to receiving an indication of the movement input 374B was detected at the first electronic device 360). Additionally, in some examples, in response to detecting the movement input 374B at the first electronic device 360, the second electronic device 370 the representation of the private application window 324" with the avatar 317 in three-dimensional environment 350B. For example, as shown in FIG. 3F, when the second electronic device 370 moves the avatar 317 rightward in the three-dimensional environment 350B, the second electronic device 370 also moves the representation of the private application window 324" rightward in three-dimensional environment 350B to reflect the distance between the user of the first electronic device 360 and the private application window 324 at the first electronic device 360.

Figure 3G:
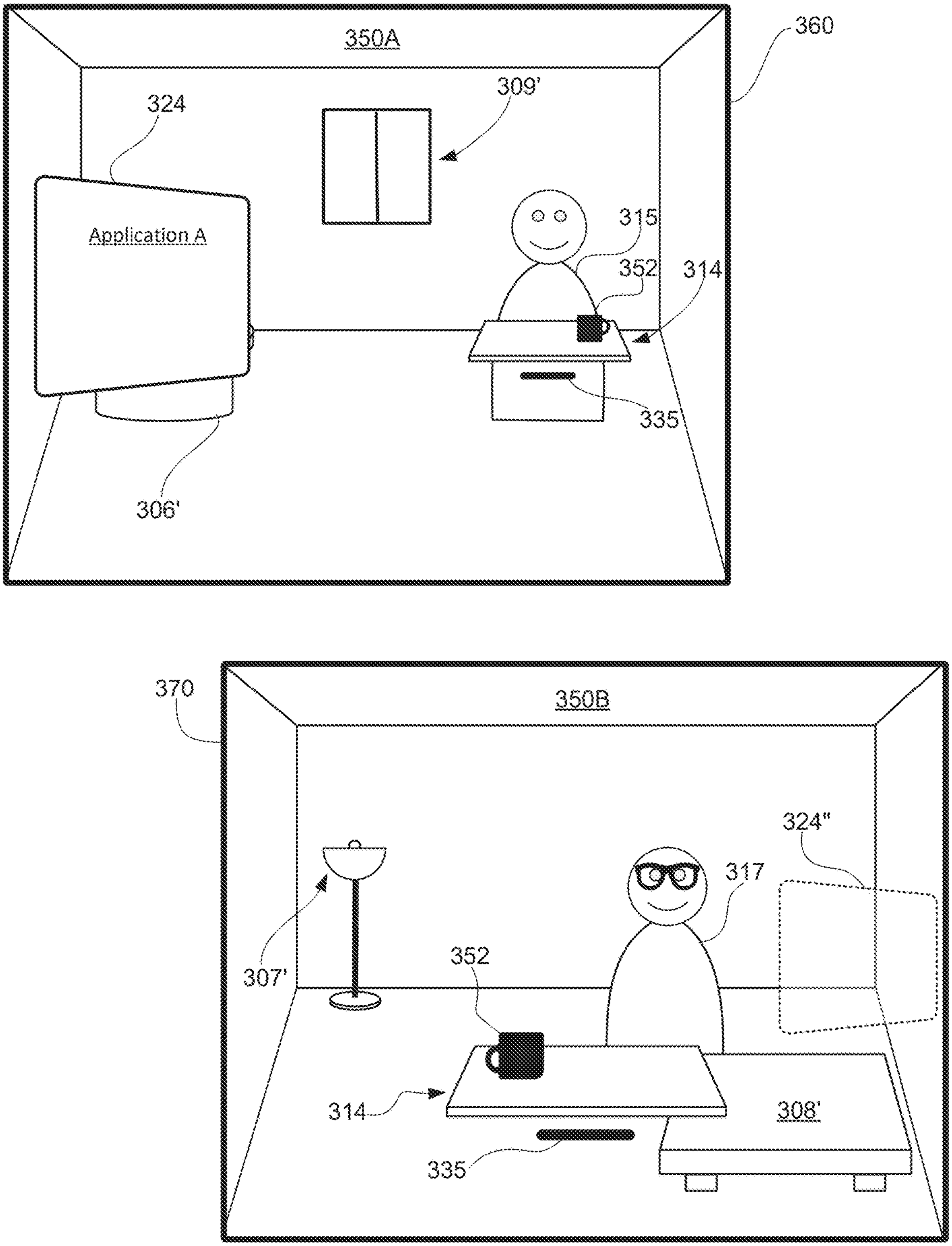

In some examples, in response to detecting an end of the movement input 374B and/or an end of the selection input 372B (e.g., a deselection input, such as release of the pinch gesture of the hand of the user), the first electronic device 360 optionally ceases moving the avatar 315 and the shared virtual objects 314 and 352 in three-dimensional environment 350A, as shown in FIG. 3G. Additionally, as shown in FIG. 3G, the first electronic device 360 ceases display of the planar element 337 in the three-dimensional environment 350A (e.g., because the first electronic device 360 is no longer spatially refining the shared virtual objects 314 and 352 in the three-dimensional environment 350A). In some examples, in response to detecting the end of the movement input 374B and/or the end of the selection input 372B at the first electronic device 360, the second electronic device 370 ceases moving the avatar 317 corresponding to the user of the first electronic device 360 and the representation of the private application window 324" in three-dimensional environment 350B. For example, as shown in FIG. 3G, the second electronic device 370 moves (or has moved) the avatar 317 and the representation of the private application window 324" rightward in the three-dimensional environment 350B from the viewpoint of the user of the second electronic device 370 to a location that is based on the location of the avatar 315 in three-dimensional environment 350A. For example, because the spatial refinement by the user of the first electronic device 360 caused the avatar 315 to move rightward in the three-dimensional environment 350A (e.g., by a first amount), the avatar 317 corresponding to the user of the first electronic device 360 (e.g., and the representation of the private application window 524", which is private to the user of the first electronic device 360) is optionally moved to the right in three-dimensional environment 350B (e.g., by a second amount, based on (e.g., proportional or equal to) the first amount) in accordance with the movement of the avatar 315.

It should be understood that, while forward and lateral movement of the avatars 315/317 and the shared virtual objects 514 and 552 are illustrated and described herein, additional or alternative movements may be provided based on the movement of the hand of the user. For example, the electronic device may move an avatar and shared virtual objects forward and laterally in the three-dimensional environment in accordance with forward and lateral movement of the hand of the user. Additionally, it should be understood that, in some examples, additional or alternative options may be provided for initiating spatial refinement at an electronic device. For example, the user of the electronic device may select a spatial refinement affordance displayed in the three-dimensional environment that allows the user to individually select the objects and/or avatars the user desires to move in the three-dimensional environment. Additionally, in some examples, the electronic device may display a list of options, including an option to initiate spatial refinement, upon selection of an object (e.g., an avatar or a shared object).

Additionally, it should be understood that, while the spatial refinements illustrated in FIGS. 3A-3G include translational movements, in some examples, the spatial refinements may include a translation, a rotation, and/or both a translation and a rotation. In some such examples, the rotational movement may be performed relative to any desired reference point, such as a reference point at the viewpoint of the user, a reference point at a location of a shared object in the three-dimensional environment, a reference point at a location of an avatar of a user in the three-dimensional environment, and/or a reference point at a location selected by the user (e.g., based on the gaze of the user and/or in response to receiving a two-handed pinch and rotation gesture).

As outlined above with reference to FIGS. 3A-3G, interaction input (e.g., selection inputs and/or movement inputs) directed to a shared virtual object in a shared three-dimensional environment may cause the electronic device to perform spatial refinement on the shared three-dimensional environment (including the virtual object) depending on a type of the shared virtual object. For example, as discussed above, interaction input directed to a shared virtual object of the first type (e.g., a horizontally oriented object) causes the electronic device to perform spatial refinement, optionally irrespective of the manner of the interaction input directed to the shared virtual object. As described with reference to FIGS. 3A-3G, the first electronic device 360 performs spatial refinement in the three-dimensional environment 350A irrespective of whether the movement input was a forward/backward movement (e.g., relative to the viewpoint of the user of the first electronic device 360), as shown in FIG. 3C, or a lateral movement, as shown in FIG. 3F. Attention is now directed to example interactions with a shared virtual object that is an object of a second type, different from the first type discussed above, for which spatial refinement is performed based on the manner of the interaction input directed to the shared virtual object.

FIGS. 4A-4J illustrate example interactions involving application-based spatial refinement in a multi-user communication session according to some examples of the disclosure. In some examples, while a first electronic device 460 is in a multi-user communication session with a second electronic device 470, a three-dimensional environment 450A may be presented using first electronic device 460 and a three-dimensional environment 450B may be presented using second electronic device 470. In some examples, the electronic devices 460/470 optionally correspond to electronic devices 360/370 discussed above. In some examples, the three-dimensional environments 450A/450B include captured portions of the physical environments in which electronic devices 460/470 are located. For example, the three-dimensional environment 450A optionally includes a table (e.g., a representation of table 406') and a window (e.g., representation of window 409'), and the three-dimensional environment 450B optionally includes a coffee table (e.g., representation of coffee table 408') and a floor lamp (e.g., representation of floor lamp 407'). In some examples, the three-dimensional environments 450A/450B optionally correspond to three-dimensional environments 350A/350B described above. As similarly described above, the three-dimensional environments also include avatars 415/417 corresponding to users of the electronic devices 470/460. In some examples, the avatars 415/417 optionally correspond to avatars 315/317 described above.

Figure 4A:
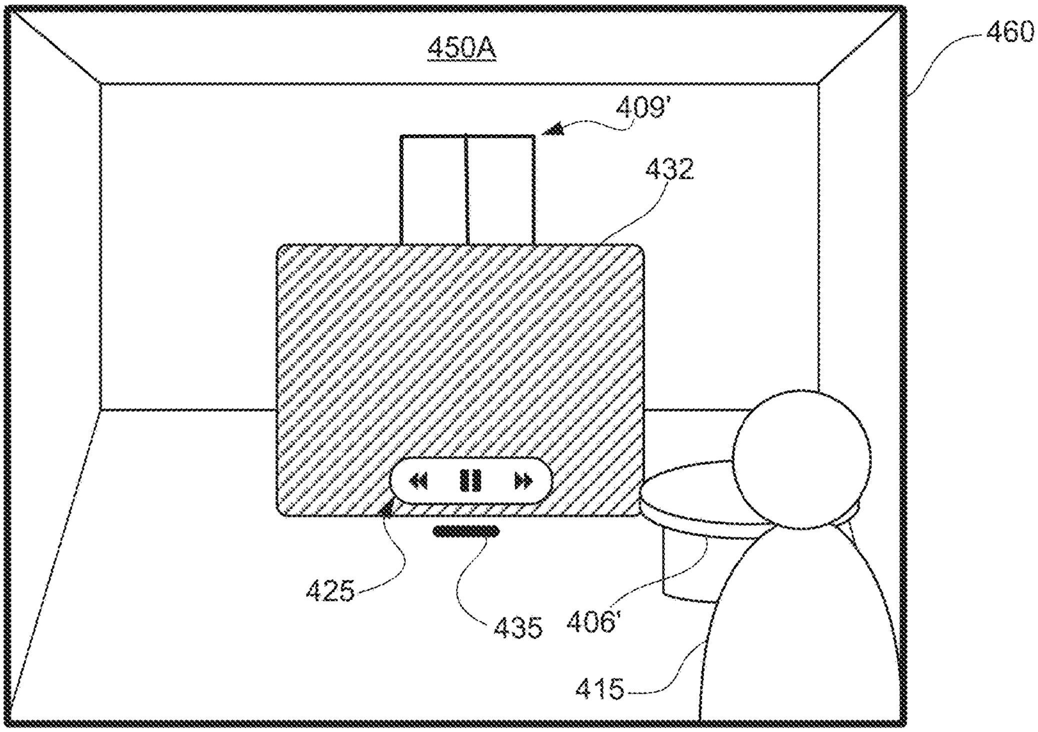
FIGS. 4A-4J illustrate example interactions involving application-based spatial refinement in a multi-user communication session according to some examples of the disclosure.
Figure 4A:
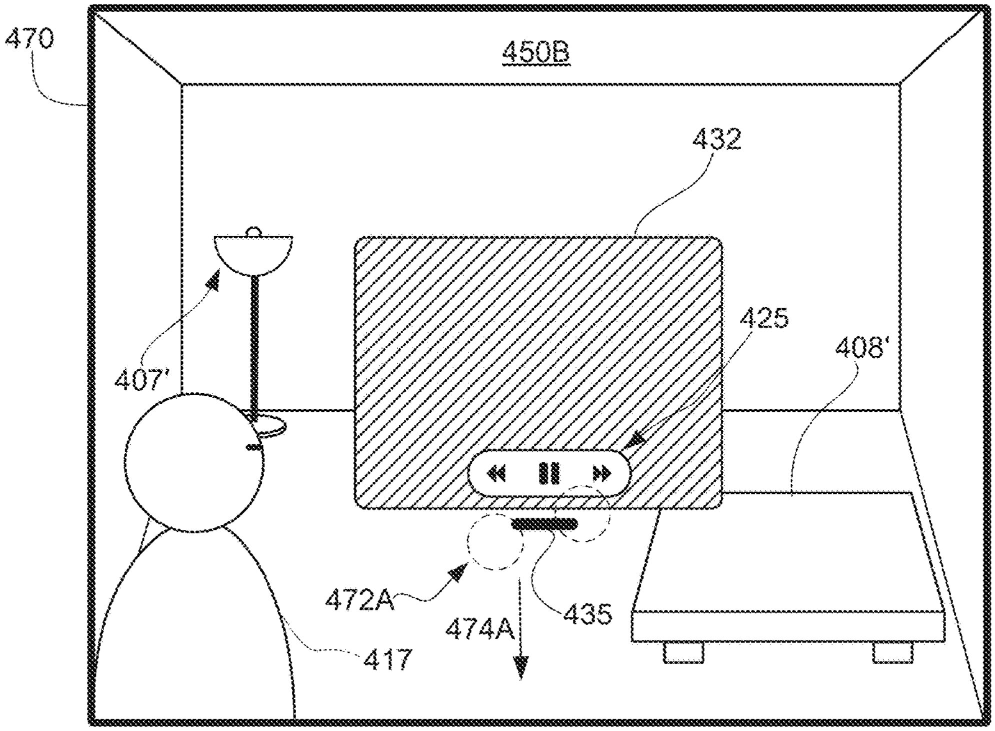

As similarly discussed above, in some examples, the three-dimensional environments 450A/450B may include one or more virtual objects that are shared between the first electronic device 460 and the second electronic device 470 in the multi-user communication session. As shown in FIG. 4A, the three-dimensional environment 450A at the first electronic device 460 and the three-dimensional environment 450B at the second electronic device 470 may include an application window 432, which is optionally a video player user interface of a video player application running on the electronic devices 460/470. In some examples, the shared application window 432 may include playback controls 425 in the three-dimensional environments 450A/450B that are selectable to control playback of the video content displayed in the shared application window 432. As shown in FIG. 4A, in some examples, the shared application window 432 may be displayed with a grabber or handlebar affordance 435 which is optionally selectable to initiate movement of the shared application window 432 within the three-dimensional environments 450A/450B. In some examples, because the application window 432 is shared, the user of the first electronic device 460 and the user of the second electronic device 470 are able to view the video content in the application window 432 at their respective devices, as similarly described above.

As mentioned above, the three-dimensional environment 450A at the first electronic device 460 may include the avatar 415 corresponding to the user of the second electronic device 470, and the three-dimensional environment 450B at the second electronic device 470 may include the avatar 417 corresponding to the user of the first electronic device 460. As alluded to above, the user of the first electronic device 460 and the user of the second electronic device 470 are viewing the video content in the shared application window 432 in the three-dimensional environments 450A/450B in FIG. 4A. Accordingly, the avatars 415/417 corresponding to the users are oriented to face toward the shared application window 432 in the three-dimensional environments 450A/450B. For example, at the first electronic device 460, the avatar 415 corresponding to the user of the second electronic device 470 may be located to the right of the viewpoint of the user of the first electronic device 460 and may be oriented to face toward the shared application window 432, which is optionally located centrally within the three-dimensional environment 450A. Similarly, at the second electronic device 470, the avatar 417 corresponding to the user of the first electronic device 460 may be located to the left of the viewpoint of the user of the second electronic device 470 and may also be oriented to face toward the shared application window 432, which is optionally also located centrally within the three-dimensional environment 450B, as shown in FIG. 4A.

In some examples, interaction input directed to the shared application window 432 causes the shared application window 432 to be moved within the shared three-dimensional environment. In some examples, the shared application window 432 may be an object of a second type, different from the first type described above with reference to FIGS. 3A-3G. For example, the shared application window 432 has a vertical orientation (e.g., a front-facing surface of the shared application window 432 is aligned to a vertical axis/plane) from the viewpoint of the users of the electronic devices 460/470, as shown in FIG. 4A. In some examples, the shared three-dimensional environment is spatially refined depending on a manner (e.g., direction) of the movement directed to the shared application window 432, as described in detail below.

As shown in FIG. 4A, the user of the second electronic device 470 optionally provides a selection input 472A directed to the grabber affordance 435, which is associated with the shared application window 432, in three-dimensional environment 450B, followed by a movement/drag input 474A. For example, as similarly described above, the user of the first electronic device 460 may provide a pinch gesture (e.g., using a hand of the user) while the gaze of the user is directed toward the shared application window 432, followed by movement of the hand of the user while maintaining the pinch gesture (or other selection input). In some examples, the selection input 472A has one or more characteristics of the selection inputs described above. As shown in FIG. 4A, the movement input 474A optionally corresponds to movement of the shared application window 432 forward in the three-dimensional environment 450B and toward the viewpoint of the user of the second electronic device 470.

In some examples, in response to receiving the movement input 474A, the second electronic device 470 forgoes performing spatial refinement in the three-dimensional environment 450B (including the shared application window 432 and the avatar 417 corresponding to the user of the first electronic device 460). For example, as mentioned above, the second electronic device 470 performs spatial refinement in the three-dimensional environment 450B depending on a direction of the movement of the shared application window 432, which is an object of the second type (e.g., a vertically oriented object), in the three-dimensional environment 450B. In some examples, in accordance with a determination that the manner of the movement of the shared application window 432 is forward in the three-dimensional environment 450B (e.g., toward the viewpoint of the user of the second electronic device 470), the second electronic device 470 does not perform spatial refinement in the three-dimensional environment 450B. For example, as shown in FIG. 4A, the second electronic device 470 does not display a planar element (e.g., disc), such as planar element 337 in FIGS. 3B-3C, below the shared application window 432 and the avatar 417 corresponding to the user of the first electronic device 460 in the three-dimensional environment 450B.

Figure 4B:
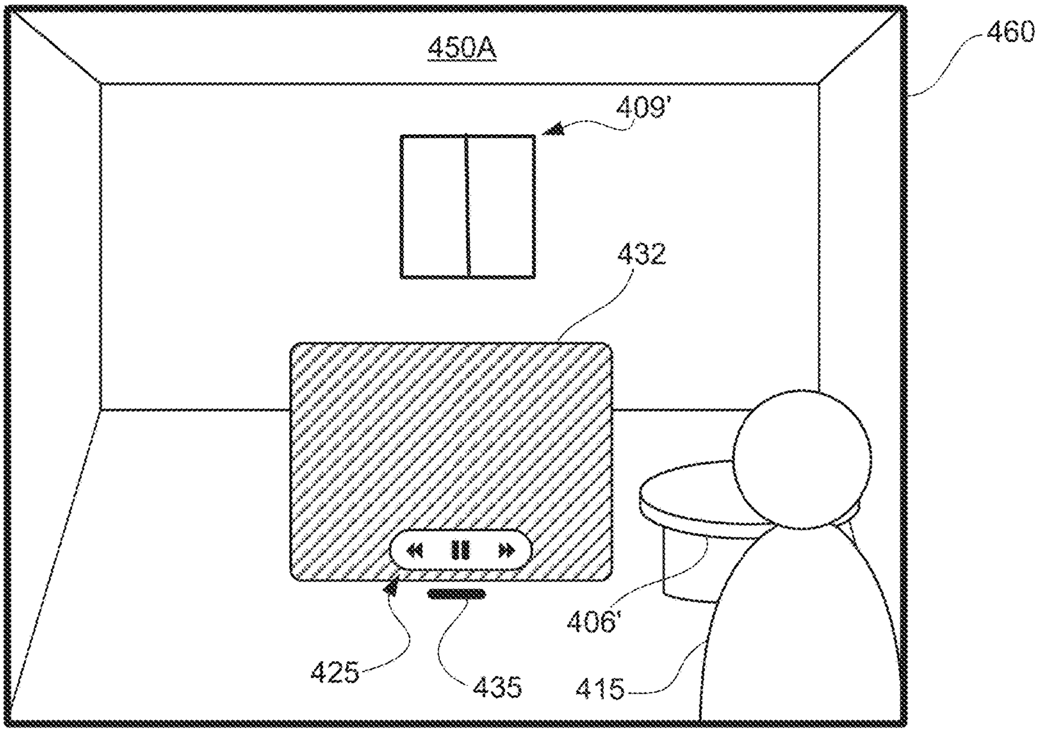
Figure 4B:
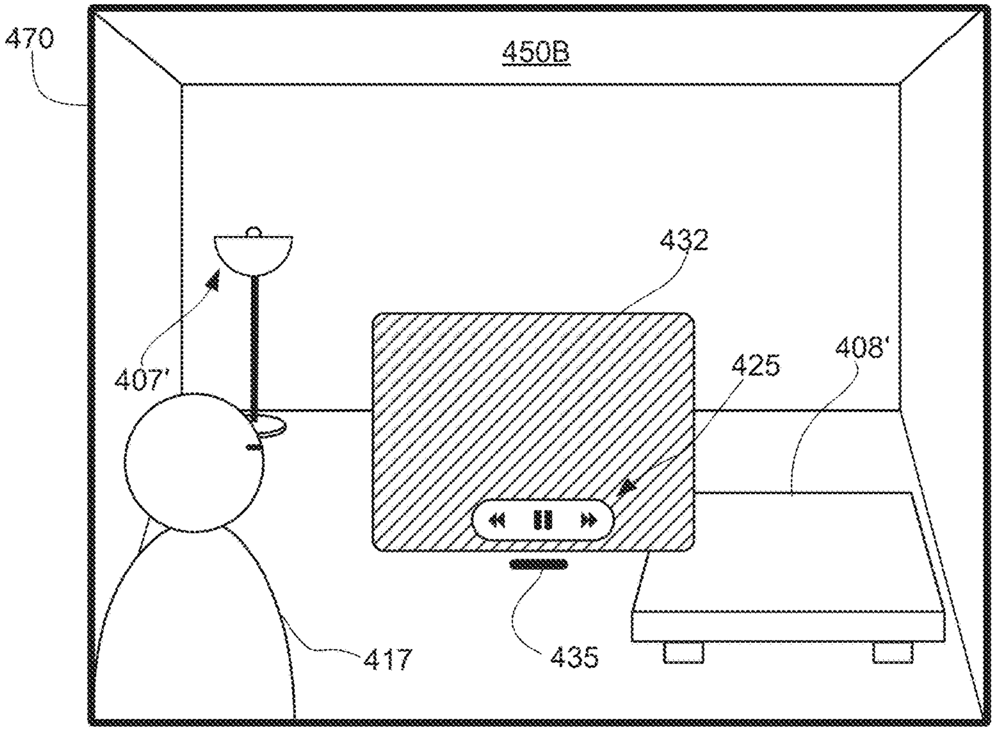

Rather, as shown in FIG. 4B, the second electronic device 470 may move the shared application window 432 within the three-dimensional environment 450B in accordance with the movement input 474A, without moving the avatar 417 corresponding to the user of the first electronic device 460 or any other shared virtual objects. For example, as shown in FIG. 4B, after detecting an end of the selection input 472A and/or an end of the movement input 474A (e.g., a deselection input, such as a release of the pinch gesture of the hand of the user), the second electronic device 470 displays the shared application window 432 at a location in the three-dimensional environment 450B that is closer to the viewpoint of the user of the second electronic device 470 (e.g., compared to that in FIG. 4A). Additionally, as shown in FIG. 4B, the second electronic device 470 may scale the shared application window 432 in the three-dimensional environment 450B based on the movement of the shared application window 432. For example, in FIG. 4A, the shared application window 432 is displayed at a first size in the three-dimensional environment 450B (e.g., relative to the viewpoint of the user of the second electronic device 470) when the movement input 474A is received. As shown in FIG. 4B, after the movement of the shared application window 432 toward the viewpoint of the user of the second electronic device 470, the shared application window 432 is displayed at a second size, smaller than the first size. In some examples, the second electronic device 470 scales the shared application window 432 in the three-dimensional environment 450B such that the video content displayed in the shared application window 432 occupies a same amount of a field of view of the user of the second electronic device 470 after the movement of the shared application window 432 within the three-dimensional environment 450B.

In some examples, as similarly described above, when the second electronic device 470 receives the input for moving the shared application window 432 in the three-dimensional environment 450B while the first electronic device 460 and the second electronic device 470 are in the multi-user communication session, the second electronic device 470 transmits an indication of the movement of the shared application window 432. In some examples, when the first electronic device 460 receives the indication of the movement, the first electronic device 460 moves the shared application window 432 in the three-dimensional environment 450A based on the movement of the shared application window 432 in the three-dimensional environment 450B at the second electronic device 470. For example, because the second electronic device 470 did not spatially refine the three-dimensional environment 450B (including the shared application window 432) in response to the movement input 474A, the first electronic device 460 moves the shared application window 432 in the three-dimensional environment 450A instead of moving the avatar 415 corresponding to the user of the second electronic device 470 (e.g., which would have happened had the three-dimensional environment 450B been spatially refined at the second electronic device 470, as similarly described above). In some examples, as shown in FIG. 4B, the first electronic device 460 moves the shared application window 432 toward the viewpoint of the user of the first electronic device 460, such that a distance between the shared application window 432 in the three-dimensional environment 450A and the avatar 415 corresponding to the user of the second electronic device 470 is equal to or proportional to a distance between the shared application window 432 in the three-dimensional environment 450B and the viewpoint of the user of the second electronic device 470.

Additionally, as shown in FIG. 4B, in some examples, the first electronic device 460 scales the shared application window 432 in the three-dimensional environment 450A when the shared application window 432 is moved closer to the viewpoint of the user of the first electronic device 460. For example, as similarly described above, the first electronic device 460 decreases a size of the shared application window 432 in the three-dimensional environment 450A when the shared application window 432 is moved closer to the viewpoint of the user of the first electronic device 460. In some examples, the scaling of the shared application window 432 in the three-dimensional environment 450A is based on the scaling of the shared application window 432 in the three-dimensional environment 450B. For example, the size of the shared application window 432 in the three-dimensional environment 450A is equal to or proportional to the size of the shared application window 432 in the three-dimensional environment 450B.

Figure 4C:
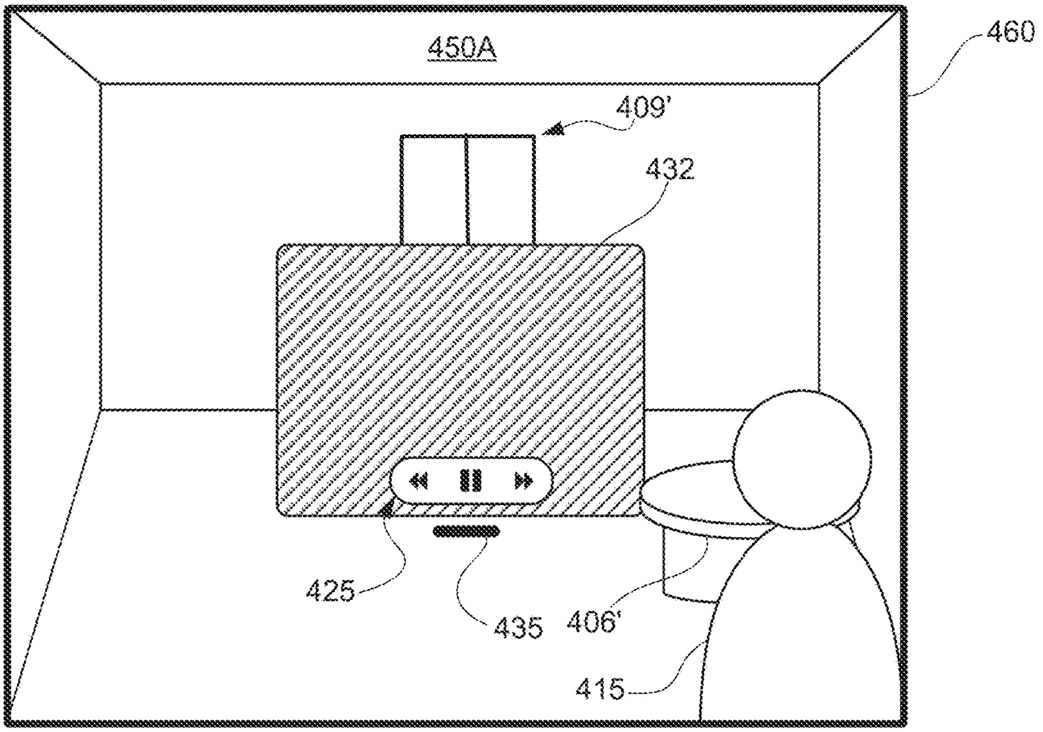
Figure 4C:
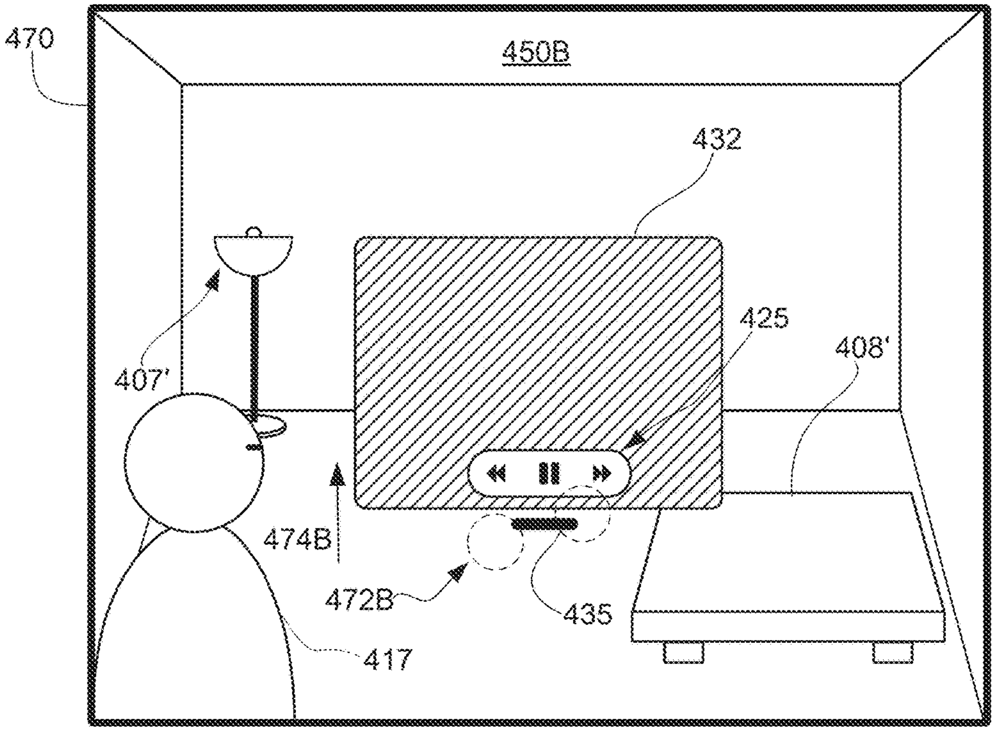

In some examples, the shared application window 432 may alternatively be moved backward in the three-dimensional environment 450B and farther from the viewpoint of the user of the second electronic device 470. For example, as shown in FIG. 4C, the second electronic device 470 may receive a selection input 472B directed to the grabber affordance 435 (and/or the shared application window 432) in the three-dimensional environment 450B, followed by a movement input 474B. In some examples, the selection input 472B has one or more characteristics of the selection input 472A above and the movement input 474B has one or more characteristics of the movement input 474A above. As shown in FIG. 4C, the movement input 474B corresponds to movement of the shared application window 432 farther from the viewpoint of the user of the second electronic device 470.

As previously discussed above, the shared application window 432 is an object of the second type (e.g., a vertically oriented object). As described above with reference to FIGS. 4A-4B, movement of an object of the second type closer to the viewpoint of the user does not cause the electronic device to perform spatial refinement in the shared three-dimensional environment. For example, as shown in FIG. 4B, movement of the shared application window 432 closer to the viewpoint of the user of the second electronic device 470 does not cause the second electronic device 470 to perform spatial refinement in the three-dimensional environment 450B. As shown in FIG. 4C, in response to receiving the movement input 474B corresponding to movement of the shared application window 432 backward in the three-dimensional environment 450B and away from the viewpoint of the user of the second electronic device 470, the second electronic device 470 forgoes performing spatial refinement in the three-dimensional environment 450B. For example, as shown in FIG. 4C, the second electronic device 470 may not display the planar element (e.g., planar element (disc) 337 in FIGS. 3B-3C) below the shared application window 432 and the avatar 417 corresponding to the user of the first electronic device 460.

Figure 4D:
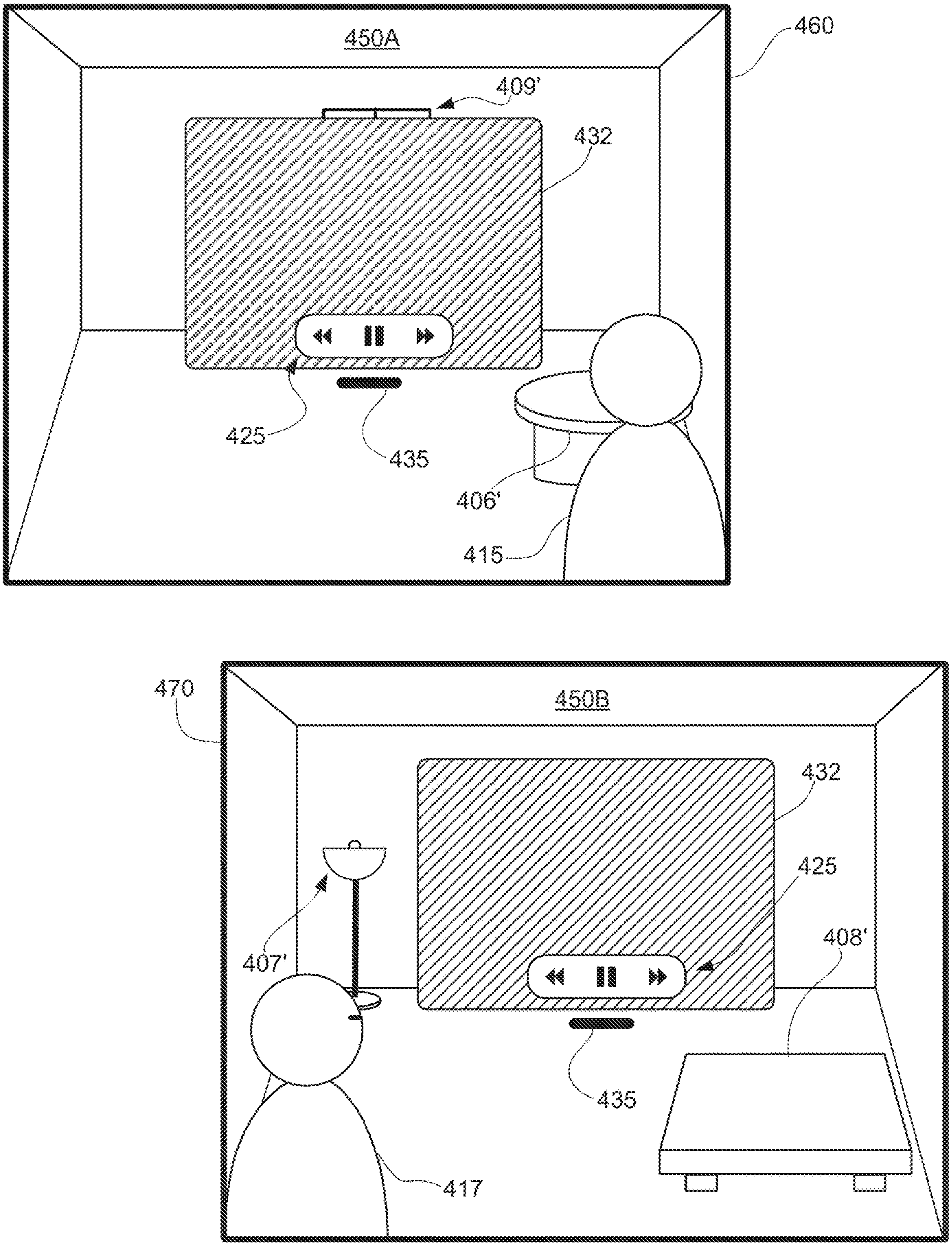

In some examples, as shown in FIG. 4D, in response to receiving the movement input 474B, the second electronic device 470 moves the shared application window 432 within the three-dimensional environment 450B in accordance with the movement input 474B, without moving the avatar 417 corresponding to the user of the first electronic device 460. For example, as shown in FIG. 4D, after detecting an end of the selection input 472B and/or an end of the movement input 474B (e.g., a deselection input, such as a release of the pinch gesture of the hand of the user), the second electronic device 470 displays the shared application window 432 at a location in the three-dimensional environment 450B that is farther from the viewpoint of the user of the second electronic device 470 (e.g., compared to that in FIG. 4C). Additionally, as shown in FIG. 4D, as similarly described above, the second electronic device 470 may scale the shared application window 432 in the three-dimensional environment 450B based on the movement of the shared application window 432. For example, in FIG. 4C, the shared application window 432 is displayed at a first size in the three-dimensional environment 450B (e.g., relative to the viewpoint of the user of the second electronic device 470) when the movement input 474B is received. As shown in FIG. 4D, after the movement of the shared application window 432 away from the viewpoint of the user of the second electronic device 470, the shared application window 432 is displayed at a second size, larger than the first size. In some examples, the second electronic device 470 scales the shared application window 432 in the three-dimensional environment 450B such that the video content displayed in the shared application window 432 occupies a same amount of a field of view of the user of the second electronic device 470 after the movement of the shared application window 432 within the three-dimensional environment 450B, as previously discussed above.

In some examples, as similarly described above, when the second electronic device 470 receives the input for moving the shared application window 432 in the three-dimensional environment 450B while the first electronic device 460 and the second electronic device 470 are in the multi-user communication session, the second electronic device 470 transmits an indication of the movement of the shared application window 432. In some examples, when the first electronic device 460 receives the indication of the movement, the first electronic device 460 moves the shared application window 432 in the three-dimensional environment 450A based on the movement of the shared application window 432 in the three-dimensional environment 450B at the second electronic device 470. For example, because the second electronic device 470 did not spatially refine the three-dimensional environment 450B (including the shared application window 432) in response to the movement input 474B, the first electronic device 460 moves the shared application window 432 in the three-dimensional environment 450A instead of moving the avatar 415 corresponding to the user of the second electronic device 470 (e.g., which would have happened had the three-dimensional environment 450B been spatially refined at the second electronic device 470, as similarly described above). In some examples, as shown in FIG. 4D, the first electronic device 460 moves the shared application window 432 away from the viewpoint of the user of the first electronic device 460, such that a distance between the shared application window 432 in the three-dimensional environment 450A and the avatar 415 corresponding to the user of the second electronic device 470 is equal to or proportional to a distance between the shared application window 432 in the three-dimensional environment 450B and the viewpoint of the user of the second electronic device 470.

Additionally, as shown in FIG. 4D, in some examples, the first electronic device 460 scales the shared application window 432 in the three-dimensional environment 450A when the shared application window 432 is moved farther from the viewpoint of the user of the first electronic device 460. For example, as similarly described above, the first electronic device 460 increases a size of the shared application window 432 in the three-dimensional environment 450A when the shared application window 432 is moved farther from the viewpoint of the user of the first electronic device 460, as shown in FIG. 4D. In some examples, the scaling of the shared application window 432 in the three-dimensional environment 450A is based on the scaling of the shared application window 432 in the three-dimensional environment 450B. For example, as shown in FIG. 4D, the size of the shared application window 432 in the three-dimensional environment 450A is equal to or proportional to the size of the shared application window 432 in the three-dimensional environment 450B.

Accordingly, as outlined above with reference to FIGS. 4A-4D, when interaction input is directed to an object of the second type (e.g., a vertically oriented object, such as the shared application window 432), the electronic device performs spatial refinement in the shared three-dimensional environment based on the manner (e.g., direction) of the movement of the object in the shared three-dimensional environment. For example, as discussed above, movement of the shared application window 432 forward or backward in the three-dimensional environment 450B (e.g., toward or away from the viewpoint of the user of the second electronic device 470) causes the second electronic device 470 to forgo performing spatial refinement in the three-dimensional environment 450B. Rather, the second electronic device 470 may move the shared application window 432 in the three-dimensional environment 450B in accordance with the movement input without moving the avatar 417 corresponding to the user of the first electronic device 460, which causes the first electronic device 460 to also move the shared application window 432 in the three-dimensional environment 450A based on the movement input received at the second electronic device. It may be advantageous to implement the behavior outlined above for forward and backward movement to help avoid situations in which movement of a user's avatar in the shared three-dimensional environment causes the avatar to at least partially obstruct or distract from the shared content displayed in the application window. Attention is now directed toward example interactions with the shared application window 432 that result in spatial refinement in the shared three-dimensional environment.

Figure 4E:
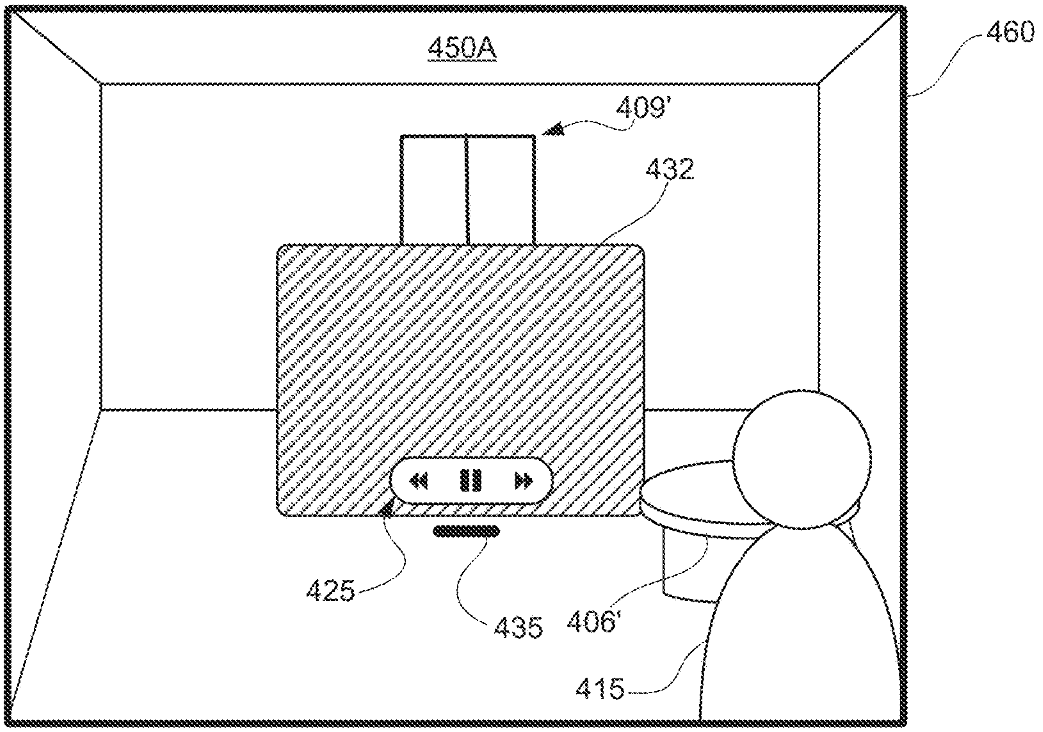
Figure 4E:
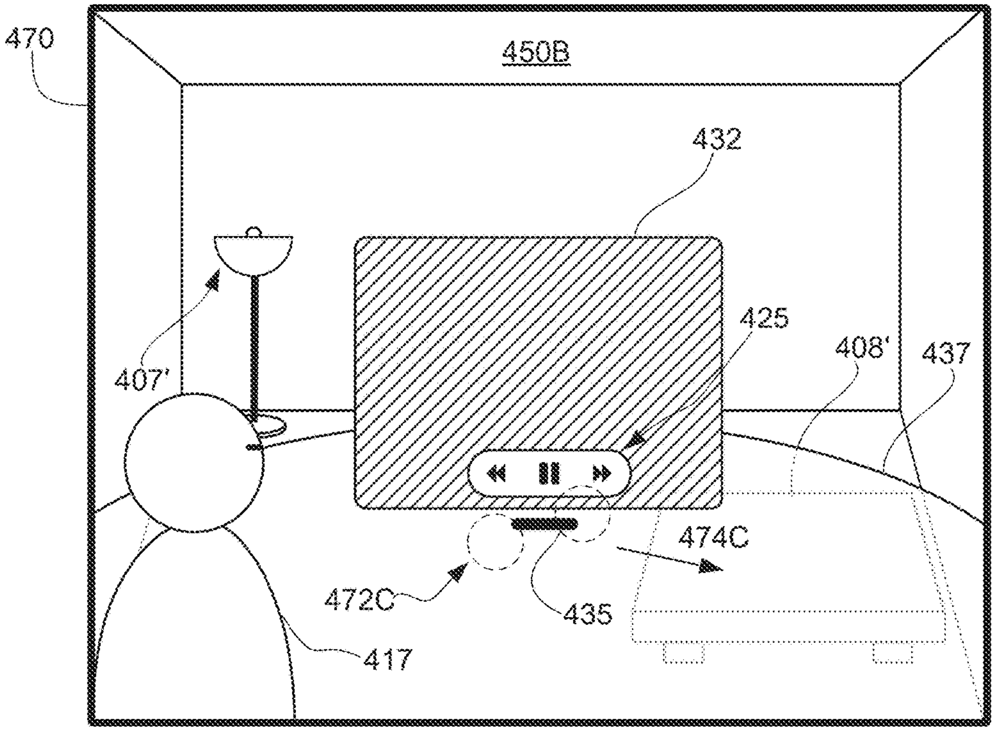

In some examples, as shown in FIG. 4E, the second electronic device 470 may receive a selection input 472C directed to the grabber affordance 435 (and/or the shared application window 432), followed by movement input 474C. For example, as similarly described above, the second electronic device 470 detects a pinch gesture provided by a hand of the user of the second electronic device while the gaze of the user is directed to the shared application window 432 in the three-dimensional environment 450B, followed by movement of the hand of the user while maintaining the pinch gesture. As shown in FIG. 4E, the movement input 474C may correspond to movement of the shared application window 432 radially around the viewpoint of the user of the second electronic device 470 (e.g., rightward along a perimeter of a circle centered at the viewpoint of the user of the second electronic device 470).

In some examples, as shown in FIG. 4E, in response to receiving the movement input 474C directed to the shared application window 432, the second electronic device 470 performs spatial refinement in the three-dimensional environment 450B. For example, as previously described above, movement of the shared application window 432 also causes movement of the avatar 417 corresponding to the user of the first electronic device 460 in the three-dimensional environment 450B. In some examples, the second electronic device 470 spatially refines the three-dimensional environment 450B including the shared application window 432, which is an object of the second type (e.g., a vertically oriented object), because the movement input 474C corresponds to movement of the shared application window 432 radially to the right relative to the viewpoint of the user of the second electronic device 470. In other words, the movement input 474C optionally does not correspond to movement of the shared application window 432 forward or backward along a line from the viewpoint of the user of the second electronic device 470, as previously discussed with reference to FIGS. 4A-4D. Additionally, as shown in FIG. 4E, in some examples, in response to receiving the movement input 474C, the second electronic device 470 may display the planar element (e.g., disc) 437 below the object(s) selected for spatial refinement in three-dimensional environment 450B. For example, as shown in FIG. 4E, the disc 437 is displayed below the shared application window 432 and the avatar 417 corresponding to the user of the first electronic device 460 in the three-dimensional environment 450B.

Figure 4F:
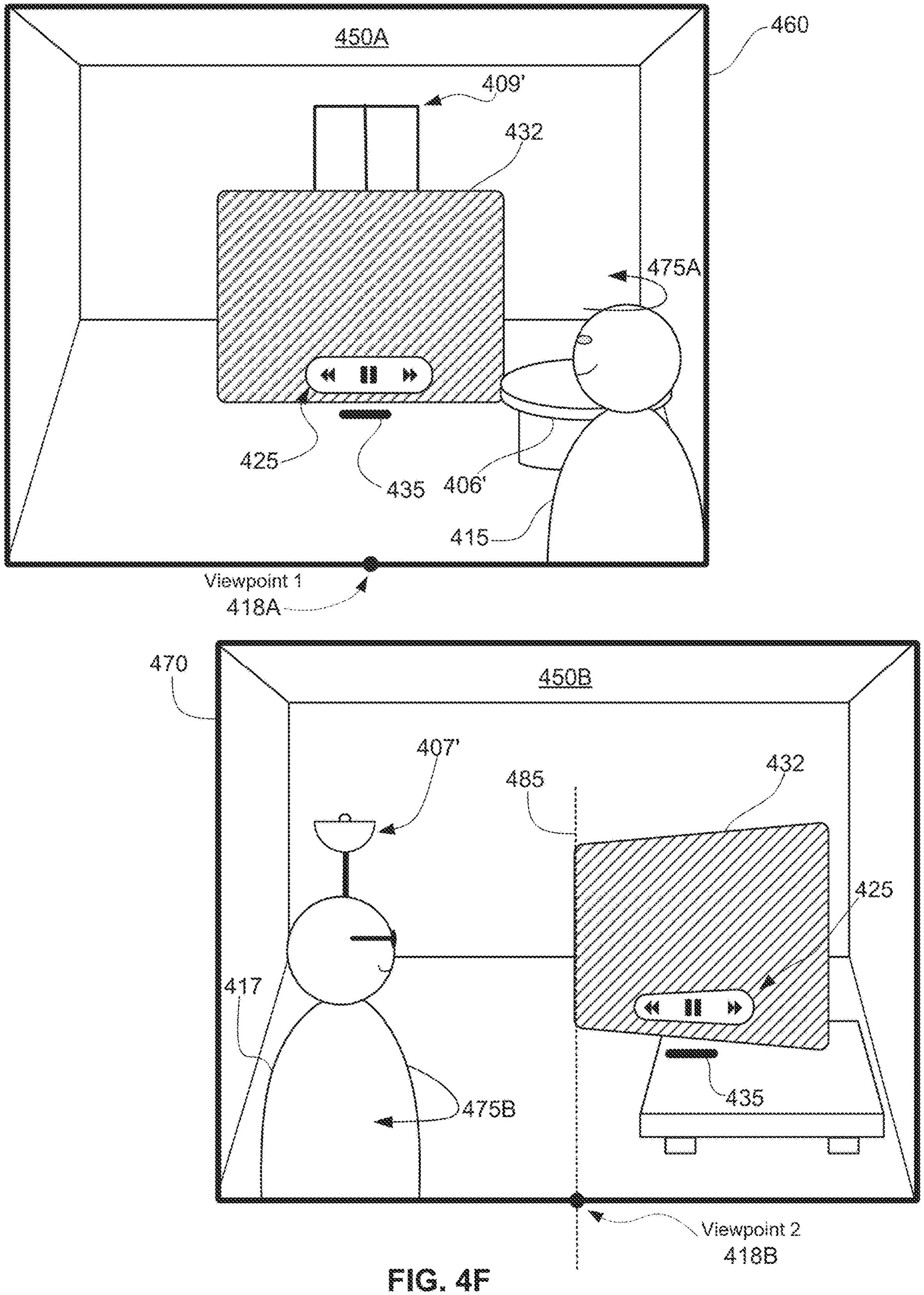

As mentioned above, the movement input 474C is optionally rightward radially around the viewpoint of the user of the second electronic device 470 in three-dimensional environment 450B. In some examples, as shown in FIG. 4F, in response to the movement input 474C, the second electronic device 470 moves the shared application window 432 rightward radially around the viewpoint 418B of the user of the second electronic device 470 in the three-dimensional environment 450B in accordance with the movement input 474C. Additionally, in some examples, as shown in FIG. 4F, the second electronic device 470 changes an orientation of the shared application window 432 after the movement of the shared application window 432 in the three-dimensional environment 450B. For example, as previously discussed above with reference to FIG. 4A, the shared application window 432 has a first orientation that is angled toward the user of the second electronic device 470 (e.g., a front-facing surface of the shared application window 432 is facing toward the viewpoint of the user) when the movement input 474C is received in FIG. 4E. As shown in FIG. 4F, when the second electronic device 470 moves the shared application window 432 in accordance with the movement input 474C, the second electronic device 470 displays the shared application window 432 with a second orientation, different from the first orientation, such that the shared application window 432 continues to face toward the viewpoint 418B of the user of the second electronic device 470. For example, the second electronic device 470 rotates the shared application window 432 about a vertical axis 485 through the viewpoint 418B of the user of the second electronic device 470 in the three-dimensional environment 450B (e.g., such that the shared application window 432 continues to face toward the viewpoint 418B of the user while maintaining the same distance from the viewpoint 418B).

In some examples, as shown in FIG. 4F, the second electronic device 470 does not change the size of the shared application window 432 in the three-dimensional environment 450B. For example, because the movement input 474C corresponds to movement of the shared application window 432 along a circle centered at the viewpoint 418B of the user of the second electronic device 470, a distance between the shared application window 432 and the viewpoint 418B of the user does not change in the three-dimensional environment 450B when the shared application window is moved. Accordingly, the second electronic device 470 does not scale the shared application window 432 in response to the movement input 474C. Further, as mentioned above, the second electronic device 470 moves the avatar 417 corresponding to the user of the first electronic device 460 in the three-dimensional environment 450B and displays the avatar 417 with an orientation that faces toward the shared application window 432 in the three-dimensional environment 450B. For example, as discussed above, when the second electronic device 470 spatially refines the three-dimensional environment 450B in response to the movement input 474C, the second electronic device 470 moves the avatar 417 and the shared application window 432 radially rightward in the three-dimensional environment 450B, which includes rotating the shared application window 432 and the avatar 417. As shown in FIG. 4F, the second electronic device 470 may translate the avatar 417 and rotate (e.g., as represented by arrow 475B) the avatar 417 by a same radial amount as the rotation of the shared application window 432 about the vertical axis 485 discussed above.

Likewise, because the second electronic device 470 spatially refined the three-dimensional environment 450B (including the avatar 417 and the shared application window 432), the first electronic device 460 rotates the avatar 415 corresponding to the user of the second electronic device 470 within three-dimensional environment 450A based on the movement of the shared application window 432 at the second electronic device 470. For example, as shown in FIG. 4F, the first electronic device 460 rotates the avatar 415 (e.g., as represented by arrow 475A) relative to the viewpoint 418A of the user of the first electronic device 460 (e.g., about a vertical axis through the avatar 415) based on the radial movement of the shared application window 432 in the three-dimensional environment 450B. In some examples, a radial amount that the rotation of the avatar 415 in the three-dimensional environment 450A is equal to or proportional to the radial amount of the rotation of the shared application window 432 at the second electronic device 470.

Additionally, in some examples, when the first electronic device 460 rotates the avatar 415 in the three-dimensional environment 450A, the first electronic device 460 does not move (or rotate) the shared application window 432 in the three-dimensional environment 450A. For example, as shown in FIG. 4F, when the first electronic device 460 moves the avatar 415 in the three-dimensional environment 450A, the first electronic device 460 maintains display of the shared application window 432 centrally within the three-dimensional environment 450A. Further, the first electronic device 460 does not scale the shared application window 432 when the avatar 415 is rotated in the three-dimensional environment 450A. For example, as shown in FIG. 4F, the first electronic device 460 may maintain display of the shared application window 432 with a same size as before the movement input 474C was detected (e.g., in FIG. 4E).

It should be understood that, while the orientations of the faces of the avatars 415/417 are utilized in FIG. 4F to indicate (e.g., changes to) the respective orientations of the avatars 415/417 of the users within the three-dimensional environments 450A/450B, additional or alternative characteristics of the avatars 415/417 may be utilized to convey changes to the respective orientations of the avatars 415/417. For example, for avatars including full-body and/or upper-body renderings of the users of the electronic devices, the torso (e.g., including the shoulders, arms, and/or chest) of each of the avatars may indicate the respective orientations of the avatars within the three-dimensional environments 450A/450B. Similarly, for avatars including full-body renderings of the users of the electronic devices, the lower-body (e.g., including the hips, legs, and/or feet) of each of the avatars may indicate the respective orientations of the avatars within the three-dimensional environments 450A/450B.

Accordingly, as outlined above, in response to receiving an interaction input that includes movement of the shared application window radially in the shared three-dimensional environment about the viewpoint of the user, the electronic device performs spatial refinement in the shared three-dimensional environment. For example, spatially refining the shared application window 432 at the second electronic device 470 in response to the movement input 474C does not cause the avatar 415 to interfere with the user's view (e.g., at viewpoint 418A) of the video content at the first electronic device 460. As shown in FIG. 4F, the avatar 415 is rotated at the first electronic device 460 based on the radial movement of the shared application window 432 at the second electronic device 470, which optionally does not cause the avatar 415 to occlude, obscure, or distract from the video content in the shared application window 432 in the three-dimensional environment 450A.

It should be understood that, in some examples, the above-described behavior applies for radial movement leftward (e.g., in the opposite direction than that shown in FIGS. 4E-4F). For example, in FIG. 4E, if the movement input 474C alternatively corresponds to movement of the shared application window 432 radially leftward in the three-dimensional environment 450B relative to the viewpoint of the user of the second electronic device 470, the second electronic device 470 may perform spatial refinement in the three-dimensional environment 450B and move the shared application window 432 and the avatar 417 radially leftward in the three-dimensional environment 450B in accordance with the movement. As similarly described above with reference to FIG. 4F, in such an example, the second electronic device 470 may rotate the shared application window 432 and the avatar 417 in addition to the leftward radial movement (e.g., translation) of the shared application window 432 and the avatar 417 (e.g., about a vertical axis through the viewpoint 418B of the user of the second electronic device 470). Further, the first electronic device 460 may forgo moving the shared application window 432 in the three-dimensional environment 450A but may rotate the avatar 415 corresponding to the user of the second electronic device 470 (e.g., about a vertical axis through the avatar 415) based on the leftward radial movement detected at the second electronic device 470, as similarly described above.

Figure 4G:
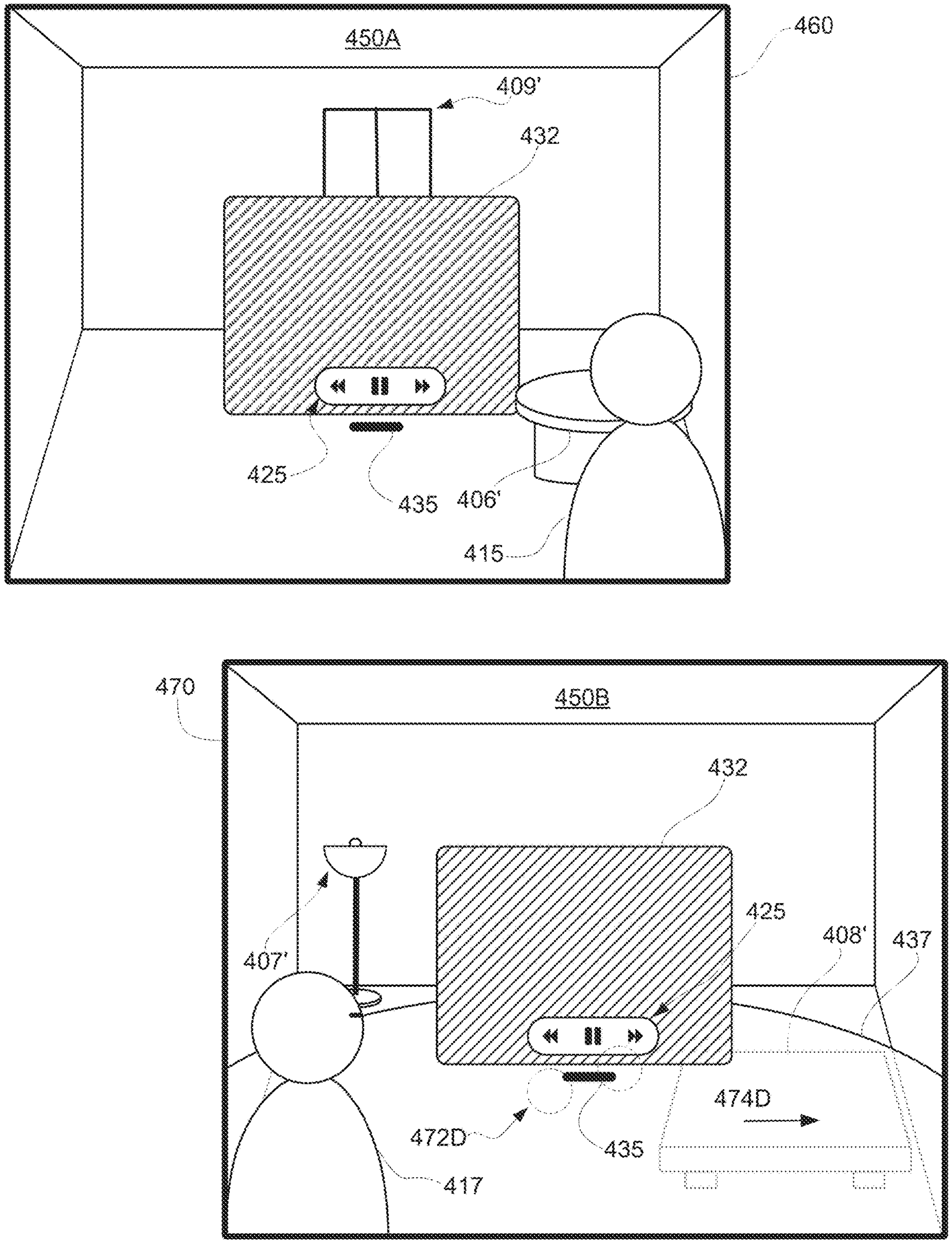

In some examples, the shared application window 432 may alternatively be moved laterally within the shared three-dimensional environment while the first electronic device 460 and the second electronic device 470 are in the multi-user communication session. As shown in FIG. 4G, the second electronic device 470 may receive a selection input 472D directed to the grabber affordance 435 (and/or the shared application window 432) in the three-dimensional environment 450B, followed by a movement input 474D (e.g., while the gaze of the user of the second electronic device 470 is directed to the shared application window 432). In some examples, the selection input 472D has one or more characteristics of the selection input 472C above, and the movement input 474D has one or more characteristics of the movement input 474C above. As shown in FIG. 4G, the movement input 474D optionally corresponds to lateral (e.g., rightward) movement of the shared application window 432 in the three-dimensional environment 450B relative to the viewpoint of the user of the second electronic device 470.

In some examples, in response to receiving the movement input 474D, the second electronic device 470 determines a manner of the movement directed to the shared application window 432. As previously discussed above, because the shared application window 432 is optionally an object of the second type (e.g., a vertically oriented object relative to the viewpoint of the user), the second electronic device 470 evaluates a direction of the movement of the shared application window 432 in the three-dimensional environment 450B. As shown in FIG. 4G, in accordance with the determination that the movement input 474D corresponds to lateral movement of the shared application window 432, the second electronic device 470 performs spatial refinement in the three-dimensional environment 450B. For example, as previously described above, movement of the shared application window 432 also causes movement of the avatar 417 corresponding to the user of the first electronic device 460 in the three-dimensional environment 450B. Additionally, as shown in FIG. 4G, in some examples, in response to receiving the movement input 474D, the second electronic device 470 may display the planar element (e.g., disc) 437 below the object(s) selected for spatial refinement in three-dimensional environment 450B. For example, as shown in FIG. 4G, the disc 437 is displayed below the shared application window 432 and the avatar 417 corresponding to the user of the first electronic device 460 in the three-dimensional environment 450B.

Figure 4H:
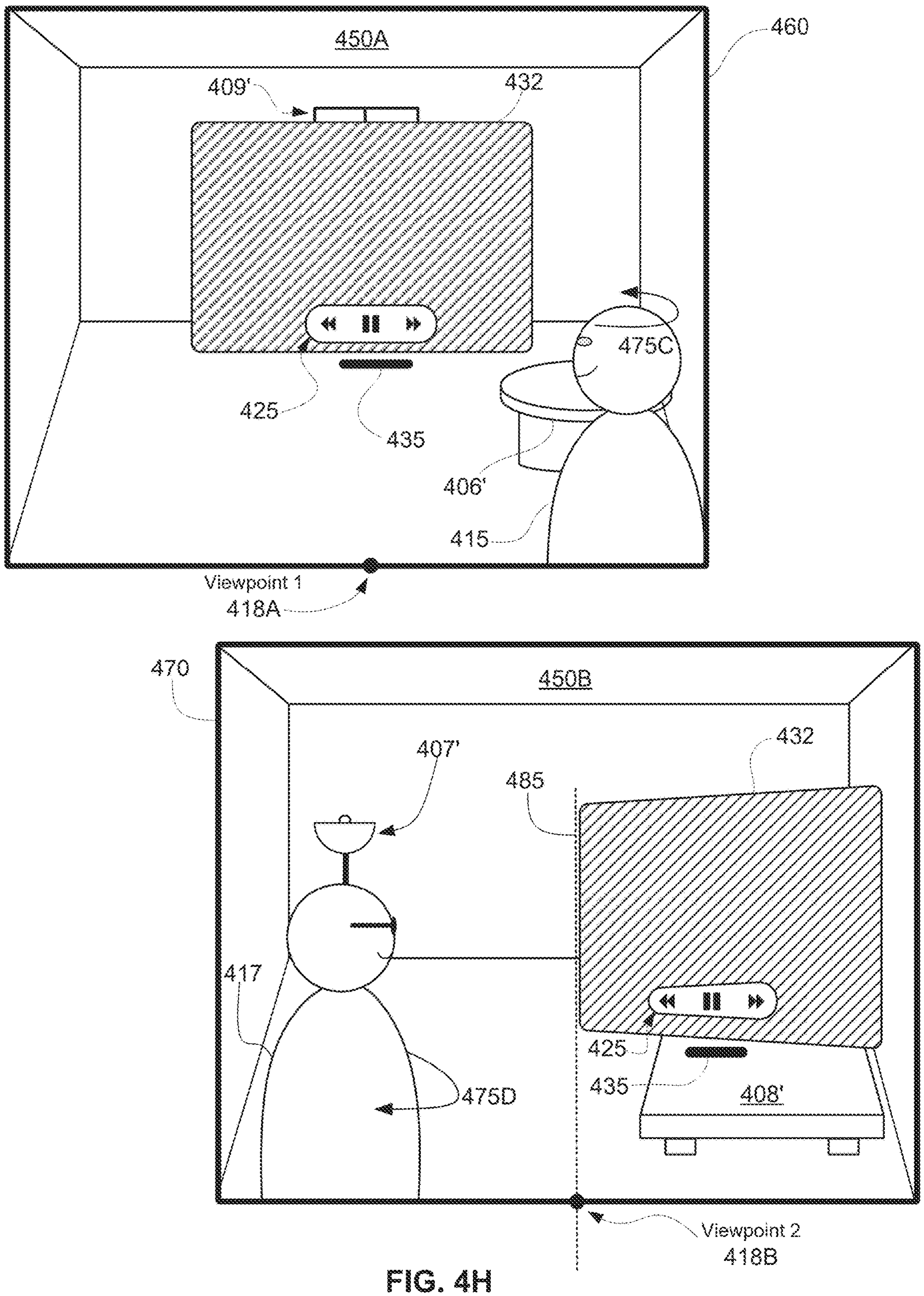

As mentioned above, the movement input 474D is optionally rightward relative to the viewpoint of the user of the second electronic device 470 in three-dimensional environment 450B. In some examples, as shown in FIG. 4H, in response to the movement input 474D, the second electronic device 470 moves the shared application window 432 rightward in the three-dimensional environment 450B relative to the viewpoint 418B of the user of the second electronic device 470 in accordance with the movement input 474D. Additionally, in some examples, as shown in FIG. 4H, the second electronic device 470 changes an orientation of the shared application window 432 after or during the movement of the shared application window 432 in the three-dimensional environment 450B. For example, as previously discussed above with reference to FIG. 4A, the shared application window 432 has a first orientation that is angled toward the user of the second electronic device 470 (e.g., a front-facing surface of the shared application window 432 is facing toward the viewpoint of the user) when the movement input 474D is received in FIG. 4G. As shown in FIG. 4H, when the second electronic device 470 moves the shared application window 432 in accordance with the movement input 474D, the second electronic device 470 displays the shared application window 432 with a second orientation, different from the first orientation, such that the shared application window 432 continues to face toward the viewpoint 418B of the user of the second electronic device 470. For example, the second electronic device 470 rotates the shared application window 432 about a vertical axis 485 through the viewpoint 418B of the user of the second electronic device 470 in the three-dimensional environment 450B (e.g., a vertical axis through a center of the shared application window 432). As discussed below, the rightward movement input 474D includes changing the distance between the viewpoint 418B of the user of the second electronic device 470, which does not cause the second electronic device to perform spatial refinement, and moving the shared application window radially rightward (e.g., along a circle centered at the viewpoint 418B), which does cause the second electronic device to perform spatial refinement.

Accordingly, in some examples, as shown in FIG. 4H, the second electronic device 470 scales the shared application window 432 in the three-dimensional environment 450B. For example, because the movement input 474D corresponds to movement of the shared application window 432 rightward relative to the viewpoint 418B of the user of the second electronic device 470, a distance between the shared application window 432 and the viewpoint 418B of the user increases in the three-dimensional environment 450B when the shared application window 432 is moved. Accordingly, the second electronic device 470 increases the size of the shared application window 432 in response to the movement input 474D (e.g., such that the portion of the user's field of view that is occupied by the video content in the shared application window 432 remains consistent after the movement of the shared application window), as shown in FIG. 4H and as similarly discussed above. Further, as mentioned above, the second electronic device 470 moves the avatar 417 corresponding to the user of the first electronic device 460 in the three-dimensional environment 450B and displays the avatar 417 with an orientation that faces toward the shared application window 432 in the three-dimensional environment 450B. For example, as discussed above, when the second electronic device 470 spatially refines the three-dimensional environment 450B in response to the movement input 474D, the second electronic device 470 moves the avatar 417 and the shared application window 432 radially rightward in the three-dimensional environment 450B, which includes rotating the shared application window 432 and the avatar 417. As shown in FIG. 4H, the second electronic device 470 may translate the avatar 417 and rotate (e.g., as represented by arrow 475D) the avatar 417 by a same radial amount as the rotation of the shared application window 432 about the vertical axis 485 of the user of the second electronic device 470 discussed above.

Likewise, because the second electronic device 470 spatially refined the three-dimensional environment 450B (including the avatar 417 and the shared application window 432), the first electronic device 460 rotates the avatar 415 corresponding to the user of the second electronic device 470 within three-dimensional environment 450A based on the movement of the shared application window 432 at the second electronic device 470. For example, as shown in FIG. 4H, the first electronic device 460 rotates the avatar 415 (e.g., as represented by arrow 475C) relative to the viewpoint 418A of the user of the first electronic device 460 based on the rotation of the shared application window 432 in the three-dimensional environment 450B. In some examples, a radial amount that the rotation of the avatar 415 in the three-dimensional environment 450A is equal to or proportional to the radial amount of the rotation of the shared application window 432 at the second electronic device 470.

Additionally, in some examples, when the first electronic device 460 rotates the avatar 415 in the three-dimensional environment 450A, the first electronic device 460 moves the shared application window 432 in the three-dimensional environment 450A. For example, as shown in FIG. 4H, when the first electronic device 460 rotates the avatar 415 in the three-dimensional environment 450A, the first electronic device 460 increases a distance between the shared application window 432 and the viewpoint 418A of the user of the first electronic device 460 in the three-dimensional environment 450A (e.g., moves the shared application window 432 backward in the three-dimensional environment 450A). In some examples, the distance that the shared application window 432 is moved in the three-dimensional environment 450A is based on (e.g., is equal or proportional to) the distance that the shared application window 432 is moved away from the viewpoint 418B of the user of the second electronic device 470, as similarly discussed above. Additionally, in some examples, because the second electronic device 470 scaled the shared application window 432 in the three-dimensional environment 450B in response to the movement input 474D, as discussed above, the first electronic device 460 scales the shared application window 432 when the avatar 415 is moved in the three-dimensional environment 450A. For example, as shown in FIG. 4H, the first electronic device 460 increases the size of the shared application window 432 in the three-dimensional environment 450A based on the scaling of the shared application window 432 at the second electronic device 470 (e.g., such that the size of the shared application window 432 is equal or proportional between the three-dimensional environments 450A/450B).

Accordingly, as outlined above, in response to receiving an interaction input that includes movement of the shared application window laterally in the shared three-dimensional environment about the viewpoint of the user, the electronic device performs spatial refinement in the shared three-dimensional environment. For example, spatially refining the shared application window 432 at the second electronic device 470 in response to the movement input 474D does not cause the avatar 415 to interfere with the user's view (e.g., at viewpoint 418A) of the video content at the first electronic device 460. As shown in FIG. 4H, the avatar 415 rotates based on the rightward movement of the shared application window 432 at the second electronic device 470, which optionally does not cause the avatar 415 to occlude, obscure, or distract from the video content in the shared application window 432 in the three-dimensional environment 450A. Attention is now directed to examples of interaction inputs that include upward movement of the shared application window 432 in the shared three-dimensional environment.

Figure 4I:
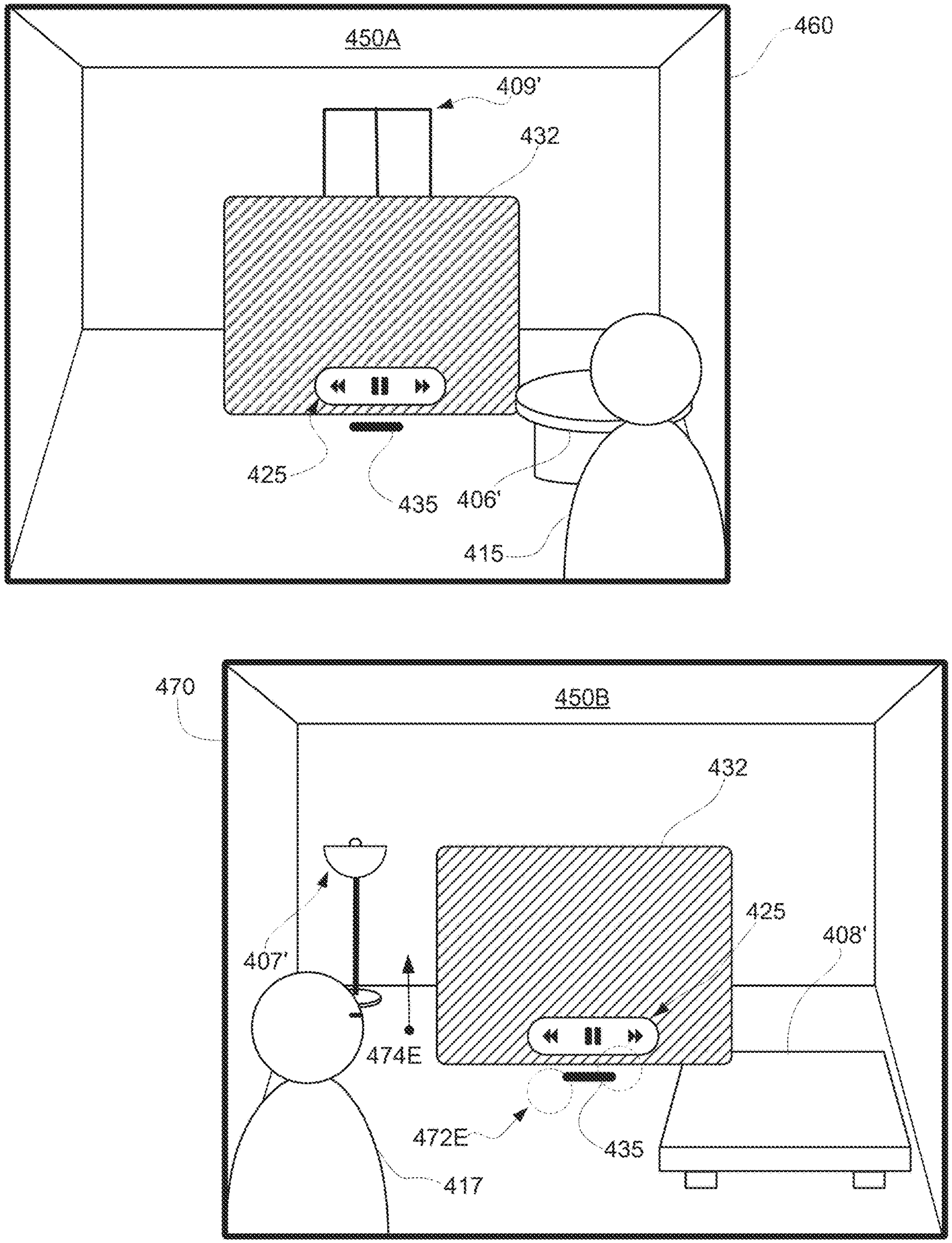

In some examples, the shared application window 432 may alternatively be elevated in the three-dimensional environment 450B relative to the viewpoint of the user of the second electronic device 470. For example, as shown in FIG. 4I, the second electronic device 470 may receive a selection input 472E directed to the grabber affordance 435 (and/or the shared application window 432), followed by movement input 474E. For example, as similarly described above, the second electronic device 470 detects a pinch gesture provided by a hand of the user of the second electronic device while the gaze of the user is directed to the shared application window 432 in the three-dimensional environment 450B, followed by raising of the hand of the user while maintaining the pinch gesture. As shown in FIG. 4I, the movement input 474E may correspond to movement of the shared application window 432 radially upward in the three-dimensional environment 450B relative to the viewpoint of the user of the second electronic device 470 (e.g., heightening of the shared application window 432 in the three-dimensional environment 450B without any change in distance between the viewpoint 418B of the user of the second electronic device 470 and the shared application window 432).

As previously discussed above, because the shared application window 432 is an object of the second type (e.g., a vertically oriented object), the second electronic device 470 spatially refines the three-dimensional environment 450B (including the shared application window 432) depending on the manner in which the shared application window 432 is moved in the three-dimensional environment 450B. As discussed above, the second electronic device 470 spatially refines the three-dimensional environment 450B (including the shared application window 432) in response to receiving movement input that corresponds to radial movement of the shared application window 432 (e.g., in FIGS. 4E-4F) or lateral movement of the shared application window 432 (e.g., in FIGS. 4G-4H). The second electronic device 470 optionally does not spatially refine the shared application window 432 in the three-dimensional environment 450B in response to receiving movement input that corresponds to forward or backward movement of the application window 432 relative to the viewpoint of the user of the second electronic device 470 (e.g., in FIGS. 4A-4D). As discussed below, the second electronic device 470 may not spatially refine the three-dimensional environment 450B (including the shared application window 432) in response to receiving movement input that corresponds to radial upward or downward movement of the application window 432 relative to the viewpoint of the user of the second electronic device 470.

Figure 4J:
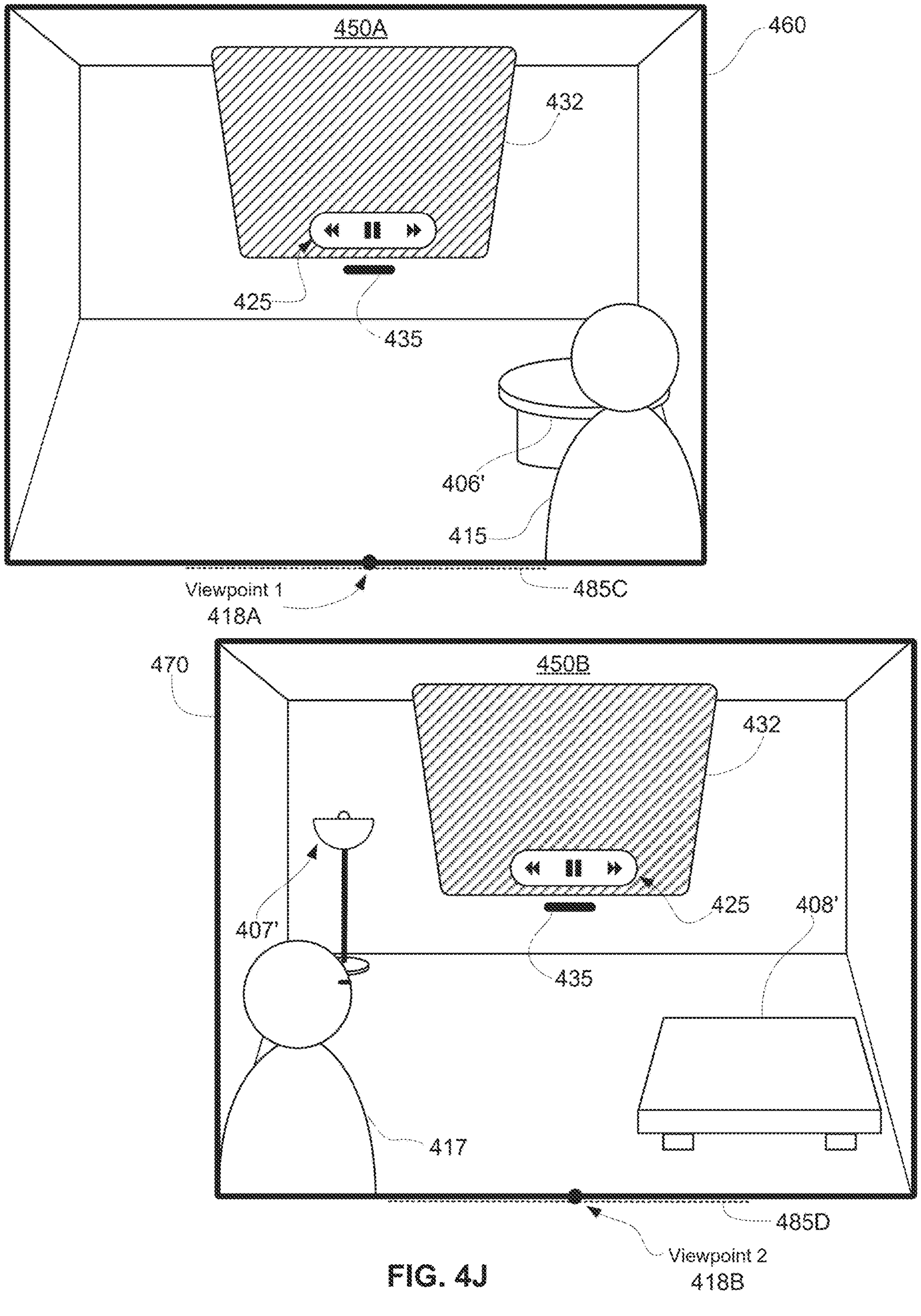

In some examples, as shown in FIG. 4I, in response to receiving the movement input 474E directed to the shared application window 432, the second electronic device 470 forgoes performing spatial refinement in the three-dimensional environment 450B. For example, the second electronic device 470 optionally does not display the planar element (e.g., disc) 437 below the avatar 417 corresponding to the user of the first electronic device 460 and the shared application window 432. Accordingly, as similarly discussed above, the second electronic device 470 moves the shared application window 432 in the three-dimensional environment 450B in accordance with the movement input 474E without moving the avatar 417. For example, as shown in FIG. 4J, the second electronic device 470 raises/elevates the shared application window 432 in the three-dimensional environment 450B relative to the viewpoint 418B of the user of the second electronic device 470 in accordance with the movement input 474E. Further, as alluded to above, the second electronic device 470 forgoes moving the avatar 417 in accordance with the movement input 474E. For example, the second electronic device 470 does not raise/elevate the avatar 417 in the three-dimensional environment 450B.

In some examples, as shown in FIG. 4J, when the second electronic device 470 raises/elevates the shared application window 432 in the three-dimensional environment 450B in accordance with the movement input 474E, the second electronic device 470 angles the shared application window 432 downward to continue facing the viewpoint 418B of the user of the second electronic device 470. For example, the second electronic device 470 rotates the shared application window 432 about a horizontal axis 485D through the viewpoint 418B of the user of second electronic device 470, such that the front-facing surface of the shared application window 432 is oriented to face the viewpoint 418B of the user of the second electronic device 470 while maintaining the same distance from the new height in the three-dimensional environment 450B. Additionally, in some examples, the second electronic device 470 forgoes scaling the shared application window 432 in response to the movement input 474E. For example, as discussed previously above, the second electronic device 470 scales the shared application window 432 in the three-dimensional environment 450B when the distance between a location of the shared application window 432 and the viewpoint 418B of the user of the second electronic device 470 changes (e.g., increases or decreases) because of the movement of the shared application window 432. In FIG. 4J, because the distance between the shared application window 432 and the viewpoint 418B of the user of the second electronic device 470 does not change when the shared application window 432 is raised/elevated in the three-dimensional environment 450B in response to the movement input 474E, the second electronic device 470 does not change a size at which the shared application window 432 is displayed in the three-dimensional environment 450B.

In some examples, in response to the inputs received at the second electronic device 470, the first electronic device 460 moves the shared application window 432 in the three-dimensional environment 450A based on the movement input 474E received at the second electronic device 470, without moving the avatar 415 corresponding to the user of the second electronic device 470. For example, as previously discussed above, the second electronic device 470 transmits an indication of the movement input 474E received at the second electronic device 470. As shown in FIG. 4J, the first electronic device 460 may radially raise/elevate the shared application window 432 in the three-dimensional environment 450A by a height that is equal to or proportional to the height the shared application window 432 is raised in the three-dimensional environment 450B at the second electronic device 470. As previously discussed herein, because the second electronic device 470 does not perform spatial refinement in response to the movement input 474E in the three-dimensional environment 450B, the first electronic device 460 does not raise/elevate the avatar 415 in the three-dimensional environment 450A.

Additionally, in some examples, the first electronic device angles the shared application window 432 downward in the three-dimensional environment 450A to face toward the viewpoint 418A of the user of the first electronic device 460. For example, as shown in FIG. 4J, when the shared application window 432 is raised/elevated in the three-dimensional environment 450A, the first electronic device 460 rotates the shared application window 432 about a horizontal axis 485C through the viewpoint 418A of the user of the first electronic device 460, such that a front-facing surface of the shared application window 432 is oriented toward the viewpoint 418A of the user of the first electronic device 460 while maintaining the same distance in the three-dimensional environment 450A. As similarly discussed above, in some examples, the first electronic device 460 forgoes scaling the shared application window 432 in the three-dimensional environment 450A. For example, because the second electronic device 470 did not scale the shared application window 432 in the three-dimensional environment 450B at the second electronic device 470 in response to the movement input 474E, the first electronic device 460 performs similarly and does not change the size of the shared application window 432 in the three-dimensional environment 450A.

Accordingly, as outlined above, in response to receiving an interaction input that includes movement of the shared application window upward or downward in the shared three-dimensional environment relative to the viewpoint of the user, the electronic device forgoes performing spatial refinement in the shared three-dimensional environment. For example, spatially refining the shared application window 432 at the second electronic device 470 in response to the movement input 474E may cause the avatar 415 to interfere with the user's view (e.g., at viewpoint 418A) of the video content at the first electronic device 460. As an example, if the avatar 415 were raised/elevated in FIG. 4J at the first electronic device 460 based on the upward movement of the shared application window 432 at the second electronic device 470, the avatar 415 could occlude, obscure, or distract from the video content in the shared application window 432 in the three-dimensional environment 450A. Accordingly, the shared application window 432 is moved at both electronic devices 460/470 in response to the movement input 474E, without moving the avatars 415/417 corresponding to the users of the electronic devices 460/470. Thus as outlined above, in response to detecting radial lateral movement of the shared application window 432, as shown in FIGS. 4E-4F, the second electronic device 470 performs spatial refinement in the three-dimensional environment 450B, but in response to detecting radial vertical movement of the shared application window 432, as shown in FIGS. 4I-4J, the second electronic device 470 forgoes performing spatial refinement in the three-dimensional environment 450B.

In some examples, the shared application window 432 may alternatively be moved vertically in a non-radial manner in the shared three-dimensional environment. For example, in FIG. 4I, the movement input 474E may correspond to vertical movement in the three-dimensional environment 450B that causes the distance between the application window 432 and the viewpoint of the user of the second electronic device 470 to change. In some such examples, the second electronic device 470 would still forgo performing spatial refinement in the three-dimensional environment 450B (e.g., would move the shared application window 432 without moving the avatar 417) but would also scale the shared application window 432 in the three-dimensional environment 450B. For example, as similarly described above with reference to FIG. 4D, because the non-radial vertical movement would increase the distance between the viewpoint of the user of the second electronic device 470 and the shared application window 432, the second electronic device 470 would increase the size of the shared application window 432 in the three-dimensional environment 450B (e.g., in addition to rotating the shared application window 432 in the three-dimensional environment 450B as described above with reference to FIG. 4I). Further, as similarly described above, the first electronic device 460 may also scale the shared application window 432 in the three-dimensional environment 450A when the shared application window 432 is moved vertically relative to the viewpoint of the user of the first electronic device 460 based on the movement input detected at the second electronic device 470 (e.g., and without moving the avatar 415 because spatial refinement is not being performed).

As described above with reference to FIGS. 3A-3G, in some examples, the shared three-dimensional environment may alternatively include an object of the first type (e.g., a horizontally oriented object). In some examples, a shared virtual object that is an object of the first type may also be moved vertically in the shared three-dimensional environment. For example, referring back to FIG. 3C, if the movement input 374A alternatively corresponds to movement of the shared virtual object 314 upward in the three-dimensional environment 350A relative to the viewpoint of the user of the first electronic device 360, the first electronic device 360 would similarly forgo performing spatial refinement in the three-dimensional environment 350A. For example, the first electronic device 360 would move the shared virtual object 314 upward in the three-dimensional environment 350A relative to the viewpoint of the user in accordance with the movement input without moving the avatar 315 corresponding to the user of the second electronic device 370. Additionally, in some examples, the second electronic device 370 would move the shared virtual object 314 upward in the three-dimensional environment 350B based on the movement input detected at the first electronic device 360 without moving the avatar 317 corresponding to the user of the first electronic device 360. In some examples, the first electronic device 360 does not change an orientation of the shared virtual object 314 in response to the upward movement of the shared virtual object 314 in the three-dimensional environment 350A. For example, the first electronic device 360 maintains the horizontal orientation of the shared virtual object 314 in the three-dimensional environment 350A relative to the viewpoint of the user of the first electronic device 360. Likewise, the second electronic device 370 may not change the orientation of the shared virtual object 314 in the three-dimensional environment 350B when the second electronic device 370 moves the shared virtual object 314 upward relative to the viewpoint of the user of the second electronic device 370.

Thus, as described herein with reference to FIGS. 4A-4J, the disclosed method enables users in a multi-user communication session to interact with shared content intuitively and efficiently, including moving the shared content, without affecting any one user's viewpoint and/or experience of the shared content, as one advantage. Additionally, the disclosed method promotes and maintains spatial truth for the users in the multi-user communication session, which enhances the users' experience within the communication session by modeling real-world interactions that would occur if the users were physically located in the same physical environment.

It is understood that the examples shown and described herein are merely exemplary and that additional and/or alternative elements may be provided within the three-dimensional environment for interacting with the content and/or the avatars. It should be understood that the appearance, shape, form, and size of each of the various user interface elements and objects shown and described herein are exemplary and that alternative appearances, shapes, forms and/or sizes may be provided. For example, the virtual objects representative of application windows (e.g., 324 and 432) may be provided in an alternative shape than a rectangular shape, such as a circular shape, triangular shape, etc. In some examples, the various selectable affordances (e.g., grabber or handlebar affordances 335 and 435) described herein may be selected verbally via user verbal commands (e.g., "select grabber bar" or "select virtual object" verbal command). Additionally or alternatively, in some examples, the various options, user interface elements, control elements, etc. described herein may be selected and/or manipulated via user input received via one or more separate input devices in communication with the electronic device(s). For example, selection input may be received via physical input devices, such as a mouse, trackpad, keyboard, etc. in communication with the electronic device(s).

Additionally, it should be understood that, although the above methods are described with reference to two electronic devices, the above methods optionally apply for two or more electronic devices communicatively linked in a communication session. In some examples, while three, four, five or more electronic devices are communicatively linked in a multi-user communication session, when a user of one electronic device provides movement input at the electronic device, if the movement input is directed to a shared object of the first type (e.g., a horizontally oriented object, such as virtual object 314) in the multi-user communication session, the movement input moves the shared object and the other users' avatars at the electronic device, and if the movement input is directed to a shared object of the second type (e.g., a vertically oriented object, such as application window 432) in the multi-user communication session, the movement input moves the avatars corresponding to the users of the other electronic devices and the shared object at the electronic device depending on the manner (e.g., direction) of the movement input. For example, if the manner of the movement input directed to the shared object of the second type corresponds to forward or backward movement or upward or downward movement while the three, four, five or more electronic devices are communicatively linked in a multi-user communication session, the movement input moves the shared object at the electronic device without moving the avatars corresponding to the users of the other electronic devices.

Figure 5:
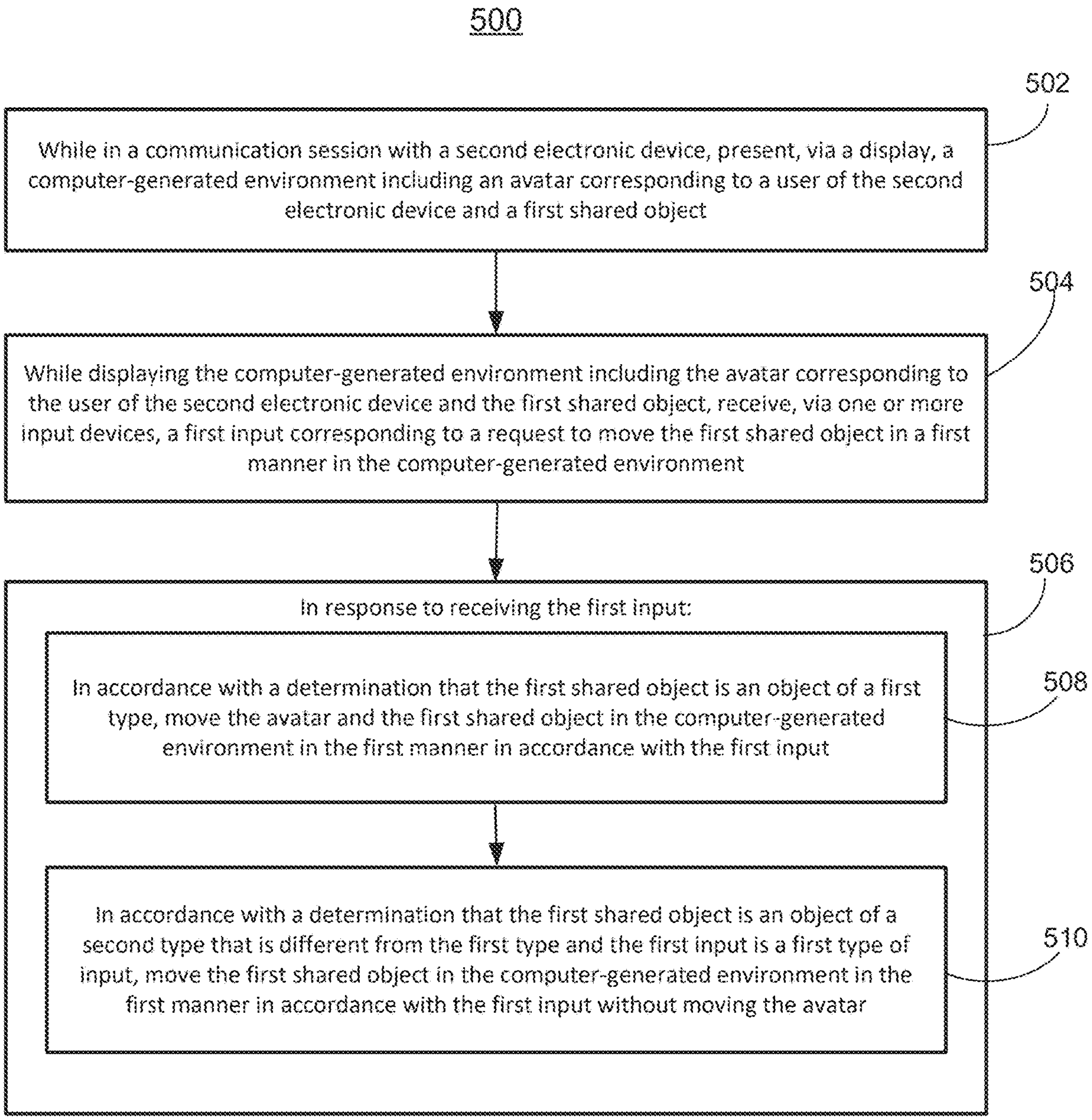
FIG. 5 illustrates a flow diagram illustrating an example process for application-based spatial refinement in a multi-user communication session at an electronic device according to some examples of the disclosure.

FIG. 5 illustrates a flow diagram illustrating an example process for application-based spatial refinement in a multi-user communication session at an electronic device according to some examples of the disclosure. In some examples, process 500 begins at a first electronic device in communication with a display, one or more input devices, and a second electronic device. In some examples, the first electronic device and the second electronic device are optionally a head-mounted display, respectively, similar or corresponding to devices 260/270 of FIG. 2. As shown in FIG. 5, in some examples, at 502, while in a communication session with the second electronic device, the first electronic device presents, via the display, a computer-generated environment including an avatar corresponding to a user of the second electronic device and a first shared object. For example, the first electronic device displays a three-dimensional environment, such as three-dimensional environment 350A that includes the avatar 315 and the shared virtual object 314 in FIG. 3A.

In some examples, at 504, while displaying the computer-generated environment including the avatar corresponding to the user of the second electronic device and the first shared object, the first electronic device receives, via the one or more input devices, a first input corresponding to a request to move the first shared object in a first manner (e.g., forward movement) in the computer-generated environment. For example, the first electronic device receives a selection input, followed by a movement input directed to the first shared object, such as the movement input 374A directed to the shared virtual object 314 in the three-dimensional environment 450A as shown in FIG. 3B. In some examples, at 506, in response to receiving the first input, at 508, in accordance with a determination that the first shared object is an object of a first type, the first electronic device moves the avatar and the first shared object in the computer-generated environment in the first manner in accordance with the first input. For example, if the first electronic device determines that the first shared object is an object of the first type, such as a horizontally oriented object (e.g., shared virtual object 314), the first electronic device performs spatial refinement in the computer-generated environment. In some examples, performing spatial refinement includes moving the first shared object and the avatar in the three-dimensional environment in accordance with the movement input, such as the forward movement of the shared virtual object 314 and the avatar 315 in the three-dimensional environment 350A as shown in FIG. 3C.

In some examples, at 510, in accordance with a determination that the first shared object is an object of a second type that is different from the first type and the first input is a first type of input, the first electronic device moves the first shared object in the computer-generated environment in the first manner in accordance with the first input without moving the avatar. For example, if the first electronic device determines that the first shared object is an object of the second type, such as a vertically oriented object (e.g., shared application window 432 in FIG. 4A), and that the first input correspond to a change in distance between the first shared object, as similarly shown in FIG. 4A, or vertical radial movement, as similarly shown in FIG. 4I, the first electronic device forgoes performing spatial refinement in the computer-generated environment. In some examples, forgoing performing spatial refinement includes moving the first shared object in the three-dimensional environment without moving the avatar corresponding to the user of the second electronic device, such as the forward movement of the shared application window 432 in the three-dimensional environment 450B as shown in FIG. 4B.

It is understood that process 500 is an example and that more, fewer, or different operations can be performed in the same or in a different order. Additionally, the operations in process 500 described above are, optionally, implemented by running one or more functional modules in an information processing apparatus such as general-purpose processors (e.g., as described with respect to FIG. 2) or application specific chips, and/or by other components of FIG. 2.

Figure 6:
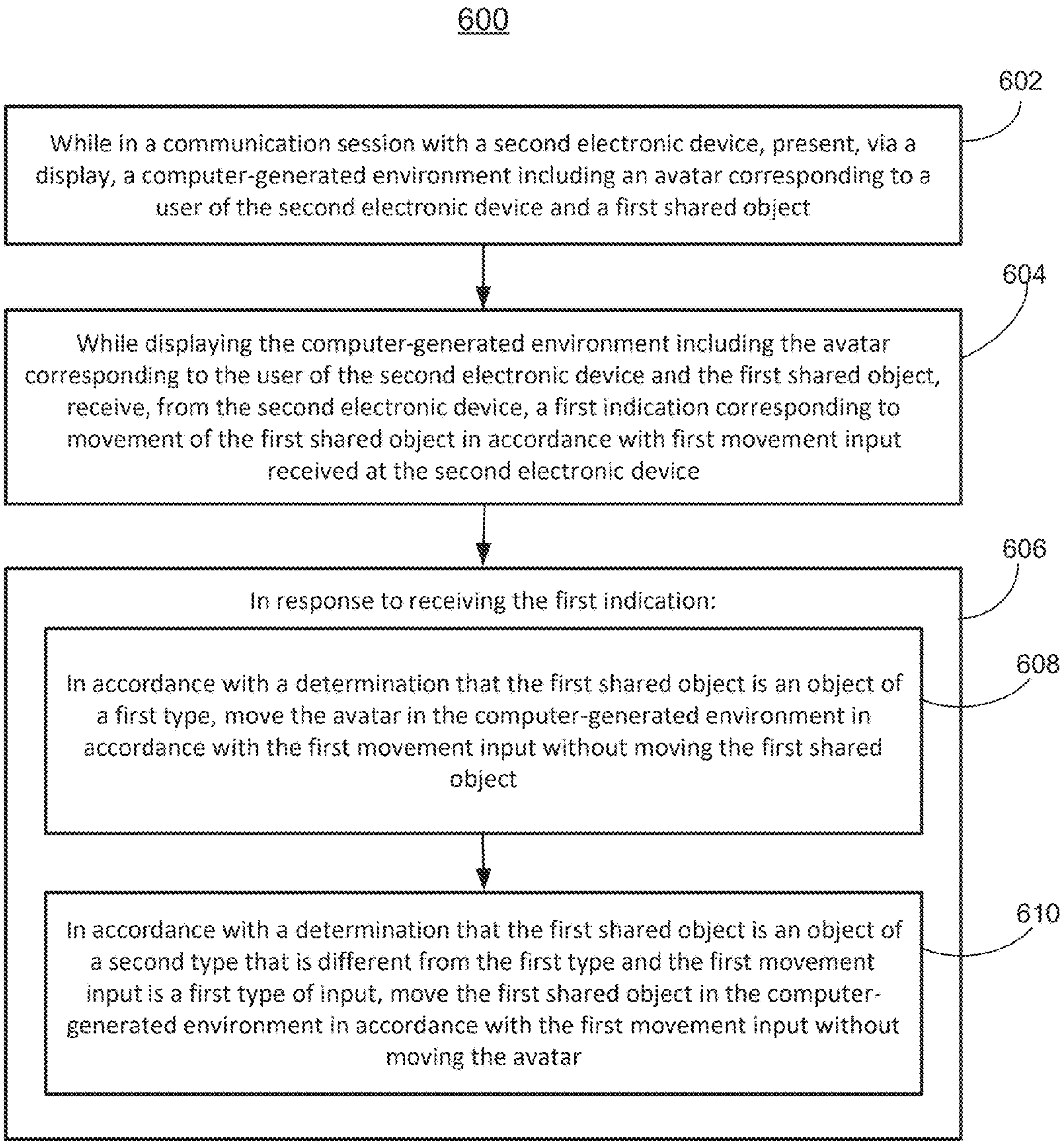
FIG. 6 illustrates a flow diagram illustrating an example process for application-based spatial refinement in a multi-user communication session at an electronic device according to some examples of the disclosure.

FIG. 6 illustrates a flow diagram illustrating an example process for application-based spatial refinement in a multi-user communication at an electronic device according to some examples of the disclosure. In some examples, process 600 begins at a first electronic device in communication with a display, one or more input devices, and a second electronic device. In some examples, the first electronic device and the second electronic device are optionally a head-mounted display, respectively, similar or corresponding to devices 260/270 of FIG. 2. As shown in FIG. 6, in some examples, at 602, while in a communication session with the second electronic device, the first electronic device presents, via the display, a computer-generated environment including an avatar corresponding to a user of the second electronic device and a first shared object. For example, the first electronic device displays a three-dimensional environment, such as three-dimensional environment 350B that includes the avatar 317 and the shared virtual object 314 in FIG. 3A.

In some examples, at 604, while displaying the computer-generated environment including the avatar corresponding to the user of the second electronic device and the first shared object, the first electronic device receives, from the second electronic device, a first indication corresponding to movement of the first shared object in accordance with first movement input received at the second electronic device. For example, the first electronic device receives an indication that the second electronic device has received movement input directed to the first shared object displayed at the second electronic device, such as movement input 374A directed to the shared virtual object 314 in the three-dimensional environment 350A as shown in FIG. 3B. In some examples, at 606, in response to receiving the first indication, at 608, in accordance with a determination that the first shared object is an object of a first type, the first electronic device moves the avatar in the computer-generated environment in accordance with the first movement input without moving the first shared object. For example, if the first electronic device determines that the first shared object is an object of the first type, such as a horizontally oriented object (e.g., shared virtual object 314), the first electronic device performs spatial refinement in the computer-generated environment. In some examples, performing spatial refinement includes moving the avatar, without moving the first shared object, in the three-dimensional environment in accordance with the movement input received at the second electronic device, such as the forward movement of the avatar 317 in the three-dimensional environment 350B based on the movement input 374A as shown in FIG. 3C.

In some examples, at 610, in accordance with a determination that the first shared object is an object of a second type that is different from the first type and the first movement input is a first type of input, the first electronic device moves the first shared object in the computer-generated environment in accordance with the first movement input without moving the avatar. For example, if the first electronic device determines that the first shared object is an object of the second type, such as a vertically oriented object (e.g., shared application window 432 in FIG. 4A), and that the first input correspond to a change in distance between the first shared object, as similarly shown in FIG. 4A, or vertical radial movement, as similarly shown in FIG. 4I, the first electronic device forgoes performing spatial refinement in the computer-generated environment. In some examples, forgoing performing spatial refinement includes moving the first shared object in the three-dimensional environment without moving the avatar corresponding to the user of the second electronic device, such as the forward movement of the shared application window 432 in the three-dimensional environment 450A based on the movement input 474A as shown in FIG. 4B.

It is understood that process 600 is an example and that more, fewer, or different operations can be performed in the same or in a different order. Additionally, the operations in process 600 described above are, optionally, implemented by running one or more functional modules in an information processing apparatus such as general-purpose processors (e.g., as described with respect to FIG. 2) or application specific chips, and/or by other components of FIG. 2.

Therefore, according to the above, some examples of the disclosure are directed to a method comprising, at a first electronic device in communication with a display, one or more input devices, and a second electronic device: while in a communication session with the second electronic device, presenting, via the display, a computer-generated environment including an avatar corresponding to a user of the second electronic device and a first shared object; while displaying the computer-generated environment including the avatar corresponding to the user of the second electronic device and the first shared object, receiving, via the one or more input devices, a first input corresponding to a request to move the first shared object in a first manner in the computer-generated environment; and in response to receiving the first input, in accordance with a determination that the first shared object is an object of a first type, moving the avatar and the first shared object in the computer-generated environment in the first manner in accordance with the first input and, in accordance with a determination that the first shared object is an object of a second type that is different from the first type and the first input is a first type of input, moving the first shared object in the computer-generated environment in the first manner in accordance with the first input without moving the avatar.

Additionally or alternatively, in some examples, the first type of input corresponds to one or more of a change in distance between a viewpoint of a user of the first electronic device and the first shared object and vertical movement of the first shared object in the computer-generated environment relative to the viewpoint of the user. Additionally or alternatively, in some examples, the method further comprises, in response to receiving the first input, in accordance with a determination that the first shared object is an object of the second type and the first input is a second type of input, different from the first type of input, moving the avatar and the first shared object in the computer-generated environment in the first manner in accordance with the first input. Additionally or alternatively, in some examples, the second type of input corresponds to radial lateral movement relative to a viewpoint of a user of the first electronic device. Additionally or alternatively, in some examples, the first electronic device and the second electronic device each include a head-mounted display. Additionally or alternatively, in some examples, before receiving the first input, the computer-generated environment further includes a first unshared object. Additionally or alternatively, in some examples, the method further comprises, while displaying the computer-generated environment including the avatar corresponding to the user of the second electronic device and the first shared object, receiving, via the one or more input devices, a second input corresponding to a request to move the first unshared object in the computer-generated environment and, in response to receiving the second input, moving the first unshared object in the computer-generated environment in accordance with the second input without moving the avatar and the first shared object.

Additionally or alternatively, in some examples, the method further comprises, in response to receiving the first input, in accordance with a determination that the first shared object is an object of the first type, moving the avatar and the first shared object in the computer-generated environment in the first manner in accordance with the first input without moving the first unshared object and, in accordance with a determination that the first shared object is an object of the second type and the first input is the first type of input, moving the first shared object in the computer-generated environment in the first manner in accordance with the first input without moving the avatar and the first unshared object. Additionally or alternatively, in some examples, the object of the first type corresponds to an object that has a horizontal orientation relative to a viewpoint of a user of the first electronic device. Additionally or alternatively, in some examples, the object of the second type corresponds to an object that has a vertical orientation relative to a viewpoint of a user of the first electronic device. Additionally or alternatively, in some examples, the first input includes a pinch gesture provided by a hand of a user of the first electronic device and movement of the hand of the user while holding the pinch gesture with the hand.

Additionally or alternatively, in some examples, moving the first shared object in the first manner corresponds to moving the first shared object toward a viewpoint of the user of the first electronic device or moving the first shared object away from the viewpoint of the user of the first electronic device. Additionally or alternatively, in some examples, the method further comprises, in response to receiving the first input, in accordance with a determination that the first shared object is an object of the second type, scaling the first shared object in the computer-generated environment based on the movement of the first shared object in the first manner. Additionally or alternatively, in some examples, before receiving the first input, the first shared object has a first size in the computer-generated environment and scaling the first shared object in the computer-generated environment based on the movement of the first shared object in the first manner includes, in accordance with a determination that the first manner of movement corresponds to the movement of the first shared object toward the viewpoint of the user of the first electronic device, displaying, via the display, the first shared object with a second size, smaller than the first size, in the computer-generated environment.

Additionally or alternatively, in some examples, before receiving the first input, the first shared object has a first size in the computer-generated environment and scaling the first shared object in the computer-generated environment based on the movement of the first shared object in the first manner includes, in accordance with a determination that the first manner of movement corresponds to the movement of the first shared object away from the viewpoint of the user of the first electronic device, displaying, via the display, the first shared object with a second size, larger than the first size, in the computer-generated environment. Additionally or alternatively, in some examples, the method further comprises, in response to receiving the first input, in accordance with a determination that the first shared object is an object of the first type, forgoing scaling the first shared object in the computer-generated environment based on the movement of the first shared object in the first manner. Additionally or alternatively, in some examples, before receiving the first input, the first shared object has a first orientation in the computer-generated environment. Additionally or alternatively, in some examples, the method further comprises, while displaying the computer-generated environment including the avatar corresponding to the user of the second electronic device and the first shared object, receiving, via the one or more input devices, a second input corresponding to a request to move the first shared object laterally in the computer-generated environment relative to a viewpoint of a user of the first electronic device and, in response to receiving the second input, in accordance with the determination that the first shared object is an object of the first type or that the first shared object is an object of the second type, moving the avatar and the first shared object laterally in the computer-generated environment relative to the viewpoint of the user in accordance with the second input.

Additionally or alternatively, in some examples, the method further comprises, while displaying the computer-generated environment including the avatar corresponding to the user of the second electronic device and the first shared object, receiving, via the one or more input devices, a second input corresponding to a request to move the first shared object radially laterally in the computer-generated environment relative to a viewpoint of a user of the first electronic device and, in response to receiving the second input, in accordance with the determination that the first shared object is an object of the first type or that the first shared object is an object of the second type, moving the avatar and the first shared object radially laterally in the computer-generated environment relative to the viewpoint of the user in accordance with the second input. Additionally or alternatively, in some examples, the method further comprises, in response to receiving the second input, in accordance with the determination that the first shared object is an object of the first type, displaying, via the display, the first shared object with the first orientation and, in accordance with the determination that the first shared object is an object of the second type, displaying, via the display, the first shared object with a second orientation, different from the first orientation, that faces toward the viewpoint of the user.

Additionally or alternatively, in some examples, the method further comprises, while displaying the computer-generated environment including the avatar corresponding to the user of the second electronic device and the first shared object, receiving, via the one or more input devices, a second input corresponding to a request to move the first shared object vertically in the computer-generated environment relative to a viewpoint of a user of the first electronic device and, in response to receiving the second input, in accordance with a determination that the first shared object is an object of the first type or that the first shared object is an object of the second type, moving the first shared object vertically in the computer-generated environment relative to the viewpoint of the user in accordance with the second input without moving the avatar. Additionally or alternatively, in some examples, before receiving the first input, the computer-generated environment further includes a first unshared object. In some examples, the method further comprises, in response to receiving the first input, in accordance with a determination that the first shared object is an object of the second type and the first input is a second type of input, moving the avatar and the first shared object in the computer-generated environment in the first manner in accordance with the first input without moving the first unshared object.

Some examples of the disclosure are directed to a method comprising, at a first electronic device in communication with a display, one or more input devices, and a second electronic device: while in a communication session with the second electronic device, presenting, via the display, a computer-generated environment including an avatar corresponding to a user of the second electronic device and a first shared object; while displaying the computer-generated environment including the avatar corresponding to the user of the second electronic device and the first shared object, receiving, from the second electronic device, a first indication corresponding to movement of the first shared object in accordance with first movement input received at the second electronic device; and in response to receiving the first indication, in accordance with a determination that the first shared object is an object of a first type, moving the avatar in the computer-generated environment in accordance with the first movement input without moving the first shared object and, in accordance with a determination that the first shared object is an object of a second type that is different from the first type and the first movement input is a first type of input, moving the first shared object in the computer-generated environment in accordance with the first movement input without moving the avatar.

Additionally or alternatively, in some examples, the first type of input corresponds to one or more of a change in distance between a viewpoint of a user of the first electronic device and the first shared object and vertical movement of the first shared object in the computer-generated environment relative to the viewpoint of the user. Additionally or alternatively, in some examples, the method further comprises, in response to receiving the first input, in accordance with a determination that the first shared object is an object of the second type and the first movement input is a second type of input, different from the first type of input, moving the avatar in the computer-generated environment in accordance with the first movement input without moving the first shared object. Additionally or alternatively, in some examples, the second type of input corresponds to radial lateral movement relative to a viewpoint of a user of the first electronic device. Additionally or alternatively, in some examples, the first electronic device and the second electronic device each include a head-mounted display. Additionally or alternatively, in some examples, before receiving the first indication, the computer-generated environment further includes a first unshared object of the first electronic device.

Additionally or alternatively, in some examples, the method further comprises, in response to receiving the first indication, in accordance with a determination that the first shared object is an object of the first type, moving the avatar in the computer-generated environment in accordance with the first movement input without moving the first shared object and the first unshared object of the first electronic device and, in accordance with a determination that the first shared object is an object of the second type and the first movement input is the first type of input, moving the first shared object in the computer-generated environment in accordance with the first movement input without moving the avatar and the first unshared object of the first electronic device. Additionally or alternatively, in some examples, the object of the first type corresponds to an object that has a horizontal orientation relative to a viewpoint of a user of the first electronic device. Additionally or alternatively, in some examples, the object of the second type corresponds to an object that has a vertical orientation relative to a viewpoint of a user of the first electronic device.

Additionally or alternatively, in some examples, the method further comprises, in response to receiving the first indication, in accordance with a determination that the first shared object is an object of the second type and that the first movement input corresponds to movement of the first shared object toward or away from a viewpoint of a user of the first electronic device, scaling the first shared object in the computer-generated environment based on the movement of the first shared object. Additionally or alternatively, in some examples, before receiving the first indication, the first shared object has a first size in the computer-generated environment and scaling the first shared object in the computer-generated environment based on the movement of the first shared object includes, in accordance with a determination that the first movement input corresponds to the movement of the first shared object toward the viewpoint of the user of the first electronic device, displaying, via the display, the first shared object with a second size, smaller than the first size, in the computer-generated environment. Additionally or alternatively, in some examples, before receiving the first indication, the first shared object has a first size in the computer-generated environment and scaling the first shared object in the computer-generated environment based on the movement of the first shared object includes, in accordance with a determination that the first movement input corresponds to the movement of the first shared object away from the viewpoint of the user of the first electronic device, displaying, via the display, the first shared object with a second size, larger than the first size, in the computer-generated environment.

Additionally or alternatively, in some examples, the method further comprises, in response to receiving the first indication, in accordance with a determination that the first shared object is an object of the first type, forgoing scaling the first shared object in the computer-generated environment based on the movement of the first shared object. Additionally or alternatively, in some examples, before receiving the first indication, the first shared object has a first orientation in the computer-generated environment. Additionally or alternatively, in some examples, the method further comprises, while displaying the computer-generated environment including the avatar corresponding to the user of the second electronic device and the first shared object, receiving, from the second electronic device, a second indication corresponding to lateral movement of the first shared object relative to a viewpoint of a user of the first electronic device in accordance with second movement input received at the second electronic device and, in response to receiving the second indication, in accordance with a determination that the first shared object is an object of the first type or that the first shared object is an object of the second type, moving the avatar laterally in the computer-generated environment relative to the viewpoint of the user in accordance with the second movement input without moving the first shared object.

Additionally or alternatively, in some examples, the method further comprises, while displaying the computer-generated environment including the avatar corresponding to the user of the second electronic device and the first shared object, receiving, from the second electronic device, a second indication corresponding to radial lateral movement of the first shared object relative to a viewpoint of a user of the first electronic device in accordance with second movement input received at the second electronic device and, in response to receiving the second indication, in accordance with a determination that the first shared object is an object of the first type, moving the avatar radially laterally in the computer-generated environment relative to the viewpoint of the user in accordance with the second movement input without moving the first shared object and, in accordance with a determination that the first shared object is an object of the second type, rotating the avatar in the computer-generated environment relative to the viewpoint of the user based on the second movement input without moving the first shared object. Additionally or alternatively, in some examples, the method further comprises, in response to receiving the second indication, in accordance with the determination that the first shared object is an object of the first type or that the first shared object is an object of the second type, displaying, via the display, the first shared object with the first orientation.

Additionally or alternatively, in some examples, the method further comprises, while displaying the computer-generated environment including the avatar corresponding to the user of the second electronic device and the first shared object, receiving, from the second electronic device, a second indication corresponding to vertical movement of the first shared object relative to a viewpoint of a user of the first electronic device in accordance with second movement input received at the second electronic device and, in response to receiving the second indication, in accordance with a determination that the first shared object is an object of the first type or that the first shared object is an object of the second type, moving the first shared object vertically in the computer-generated environment relative to the viewpoint of the user in accordance with the second movement input without moving the avatar. Additionally or alternatively, in some examples, before receiving the first indication, the computer-generated environment further includes a first unshared object of the second electronic device. In some examples, the method further comprises, in response to receiving the first indication, in accordance with the determination that the first shared object is an object of the first type, moving the avatar and the first unshared object of the second electronic device in the computer-generated environment in accordance with the first movement input without moving the first shared object and, in accordance with the determination that the first shared object is an object of the second type and the first movement input is the first type of input, moving the first shared object in the computer-generated environment in accordance with the first movement input without moving the avatar and the first unshared object of the second electronic device.

Additionally or alternatively, in some examples, before receiving the first indication, the computer-generated environment further includes a first unshared object of the first electronic device. In some examples, the method further comprises, in response to receiving the first indication, in accordance with a determination that the first shared object is an object of the second type and the first movement input is a second type of input, different from the first type of input, moving the avatar in the computer-generated environment in accordance with the first movement input without moving the first shared object and the first unshared object of the first electronic device.

Some examples of the disclosure are directed to an electronic device comprising: one or more processors; memory; and one or more programs stored in the memory and configured to be executed by the one or more processors, the one or more programs including instructions for performing any of the above methods.

Some examples of the disclosure are directed to a non-transitory computer readable storage medium storing one or more programs, the one or more programs comprising instructions, which when executed by one or more processors of an electronic device, cause the electronic device to perform any of the above methods.

Some examples of the disclosure are directed to an electronic device, comprising: one or more processors; memory; and means for performing any of the above methods.

Some examples of the disclosure are directed to an electronic device, comprising: an information processing apparatus for use in an electronic device, the information processing apparatus comprising means for performing any of the above methods.

The foregoing description, for purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the invention and its practical applications, to thereby enable others skilled in the art to best use the invention and various described examples with various modifications as are suited to the particular use contemplated.

What is claimed is:

1. A method comprising:

at a first electronic device in communication with one or more displays, one or more input devices, and a second electronic device:

while in a communication session with the second electronic device, presenting, via the one or more displays, a three-dimensional environment including a visual representation of a user of the second electronic device and a first shared object of a first type;

while presenting the three-dimensional environment including the visual representation of the user of the second electronic device and the first shared object, receiving, via the one or more input devices, a first input corresponding to movement of the first shared object; and in response to receiving the first input:

in accordance with a determination that the movement of the first shared object corresponds to rotation of the first shared object relative to a viewpoint of the first electronic device:

rotating the first shared object and the visual representation of the user of the second electronic device in the three-dimensional environment in accordance with the first input relative to the viewpoint of the user; and maintaining a scale of the first shared object in the three-dimensional environment relative to the viewpoint of the user; and in accordance with a determination that the movement of the first shared object corresponds to translation of the first shared object relative to the viewpoint of the first electronic device:

translating the first shared object and the visual representation of the user of the second electronic device in the three-dimensional environment in accordance with the first input relative to the viewpoint of the user; and scaling the first shared object in the three-dimensional environment relative to the viewpoint of the user.

2. The method of claim 1, wherein the translation of the first shared object corresponds to one or more of:

a change in distance between the viewpoint of the user of the first electronic device and the first shared object; or vertical movement of the first shared object in the three-dimensional environment relative to the viewpoint of the user.

3. The method of claim 1, wherein the rotation of the first shared object corresponds to radial lateral movement relative to the viewpoint of the user of the first electronic device.

4. The method of claim 1, wherein, before receiving the first input, the three-dimensional environment further includes an unshared object of the first electronic device, the method further comprising:

while displaying the three-dimensional environment including the visual representation of the user of the second electronic device and the first shared object, receiving, via the one or more input devices, a second input corresponding to a request to move the unshared object in the three-dimensional environment; and in response to receiving the second input:

moving the unshared object in the three-dimensional environment in accordance with the second input without moving the visual representation of the user of the second electronic device and the first shared object.

5. The method of claim 1, wherein an object of the first type corresponds to an object that has a vertical orientation relative to the viewpoint of the user of the first electronic device.

6. The method of claim 1, wherein:

before receiving the first input, the first shared object has a first size in the three-dimensional environment; and in accordance with the determination that the movement of the first shared object corresponds to translation of the first shared object relative to the viewpoint of the first electronic device, scaling the first shared object in the three-dimensional environment includes:

in accordance with a determination that the translation of the first shared object is toward the viewpoint of the user of the first electronic device, displaying, via the one or more displays, the first shared object with a second size, smaller than the first size, in the three-dimensional environment; and in accordance with a determination that the translation of the first shared object is away from the viewpoint of the user of the first electronic device, displaying the first shared object with a third size, larger than the first size, in the three-dimensional environment.

7. The method of claim 1, further comprising:

while presenting the three-dimensional environment including the visual representation of the user of the second electronic device and the first shared object, receiving, via the one or more input devices, a second input corresponding to a request to move the first shared object vertically in the three-dimensional environment relative to the viewpoint of the user of the first electronic device; and in response to receiving the second input, moving the first shared object vertically in the three-dimensional environment relative to the viewpoint of the user in accordance with the second input without moving the visual representation of the user of the second electronic device.

8. The method of claim 1, wherein, before receiving the first input, the three-dimensional environment further includes an unshared object, the method further comprising:

while displaying the three-dimensional environment including the visual representation of the user of the second electronic device and the first shared object, receiving, via the one or more input devices, a second input corresponding to a request to move the first shared object in the three-dimensional environment; and in response to receiving the second input, moving the visual representation of the user of the second electronic device and the first shared object in the three-dimensional environment in accordance with the second input, without moving the unshared object.

9. A first electronic device comprising:

one or more processors;

memory; and one or more programs stored in the memory and configured to be executed by the one or more processors, the one or more programs including instructions for:

while in a communication session with a second electronic device, presenting, via one or more displays, a three-dimensional environment including a visual representation of a user of the second electronic device and a first shared object of a first type;

while presenting the three-dimensional environment including the visual representation of the user of the second electronic device and the first shared object, receiving, via one or more input devices, a first input corresponding to movement of the first shared object; and in response to receiving the first input:

in accordance with a determination that the movement of the first shared object corresponds to rotation of the first shared object relative to a viewpoint of the first electronic device:

rotating the first shared object and the visual representation of the user of the second electronic device in the three-dimensional environment in accordance with the first input relative to the viewpoint of the user; and maintaining a scale of the first shared object in the three-dimensional environment relative to the viewpoint of the user; and in accordance with a determination that the movement of the first shared object corresponds to translation of the first shared object relative to the viewpoint of the first electronic device:

translating the first shared object and the visual representation of the user of the second electronic device in the three-dimensional environment in accordance with the first input relative to the viewpoint of the user; and scaling the first shared object in the three-dimensional environment relative to the viewpoint of the user.

10. The first electronic device of claim 9, wherein the translation of the first shared object corresponds to one or more of:

a change in distance between the viewpoint of the user of the first electronic device and the first shared object; and vertical movement of the first shared object in the three-dimensional environment relative to the viewpoint of the user.

11. The first electronic device of claim 9, wherein the rotation of the first shared object corresponds to radial lateral movement relative to the viewpoint of the user of the first electronic device.

12. The first electronic device of claim 9, wherein, before receiving the first input, the three-dimensional environment further includes an unshared object of the first electronic device, the one or more programs further including instructions for:

while displaying the three-dimensional environment including the visual representation of the user of the second electronic device and the first shared object, receiving, via the one or more input devices, a second input corresponding to a request to move the unshared object in the three-dimensional environment; and in response to receiving the second input:

moving the unshared object in the three-dimensional environment in accordance with the second input without moving the visual representation of the user of the second electronic device and the first shared object.

13. The first electronic device of claim 9, wherein an object of the first type corresponds to an object that has a vertical orientation relative to the viewpoint of the user of the first electronic device.

14. The first electronic device of claim 9, wherein:

before receiving the first input, the first shared object has a first size in the three-dimensional environment; and in accordance with the determination that the movement of the first shared object corresponds to translation of the first shared object relative to the viewpoint of the first electronic device, scaling the first shared object in the three-dimensional environment includes:

in accordance with a determination that the translation of the first shared object is toward the viewpoint of the user of the first electronic device, displaying, via the one or more displays, the first shared object with a second size, smaller than the first size, in the three-dimensional environment; and in accordance with a determination that the translation of the first shared object is away from the viewpoint of the user of the first electronic device, displaying the first shared object with a third size, larger than the first size, in the three-dimensional environment.

15. The first electronic device of claim 9, wherein the one or more programs further including instructions for:

while presenting the three-dimensional environment including the visual representation of the user of the second electronic device and the first shared object, receiving, via the one or more input devices, a second input corresponding to a request to move the first shared object vertically in the three-dimensional environment relative to the viewpoint of the user of the first electronic device; and in response to receiving the second input, moving the first shared object vertically in the three-dimensional environment relative to the viewpoint of the user in accordance with the second input without moving the visual representation of the user of the second electronic device.

16. The first electronic device of claim 9, wherein, before receiving the first input, the three-dimensional environment further includes an unshared object, the one or more programs further including instructions for:

while displaying the three-dimensional environment including the visual representation of the user of the second electronic device and the first shared object, receiving, via the one or more input devices, a second input corresponding to a request to move the first shared object in the three-dimensional environment; and in response to receiving the second input, moving the visual representation of the user of the second electronic device and the first shared object in the three-dimensional environment in accordance with the second input, without moving the unshared object.

17. A non-transitory computer readable storage medium storing one or more programs, the one or more programs comprising instructions, which when executed by one or more processors of a first electronic device, cause the first electronic device to:

while in a communication session with a second electronic device, present, via one or more displays, a three-dimensional environment including a visual representation of a user of the second electronic device and a first shared object of a first type;

while presenting the three-dimensional environment including the visual representation of the user of the second electronic device and the first shared object, receive, via one or more input devices, a first input corresponding to movement of the first shared object; and in response to receiving the first input:

in accordance with a determination that the movement of the first shared object corresponds to rotation of the first shared object relative to a viewpoint of the first electronic device:

rotate the first shared object and the visual representation of the user of the second electronic device in the three-dimensional environment in accordance with the first input relative to the viewpoint of the user; and maintain a scale of the first shared object in the three-dimensional environment relative to the viewpoint of the user; and in accordance with a determination that the movement of the first shared object corresponds to translation of the first shared object relative to the viewpoint of the first electronic device:

translate the first shared object and the visual representation of the user of the second electronic device in the three-dimensional environment in accordance with the first input relative to the viewpoint of the user; and scale the first shared object in the three-dimensional environment relative to the viewpoint of the user.

18. The non-transitory computer readable storage medium of claim 17, wherein the translation of the first shared object corresponds to one or more of:

a change in distance between the viewpoint of the user of the first electronic device and the first shared object; and vertical movement of the first shared object in the three-dimensional environment relative to the viewpoint of the user.

19. The non-transitory computer readable storage medium of claim 17, wherein the rotation of the first shared object corresponds to radial lateral movement relative to the viewpoint of the user of the first electronic device.

20. The non-transitory computer readable storage medium of claim 17, wherein, before receiving the first input, the three-dimensional environment further includes an unshared object of the first electronic device, and the instructions further cause the first electronic device to:

while displaying the three-dimensional environment including the visual representation of the user of the second electronic device and the first shared object, receive, via the one or more input devices, a second input corresponding to a request to move the unshared object in the three-dimensional environment; and in response to receiving the second input:

move the unshared object in the three-dimensional environment in accordance with the second input without moving the visual representation of the user of the second electronic device and the first shared object.

21. The non-transitory computer readable storage medium of claim 17, wherein an object of the first type corresponds to an object that has a vertical orientation relative to the viewpoint of the user of the first electronic device.

22. The non-transitory computer readable storage medium of claim 17, wherein:

before receiving the first input, the first shared object has a first size in the three-dimensional environment; and in accordance with the determination that the movement of the first shared object corresponds to translation of the first shared object relative to the viewpoint of the first electronic device, scaling the first shared object in the three-dimensional environment includes:

in accordance with a determination that the translation of the first shared object is toward the viewpoint of the user of the first electronic device, displaying, via the one or more displays, the first shared object with a second size, smaller than the first size, in the three-dimensional environment; and in accordance with a determination that the translation of the first shared object is away from the viewpoint of the user of the first electronic device, displaying the first shared object with a third size, larger than the first size, in the three-dimensional environment.

23. The non-transitory computer readable storage medium of claim 17, wherein the instructions further cause the first electronic device to:

while presenting the three-dimensional environment including the visual representation of the user of the second electronic device and the first shared object, receive, via the one or more input devices, a second input corresponding to a request to move the first shared object vertically in the three-dimensional environment relative to the viewpoint of the user of the first electronic device; and in response to receiving the second input, move the first shared object vertically in the three-dimensional environment relative to the viewpoint of the user in accordance with the second input without moving the visual representation of the user of the second electronic device.

24. The non-transitory computer readable storage medium of claim 17, wherein, before receiving the first input, the three-dimensional environment further includes an unshared object, and the instructions further cause the first electronic device to:

while displaying the three-dimensional environment including the visual representation of the user of the second electronic device and the first shared object, receive, via the one or more input devices, a second input corresponding to a request to move the first shared object in the three-dimensional environment; and in response to receiving the second input, move the visual representation of the user of the second electronic device and the first shared object in the three-dimensional environment in accordance with the second input, without moving the unshared object.

* * * * *